(12) United States Patent
Song

(10) Patent No.: US 11,704,052 B2
(45) Date of Patent: Jul. 18, 2023

(54) PROCESSING-IN-MEMORY (PIM) SYSTEMS

(71) Applicant: SK hynix Inc., Icheon-si (KR)

(72) Inventor: Choung Ki Song, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 147 days.

(21) Appl. No.: 17/491,954

(22) Filed: Oct. 1, 2021

(65) Prior Publication Data

US 2022/0019374 A1 Jan. 20, 2022

Related U.S. Application Data

(63) Continuation-in-part of application No. 17/027,276, filed on Sep. 21, 2020, now Pat. No. 11,513,733.

(60) Provisional application No. 62/958,226, filed on Jan. 7, 2020.

(30) Foreign Application Priority Data

Jan. 17, 2020 (KR) .......................... 10-2020-0006903

(51) Int. Cl.
*G06F 3/06* (2006.01)
*G06F 15/78* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G06F 15/7821
See application file for complete search history.

(56) References Cited

U.S. PATENT DOCUMENTS

| | | | |
|---|---|---|---|
| 10,042,639 B2 | 8/2018 | Gopal et al. | |
| 2020/0089472 A1 | 3/2020 | Pareek et al. | |
| 2020/0174749 A1* | 6/2020 | Kang | G06F 15/7821 |
| 2020/0293319 A1* | 9/2020 | Lee | G06F 9/30145 |
| 2021/0072986 A1 | 3/2021 | Yudanov et al. | |

FOREIGN PATENT DOCUMENTS

KR 1020180075913 A 7/2018

* cited by examiner

*Primary Examiner* — David E Martinez
(74) *Attorney, Agent, or Firm* — William Park & Associates Ltd.

(57) ABSTRACT

A processing-in-memory (PIM) system includes a plurality of PIM devices, a plurality of PIM controllers configured to control respective ones of the plurality of PIM devices, and an interface coupled between a host and the plurality of PIM controllers. The interface transmits first request data to a target PIM controller corresponding to one of the plurality of PIM controllers for execution of a first request output from the host. The interface transmits second request data to all of the plurality of PIM controllers for execution of a second request output from the host.

24 Claims, 66 Drawing Sheets

FIG. 34

| | REQUEST (REQ) | CMD | SINGLE/MULTI ACCESS REQUEST | FLAG SIGNAL |
|---|---|---|---|---|
| MEMORY ACCESS REQUEST (REQ_ME) | WRITE REQUEST (REQ_W) | WRITE COMMAND (CMD_W) | SINGLE ACCESS REQUEST | LOGIC LOW |
| | READ REQUEST (REQ_R) | READ COMMAND (CMD_R) | SINGLE ACCESS REQUEST | LOGIC LOW |
| MAC RELATED REQUEST (REQ_MO) | MAC OPERATION REQUEST (REQ_MAC) | MAC COMMAND (CMD_MAC) | MULTI ACCESS REQUEST | LOGIC HIGH |
| | WRITE REQUEST (WD) (REQ_WW) | WRITE COMMAND (CMD_W) | SINGLE ACCESS REQUEST | LOGIC LOW |
| | WRITE REQUEST (VD) (REQ_VW) | WRITE COMMAND (CMD_W) | MULTI ACCESS REQUEST | LOGIC HIGH |
| | READ REQUEST (MAC_RST) (REQ_MR) | READ COMMAND (CMD_R) | SINGLE ACCESS REQUEST | LOGIC LOW |

PROCESSING-IN-MEMORY (PIM) SYSTEMS

CROSS-REFERENCE TO RELATED APPLICATIONS

This is a continuation-in-part of U.S. patent application Ser. No. 17/027,276, filed on Sep. 21, 2020, which claims the priority of provisional application No. 62/958,226, filed on Jan. 7, 2020, and Korean Application No. 10-2020-0006903, filed on Jan. 17, 2020, which are incorporated herein by reference in their entirety.

BACKGROUND

1. Technical Field

Various embodiments of the present disclosure relate to processing-in-memory (PIM) systems and, more particularly, to PIM systems including a PIM device and a controller and methods of operating the PIM systems.

2. Related Art

Recently, interest in artificial intelligence (AI) has been increasing not only in the information technology industry but also in the financial and medical industries. Accordingly, in various fields, artificial intelligence, more precisely, the introduction of deep learning, is considered and prototyped. In general, techniques for effectively learning deep neural networks (DNNs) or deep networks having increased layers as compared with general neural networks to utilize the deep neural networks (DNNs) or the deep networks in pattern recognition or inference are commonly referred to as deep learning.

One cause of this widespread interest may be the improved performance of processors performing arithmetic operations. To improve the performance of artificial intelligence, it may be necessary to increase the number of layers constituting a neural network in the artificial intelligence to educate the artificial intelligence. This trend has continued in recent years, which has led to an exponential increase in the amount of computation required for the hardware that actually does the computation. Moreover, if the artificial intelligence employs a general hardware system including memory and a processor which are separated from each other, the performance of the artificial intelligence may be degraded due to limitation of the amount of data communication between the memory and the processor. In order to solve this problem, a PIM device in which a processor and memory are integrated in one semiconductor chip has been used as a neural network computing device. Because the PIM device directly performs arithmetic operations internally, data processing speed in the neural network may be improved.

SUMMARY

According to an embodiment, a processing-in-memory (PIM) system may include a plurality of PIM devices, a plurality of PIM controllers configured to control respective ones of the plurality of PIM devices, and an interface coupled between a host and the plurality of PIM controllers. The interface may be configured to transmit first request data to a target PIM controller corresponding to one of the plurality of PIM controllers for execution of a first request output from the host. The interface may be configured to transmit second request data to all of the plurality of PIM controllers for execution of a second request output from the host.

BRIEF DESCRIPTION OF THE DRAWINGS

Certain features of the disclosed technology are illustrated in various embodiments with reference to the attached drawings.

FIG. 34 is a table illustrating operations of PIM devices performed according to various requests generated by a host of the PIM system illustrated in FIG. 31.

DETAILED DESCRIPTION

In the following description of embodiments, it will be understood that the terms "first" and "second" are intended to identify elements, but not used to define a particular number or sequence of elements. In addition, when an element is referred to as being located "on," "over," "above," "under," or "beneath" another element, it is intended to mean a relative positional relationship, but not used to limit certain cases in which the element directly contacts the other element, or at least one intervening element is present therebetween. Accordingly, the terms such as "on," "over," "above," "under," "beneath," "below," and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may be electrically or mechanically connected or coupled to the other element indirectly with one or more additional elements therebetween.

Various embodiments are directed to PIM systems and methods of operating the PIM systems.

Figure 1:
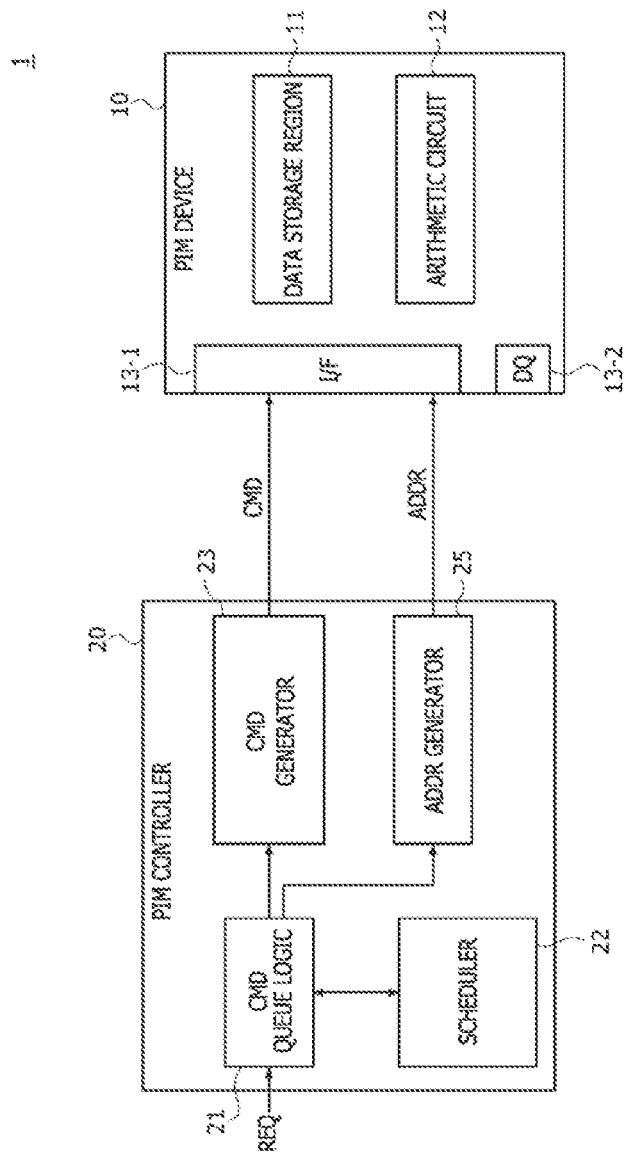
FIG. 1 is a block diagram illustrating a PIM system according to an embodiment of the present disclosure.

FIG. 1 is a block diagram illustrating a PIM system according to an embodiment of the present disclosure. As illustrated in FIG. 1, the PIM system 1 may include a PIM device 10 and a PIM controller 20. The PIM device 10 may include a data storage region 11, an arithmetic circuit 12, an interface (I/F) 13-1, and a data (DQ) input/output (I/O) pad 13-2. The data storage region 11 may include a first storage region and a second storage region. In an embodiment, the first storage region and the second storage region may be a first memory bank and a second memory bank, respectively. In another embodiment, the first data storage region and the second storage region may be a memory bank and buffer memory, respectively. The data storage region 11 may include a volatile memory element or a non-volatile memory element. For an embodiment, the data storage region 11 may include both a volatile memory element and a non-volatile memory element.

The arithmetic circuit 12 may perform an arithmetic operation on the data transferred from the data storage region 11. In an embodiment, the arithmetic circuit 12 may include a multiplying-and-accumulating (MAC) operator. The MAC operator may perform a multiplying calculation on the data transferred from the data storage region 11 and perform an accumulating calculation on the multiplication result data. After MAC operations, the MAC operator may output MAC result data. The MAC result data may be stored in the data storage region 11 or output from the PIM device through the data I/O pad 13-2.

The interface 13-1 of the PIM device 10 may receive a command CMD and address ADDR from the PIM controller 20. The interface 13-1 may output the command CMD to the data storage region 11 or the arithmetic circuit 12 in the PIM device 10. The interface 13-1 may output the address ADDR to the data storage region 11 in the PIM device 10. The data I/O pad 13-2 of the PIM device 10 may function as a data communication terminal between a device external to the PIM device 10, for example the PIM controller 20, and the data storage region 11 included in the PIM device 10. The external device to the PIM device 10 may correspond to the PIM controller 20 of the PIM system 1 or a host located outside the PIM system 1. Accordingly, data output from the host or the PIM controller 20 may be input into the PIM device 10 through the data I/O pad 13-2.

The PIM controller 20 may control operations of the PIM device 10. In an embodiment, the PIM controller 20 may control the PIM device 10 such that the PIM device 10 operates in a memory mode or an arithmetic mode. In the event that the PIM controller controls the PIM device 10 such that the PIM device 10 operates in the memory mode, the PIM device 10 may perform a data read operation or a data write operation for the data storage region 11. In the event that the PIM controller 20 controls the PIM device 10 such that the PIM device 10 operates in the arithmetic mode, the arithmetic circuit 12 of the PIM device 10 may receive first data and second data from the data storage region 11 to perform an arithmetic operation. In the event that the PIM controller 20 controls the PIM device 10 such that the PIM device 10 operates in the arithmetic mode, the PIM device 10 may also perform the data read operation and the data write operation for the data storage region 11 to execute the arithmetic operation. The arithmetic operation may be a deterministic arithmetic operation performed during a predetermined fixed time. The word "predetermined" as used herein with respect to a parameter, such as a predetermined fixed time or time period, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

The PIM controller 20 may be configured to include command queue logic 21, a scheduler 22, a command (CMD) generator 23, and an address (ADDR) generator 25. The command queue logic 21 may receive a request REQ from an external device (e.g., a host of the PIM system 1) and store the command queue corresponding to the request REQ in the command queue logic 21. The command queue logic 21 may transmit information on a storage status of the command queue to the scheduler 22 whenever the command queue logic 21 stores the command queue. The command queue stored in the command queue logic 21 may be transmitted to the command generator 23 according to a sequence determined by the scheduler 22. The command queue logic 21, and also the command queue logic 210 of FIGS. 2 and 20, may be implemented as hardware, software, or a combination of hardware and software. For example, the command queue logic 21 and/or 210 may be a command queue logic circuit operating in accordance with an algorithm and/or a processor executing command queue logic code.

The scheduler 22 may adjust a sequence of the command queue when the command queue stored in the command queue logic 21 is output from the command queue logic 21. In order to adjust the output sequence of the command queue stored in the command queue logic 21, the scheduler 22 may analyze the information on the storage status of the command queue provided by the command queue logic 21 and may readjust a process sequence of the command queue so that the command queue is processed according to a proper sequence.

The command generator 23 may receive the command queue related to the memory mode of the PIM device 10 and the MAC mode of the PIM device 10 from the command queue logic 21. The command generator 23 may decode the command queue to generate and output the command CMD. The command CMD may include a memory command for the memory mode or an arithmetic command for the arithmetic mode. The command CMD output from the command generator 23 may be transmitted to the PIM device 10.

The command generator 23 may be configured to generate and transmit the memory command to the PIM device 10 in the memory mode. The command generator 23 may be configured to generate and transmit a plurality of arithmetic commands to the PIM device 10 in the arithmetic mode. In one example, the command generator 23 may be configured to generate and output first to fifth arithmetic commands with predetermined time intervals in the arithmetic mode. The first arithmetic command may be a control signal for reading the first data out of the data storage region 11. The second arithmetic command may be a control signal for reading the second data out of the data storage region 11. The third arithmetic command may be a control signal for latching the first data in the arithmetic circuit 12. The fourth arithmetic command may be a control signal for latching the second data in the arithmetic circuit 12. And the fifth MAC command may be a control signal for latching arithmetic result data of the arithmetic circuit 12.

The address generator 25 may receive address information from the command queue logic 21 and generate the address ADDR for accessing a region in the data storage region 11. In an embodiment, the address ADDR may include a bank address, a row address, and a column address. The address ADDR output from the address generator 25 may be input to the data storage region 11 through the interface (I/F) 13-1.

Figure 2:
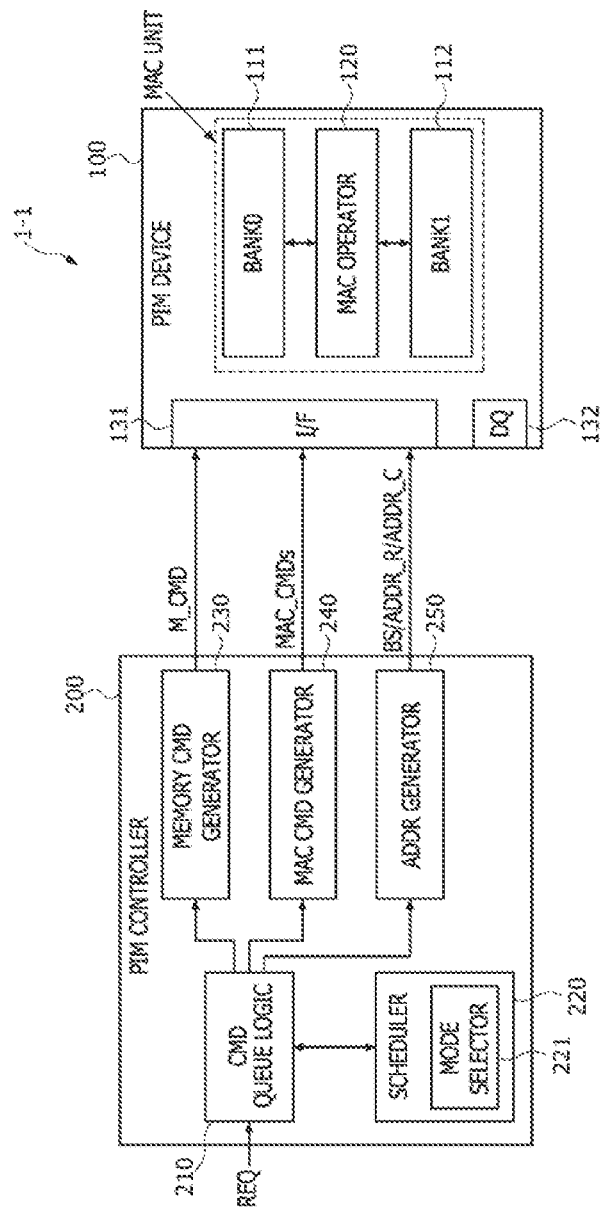
FIG. 2 is a block diagram illustrating a PIM system according to a first embodiment of the present disclosure.

FIG. 2 is a block diagram illustrating a PIM system 1-1 according to a first embodiment of the present disclosure. As illustrated in FIG. 2, the PIM system 1-1 may include a PIM device 100 and a PIM controller 200. The PIM device 100 may include a first memory bank (BANK0) 111, a second memory bank (BANK1) 112, a MAC operator 120, an interface (I/F) 131, and a data input/output (I/O) pad 132. For an embodiment, the MAC operator 120 represents a MAC operator circuit. The first memory bank (BANK0) 111, the second memory bank (BANK1) 112, and the MAC operator 120 included in the PIM device 100 may constitute one MAC unit. In another embodiment, the PIM device 100 may include a plurality of MAC units. The first memory bank (BANK0) 111 and the second memory bank (BANK1) 112 may represent a memory region for storing data, for example, a DRAM device. Each of the first memory bank (BANK0) 111 and the second memory bank (BANK1) 112 may be a component unit which is independently activated and may be configured to have the same data bus width as data I/O lines in the PIM device 100. In an embodiment, the first and second memory banks 111 and 112 may operate through interleaving such that an active operation of the first and second memory banks 111 and 112 is performed in parallel while another memory bank is selected. Each of the first and second memory banks 111 and 112 may include at least one cell array which includes memory unit cells located at cross points of a plurality of rows and a plurality of columns.

Although not shown in the drawings, a core circuit may be disposed adjacent to the first and second memory banks 111 and 112. The core circuit may include X-decoders XDECs and Y-decoders/IO circuits YDEC/IOs. An X-decoder XDEC may also be referred to as a word line decoder or a row decoder. The X-decoder XDEC may receive a row address ADD_R from the PIM controller 200 and may decode the row address ADD_R to select and enable one of the rows (i.e., word lines) coupled to the selected memory bank. Each of the Y-decoders/IO circuits YDEC/IOs may include a Y-decoder YDEC and an I/O circuit IO. The Y-decoder YDEC may also be referred to as a bit line decoder or a column decoder. The Y-decoder YDEC may receive a column address ADDR_C from the PIM controller 200 and may decode the column address ADDR_C to select and enable at least one of the columns (i.e., bit lines) coupled to the selected memory bank. Each of the I/O circuits may include an I/O sense amplifier for sensing and amplifying a level of a read datum output from the corresponding memory bank during a read operation for the first and second memory banks 111 and 112. In addition, the I/O circuit may include a write driver for driving a write datum during a write operation for the first and second memory banks 111 and 112.

The interface 131 of the PIM device 100 may receive a memory command M_CMD, MAC commands MAC_CMDs, a bank selection signal BS, and the row/column addresses ADDR_R/ADDR_C from the PIM controller 200. The interface 131 may output the memory command M_CMD, together with the bank selection signal BS and the row/column addresses ADDR_R/ADDR_C, to the first memory bank 111 or the second memory bank 112. The interface 131 may output the MAC commands MAC_CMDs to the first memory bank 111, the second memory bank 112, and the MAC operator 120. In such a case, the interface 131 may output the bank selection signal BS and the row/column addresses ADDR_R/ADDR_C to both of the first memory bank 111 and the second memory bank 112. The data I/O pad 132 of the PIM device 100 may function as a data communication terminal between a device external to the PIM device 100 and the MAC unit (which includes the first and second memory banks 111 and 112 and the MAC operator 120) included in the PIM device 100. The external device to the PIM device 100 may correspond to the PIM controller 200 of the PIM system 1-1 or a host located outside the PIM system 1-1. Accordingly, data output from the host or the PIM controller 200 may be input into the PIM device 100 through the data I/O pad 132.

The PIM controller 200 may control operations of the PIM device 100. In an embodiment, the PIM controller 200 may control the PIM device 100 such that the PIM device 100 operates in a memory mode or a MAC mode. In the event that the PIM controller 200 controls the PIM device 100 such that the PIM device 100 operates in the memory mode, the PIM device 100 may perform a data read operation or a data write operation for the first memory bank 111 and the second memory bank 112. In the event that the PIM controller 200 controls the PIM device 100 such that the PIM device 100 operates in the MAC mode, the PIM device 100 may perform a MAC arithmetic operation for the MAC operator 120. In the event that the PIM controller 200 controls the PIM device 100 such that the PIM device 100 operates in the MAC mode, the PIM device 100 may also perform the data read operation and the data write operation for the first and second memory banks 111 and 112 to execute the MAC arithmetic operation.

The PIM controller 200 may be configured to include command queue logic 210, a scheduler 220, a memory command generator 230, a MAC command generator 240, and an address generator 250. The command queue logic 210 may receive a request REQ from an external device (e.g., a host of the PIM system 1-1) and store a command queue corresponding to the request REQ in the command queue logic 210. The command queue logic 210 may transmit information on a storage status of the command queue to the scheduler 220 whenever the command queue logic 210 stores the command queue. The command queue stored in the command queue logic 210 may be transmitted to the memory command generator 230 or the MAC command generator 240 according to a sequence determined by the scheduler 220. When the command queue output from the command queue logic 210 includes command information requesting an operation in the memory mode of the PIM device 100, the command queue logic 210 may transmit the command queue to the memory command generator 230. On the other hand, when the command queue output from the command queue logic 210 is command information requesting an operation in the MAC mode of the PIM device 100, the command queue logic 210 may transmit the command queue to the MAC command generator 240. Information on whether the command queue relates to the memory mode or the MAC mode may be provided by the scheduler 220.

The scheduler 220 may adjust a timing of the command queue when the command queue stored in the command queue logic 210 is output from the command queue logic 210. In order to adjust the output timing of the command queue stored in the command queue logic 210, the scheduler 220 may analyze the information on the storage status of the command queue provided by the command queue logic 210 and may readjust a process sequence of the command queue such that the command queue is processed according to a proper sequence. The scheduler 220 may output and transmit to the command queue logic 210 information on whether the command queue output from the command queue logic 210 relates to the memory mode of the PIM device 100 or relates to the MAC mode of the PIM device 100. In order to obtain the information on whether the command queue output from the command queue logic 210 relates to the memory mode or the MAC mode, the scheduler 220 may include a mode selector 221. The mode selector 221 may generate a mode selection signal including information on whether the command queue stored in the command queue logic 210 relates to the memory mode or the MAC mode, and the scheduler 220 may transmit the mode selection signal to the command queue logic 210.

The memory command generator 230 may receive the command queue related to the memory mode of the PIM device 100 from the command queue logic 210. The memory command generator 230 may decode the command queue to generate and output the memory command M_CMD. The memory command M_CMD output from the memory command generator 230 may be transmitted to the PIM device 100. In an embodiment, the memory command M_CMD may include a memory read command and a memory write command. When the memory read command is output from the memory command generator 230, the PIM device 100 may perform the data read operation for the first memory bank 111 or the second memory bank 112. Data which are read out of the PIM device 100 may be transmitted to an external device through the data I/O pad 132. The read data output from the PIM device 100 may be transmitted to a host through the PIM controller 200. When the memory write command is output from the memory command generator 230, the PIM device 100 may perform the data write operation for the first memory bank 111 or the second memory bank 112. In such a case, data to be written into the PIM device 100 may be transmitted from the host to the PIM device 100 through the PIM controller 200. The write data input to the PIM device 100 may be transmitted to the first memory bank 111 or the second memory bank 112 through the data I/O pad 132.

The MAC command generator 240 may receive the command queue related to the MAC mode of the PIM device 100 from the command queue logic 210. The MAC command generator 240 may decode the command queue to generate and output the MAC commands MAC_CMDs. The MAC commands MAC_CMDs output from the MAC command generator 240 may be transmitted to the PIM device 100. The data read operation for the first memory bank 111 and the second memory bank 112 of the PIM device 100 may be performed by the MAC commands MAC_CMDs output from the MAC command generator 240, and the MAC arithmetic operation of the MAC operator 120 may also be performed by the MAC commands MAC_CMDs output from the MAC command generator 240. The MAC commands MAC_CMDs and the MAC arithmetic operation of the PIM device 100 according to the MAC commands MAC_CMDs will be described in detail with reference to FIG. 3.

The address generator 250 may receive address information from the command queue logic 210. The address generator 250 may generate the bank selection signal BS for selecting one of the first and second memory banks 111 and 112 and may transmit the bank selection signal BS to the PIM device 100. In addition, the address generator 250 may generate the row address ADDR_R and the column address ADDR_C for accessing a region (e.g., memory cells) in the first or second memory bank 111 or 112 and may transmit the row address ADDR_R and the column address ADDR_C to the PIM device 100.

Figure 3:
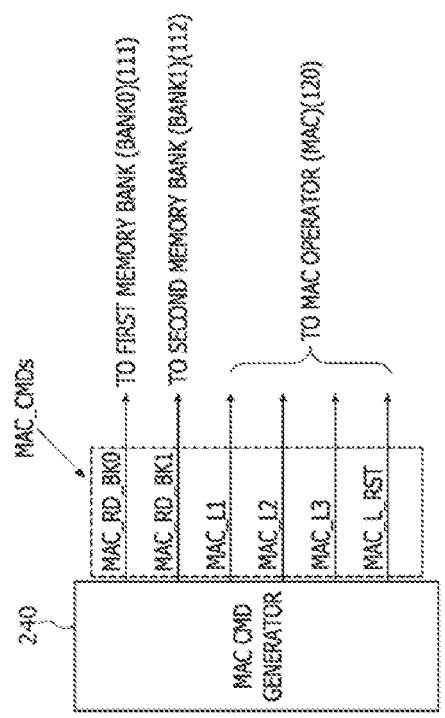
FIG. 3 illustrates MAC commands output from a MAC command generator of a PIM controller included in a PIM system according to a first embodiment of the present disclosure.

FIG. 3 illustrates the MAC commands MAC_CMDs output from the MAC command generator 240 included in the PIM system 1-1 according to the first embodiment of the present disclosure. As illustrated in FIG. 3, the MAC commands MAC_CMDs may include first to sixth MAC command signals. In an embodiment, the first MAC command signal may be a first MAC read signal MAC_RD_BK0, the second MAC command signal may be a second MAC read signal MAC_RD_BK1, the third MAC command signal may be a first MAC input latch signal MAC_L1, the fourth MAC command signal may be a second MAC input latch signal MAC_L2, the fifth MAC command signal may be a MAC output latch signal MAC_L3, and the sixth MAC command signal may be a MAC latch reset signal MAC_L_RST.

The first MAC read signal MAC_RD_BK0 may control an operation for reading first data (e.g., weight data) out of the first memory bank 111 to transmit the first data to the MAC operator 120. The second MAC read signal MAC_RD_BK1 may control an operation for reading second data (e.g., vector data) out of the second memory bank 112 to transmit the second data to the MAC operator 120. The first MAC input latch signal MAC_L1 may control an input latch operation of the weight data transmitted from the first memory bank 111 to the MAC operator 120. The second MAC input latch signal MAC_L2 may control an input latch operation of the vector data transmitted from the second memory bank 112 to the MAC operator 120. If the input latch operations of the weight data and the vector data are performed, the MAC operator 120 may perform the MAC arithmetic operation to generate MAC result data corresponding to the result of the MAC arithmetic operation. The MAC output latch signal MAC_L3 may control an output latch operation of the MAC result data generated by the MAC operator 120. And, the MAC latch reset signal MAC_L_RST may control an output operation of the MAC result data generated by the MAC operator 120 and a reset operation of an output latch included in the MAC operator 120.

The PIM system 1-1 according to the present embodiment may be configured to perform a deterministic MAC arithmetic operation. The term "deterministic MAC arithmetic operation" used in the present disclosure may be defined as the MAC arithmetic operation performed in the PIM system 1-1 during a predetermined fixed time. Thus, the MAC commands MAC_CMDs transmitted from the PIM controller 200 to the PIM device 100 may be sequentially generated with fixed time intervals. Accordingly, the PIM controller 200 does not require any extra end signals of various operations executed for the MAC arithmetic operation to generate the MAC commands MAC_CMDs for controlling the MAC arithmetic operation. In an embodiment, latencies of the various operations executed by MAC commands MAC_CMDs for controlling the MAC arithmetic operation may be set to have fixed values in order to perform the deterministic MAC arithmetic operation. In such a case, the MAC commands MAC_CMDs may be sequentially output from the PIM controller 200 with fixed time intervals corresponding to the fixed latencies.

For example, the MAC command generator 240 is configured to output the first MAC command at a first point in time. The MAC command generator 240 is configured to output the second MAC command at a second point in time when a first latency elapses from the first point in time. The first latency is set as the time it takes to read the first data out of the first storage region based on the first MAC command and to output the first data to the MAC operator. The MAC command generator 240 is configured to output the third MAC command at a third point in time when a second latency elapses from the second point in time. The second latency is set as the time it takes to read the second data out of the second storage region based on the second MAC command and to output the second data to the MAC operator. The MAC command generator 240 is configured to output the fourth MAC command at a fourth point in time when a third latency elapses from the third point in time. The third latency is set as the time it takes to latch the first data in the MAC operator based on the third MAC command. The MAC command generator 240 is configured to output the fifth MAC command at a fifth point in time when a fourth latency elapses from the fourth point in time. The fourth latency is set as the time it takes to latch the second data in the MAC operator based on the fourth MAC command and to perform the MAC arithmetic operation of the first and second data which are latched in the MAC operator. The MAC command generator 240 is configured to output the sixth MAC command at a sixth point in time when a fifth latency elapses from the fifth point in time. The fifth latency is set as the time it takes to perform an output latch operation of MAC result data generated by the MAC arithmetic operation.

Figure 4:
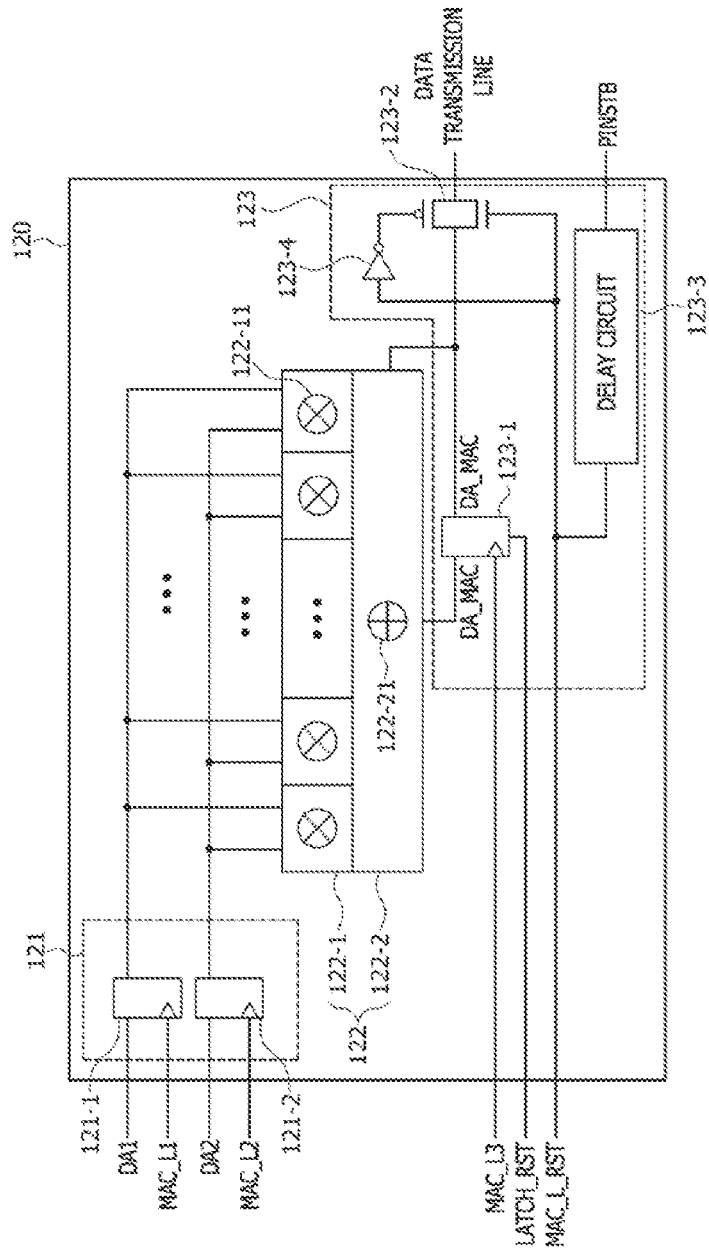
FIG. 4 is a block diagram illustrating an example of a configuration of a MAC operator of a PIM device included in a PIM system according to a first embodiment of the present disclosure.

FIG. 4 illustrates an example of the MAC operator 120 of the PIM device 100 included in the PIM system 1-1 according to the first embodiment of the present disclosure. Referring to FIG. 4, MAC operator 120 may be configured to include a data input circuit 121, a MAC circuit 122, and a data output circuit 123. The data input circuit 121 may include a first input latch 121-1 and a second input latch 121-2. The MAC circuit 122 may include a multiplication logic circuit 122-1 and an addition logic circuit 122-2. The data output circuit 123 may include an output latch 123-1, a transfer gate 123-2, a delay circuit 123-3, and an inverter 123-4. In an embodiment, the first input latch 121-1, the second input latch 121-2, and the output latch 123-1 may be realized using flip-flops.

The data input circuit 121 of the MAC operator 120 may be synchronized with the first MAC input latch signal MAC_L1 to latch first data DA1 transferred from the first memory bank 111 to the MAC circuit 122 through an internal data transmission line. In addition, the data input circuit 121 of the MAC operator 120 may be synchronized with the second MAC input latch signal MAC_L2 to latch second data DA2 transferred from the second memory bank 112 to the MAC circuit 122 through another internal data transmission line. Because the first MAC input latch signal MAC_L1 and the second MAC input latch signal MAC_L2 are sequentially transmitted from the MAC command generator 240 of the PIM controller 200 to the MAC operator 120 of the PIM device 100 with a predetermined time interval, the second data DA2 may be input to the MAC circuit 122 of the MAC operator 120 after the first data DA1 is input to the MAC circuit 122 of the MAC operator 120.

The MAC circuit 122 may perform the MAC arithmetic operation of the first data DA1 and the second data DA2 input through the data input circuit 121. The multiplication logic circuit 122-1 of the MAC circuit 122 may include a plurality of multipliers 122-11. Each of the multipliers 122-11 may perform a multiplying calculation of the first data DA1 output from the first input latch 121-1 and the second data DA2 output from the second input latch 121-2 and may output the result of the multiplying calculation. Bit values constituting the first data DA1 may be separately input to the multipliers 122-11. Similarly, bit values constituting the second data DA2 may also be separately input to the multipliers 122-11. For example, if the first data DA1 is represented by an 'N'-bit binary stream, the second data DA2 is represented by an 'N'-bit binary stream, and the number of the multipliers 122-11 is 'M', then 'N/M'-bit portions of the first data DA1 and 'N/M'-bit portions of the second data DA2 may be input to each of the multipliers 122-11.

The addition logic circuit 122-2 of the MAC circuit 122 may include a plurality of adders 122-21. Although not shown in the drawings, the plurality of adders 122-21 may be disposed to provide a tree structure including a plurality of stages. Each of the adders 122-21 disposed at a first stage may receive two sets of multiplication result data from two of the multipliers 122-11 included in the multiplication logic circuit 122-1 and may perform an adding calculation of the two sets of multiplication result data to output the addition result data. Each of the adders 122-21 disposed at a second stage may receive two sets of addition result data from two of the adders 122-21 disposed at the first stage and may perform an adding calculation of the two sets of addition result data to output the addition result data. The adder 122-21 disposed at a last stage may receive two sets of addition result data from two adders 122-21 disposed at the previous stage and may perform an adding calculation of the two sets of addition result data to output the addition result data. Although not shown in the drawings, the addition logic circuit 122-2 may further include an additional adder for performing an accumulative adding calculation of MAC result data DA_MAC output from the adder 122-21 disposed at the last stage and previous MAC result data DA_MAC stored in the output latch 123-1 of the data output circuit 123.

The data output circuit 123 may output the MAC result data DA_MAC output from the MAC circuit 122 to a data transmission line. Specifically, the output latch 123-1 of the data output circuit 123 may be synchronized with the MAC output latch signal MAC_L3 to latch the MAC result data DA_MAC output from the MAC circuit 122 and to output the latched data of the MAC result data DA_MAC. The MAC result data DA_MAC output from the output latch 123-1 may be fed back to the MAC circuit 122 for the accumulative adding calculation. In addition, the MAC result data DA_MAC may be input to the transfer gate 123-2. The output latch 123-1 may be initialized if a latch reset signal LATCH_RST is input to the output latch 123-1. In such a case, all of data latched by the output latch 123-1 may be removed. In an embodiment, the latch reset signal LATCH_RST may be activated by generation of the MAC latch reset signal MAC_L_RST and may be input to the output latch 123-1.

The MAC latch reset signal MAC_L_RST output from the MAC command generator 240 may be input to the transfer gate 123-2, the delay circuit 123-3, and the inverter 123-4. The inverter 123-4 may inversely buffer the MAC latch reset signal MAC_L_RST to output the inversely buffered signal of the MAC latch reset signal MAC_L_RST to the transfer gate 123-2. The transfer gate 123-2 may transfer the MAC result data DA_MAC from the output latch 123-1 to the data transmission line in response to the MAC latch reset signal MAC_L_RST. The delay circuit 123-3 may delay the MAC latch reset signal MAC_L_RST by a certain time to generate and output a latch control signal PINSTB.

Figure 5:
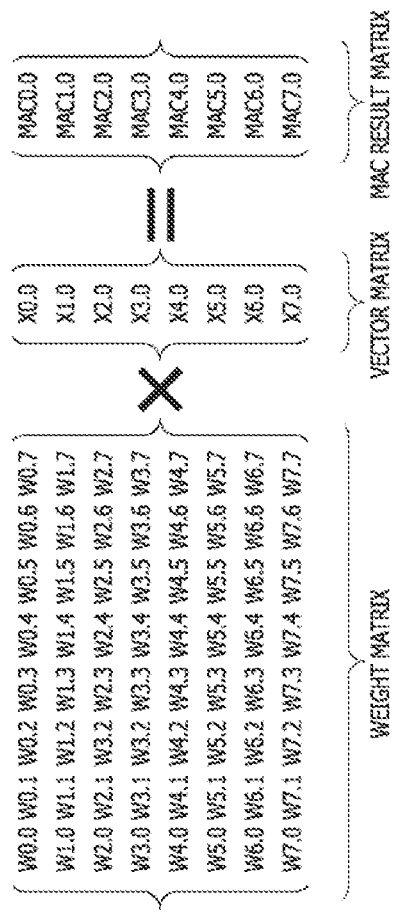
FIG. 5 illustrates an example of a MAC arithmetic operation performed in a PIM system according to a first embodiment of the present disclosure.

FIG. 5 illustrates an example of the MAC arithmetic operation performed in the PIM system 1-1 according to the first embodiment of the present disclosure. As illustrated in FIG. 5, the MAC arithmetic operation performed by the PIM system 1-1 may be executed though a matrix calculation. Specifically, the PIM device 100 may execute a matrix multiplying calculation of an 'M xN' weight matrix (e.g., '8×8' weight matrix) and a 'N×1' vector matrix (e.g., '8×1' vector matrix) according to control of the PIM controller 200 (where, 'M' and 'N' are natural numbers). Elements W0.0, . . . , and W7.7 constituting the weight matrix may correspond to the first data DA1 input to the MAC operator 120 from the first memory bank 111. Elements X0.0, . . . , and X7.0 constituting the vector matrix may correspond to the second data DA2 input to the MAC operator 120 from the second memory bank 112. Each of the elements W0.0, . . . , and W7.7 constituting the weight matrix may be represented by a binary stream having a plurality of bit values. In addition, each of the elements X0.0, . . . , and X7.0 constituting the vector matrix may also be represented by a binary stream having a plurality of bit values. The number of bits included in each of the elements W0.0, . . . , and W7.7 constituting the weight matrix may be equal to the number of bits included in each of the elements X0.0, . . . , and X7.0 constituting the vector matrix.

The matrix multiplying calculation of the weight matrix and the vector matrix may be appropriate for a multilayer perceptron-type neural network structure (hereinafter, referred to as an 'MLP-type neural network'). In general, the MLP-type neural network for executing deep learning may include an input layer, a plurality of hidden layers (e.g., at least three hidden layers), and an output layer. The matrix multiplying calculation (i.e., the MAC arithmetic operation)

of the weight matrix and the vector matrix illustrated in FIG. 5 may be performed in one of the hidden layers. In a first hidden layer of the plurality of hidden layers, the MAC arithmetic operation may be performed using vector data input to the first hidden layer. However, in each of second to last hidden layers among the plurality of hidden layers, the MAC arithmetic operation may be performed using a calculation result of the previous hidden layer as the vector data.

Figure 6:
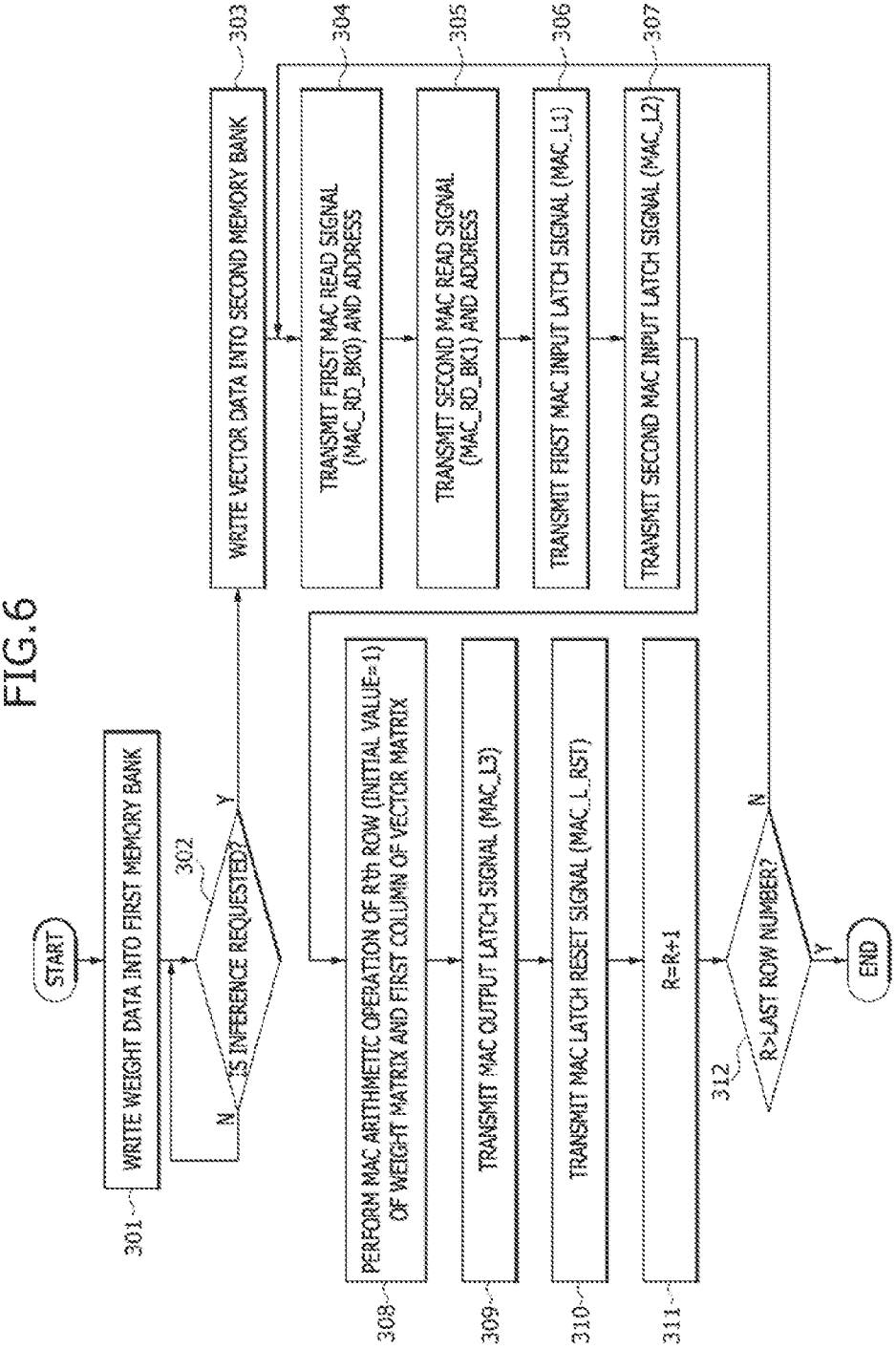
FIG. 6 is a flowchart illustrating processes of the MAC arithmetic operation illustrated in FIG. 5 in a PIM system according to a first embodiment of the present disclosure.

FIG. 6 is a flowchart illustrating processes of the MAC arithmetic operation described with reference to FIG. 5, which are performed in the PIM system 1-1 according to the first embodiment of the present disclosure. In addition, FIGS. 7 to 13 are block diagrams illustrating the processes of the MAC arithmetic operation illustrated in FIG. 5, which are performed in the PIM system 1-1 according to the first embodiment of the present disclosure. Referring to FIGS. 6 to 13, before the MAC arithmetic operation is performed, the first data (i.e., the weight data) may be written into the first memory bank 111 at a step 301. Thus, the weight data may be stored in the first memory bank 111 of the PIM device 100. In the present embodiment, it may be assumed that the weight data are the elements W0.0, . . . , and W7.7 constituting the weight matrix of FIG. 5. The integer before the decimal point is one less than a row number, and the integer after the decimal point is one less than a column number. Thus, for example, the weight W0.0 represents the element of the first row and the first column of the weight matrix.

At a step 302, whether an inference is requested may be determined. An inference request signal may be transmitted from an external device located outside of the PIM system 1-1 to the PIM controller 200 of the PIM system 1-1. An inference request, in some instances, may be based on user input. An inference request may initiate a calculation performed by the PIM system 1-1 to reach a determination based on input data. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 5. If the inference request signal is transmitted to the PIM controller 200 at the step 302, then the PIM controller 200 may write the vector data transmitted with the inference request signal into the second memory bank 112 at a step 303. Accordingly, the vector data may be stored in the second memory bank 112 of the PIM device 100.

Figure 7:
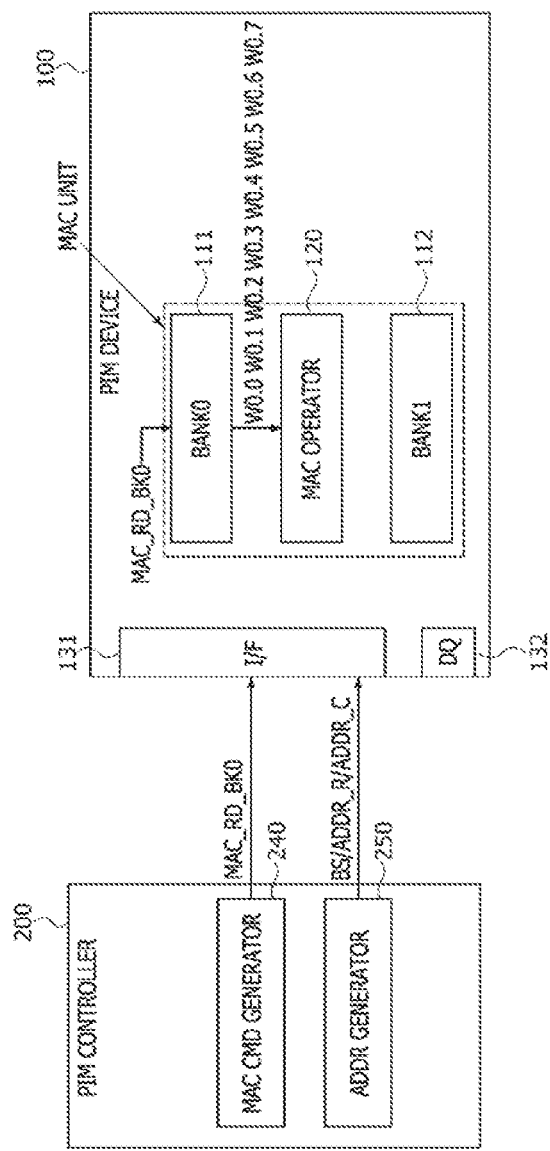
FIGS. 7 to 13 are block diagrams illustrating processes of the MAC arithmetic operation illustrated in FIG. 5 in a PIM system according to a first embodiment of the present disclosure.

At a step 304, the MAC command generator 240 of the PIM controller 200 may generate and transmit the first MAC read signal MAC_RD_BK0 to the PIM device 100, as illustrated in FIG. 7. In such a case, the address generator 250 of the PIM controller 200 may generate and transmit the bank selection signal BS and the row/column address ADDR_R/ADDR_C to the PIM device 100. The bank selection signal BS may be generated to select the first memory bank 111 of the first and second memory banks 111 and 112. Thus, the first MAC read signal MAC_RD_BK0 may control the data read operation for the first memory bank 111 of the PIM device 100. The first memory bank 111 may output and transmit the elements W0.0, . . . , and W0.7 in the first row of the weight matrix of the weight data stored in a region of the first memory bank 111, which is selected by the row/column address ADDR_R/ADDR_C, to the MAC operator 120 in response to the first MAC read signal MAC_RD_BK0. In an embodiment, the data transmission from the first memory bank 111 to the MAC operator 120 may be executed through a global input/output (hereinafter, referred to as 'GIO') line which is provided as a data transmission path in the PIM device 100. Alternatively, the data transmission from the first memory bank 111 to the MAC operator 120 may be executed through a first bank input/output (hereinafter, referred to as 'BIO') line which is provided specifically for data transmission between the first memory bank 111 and the MAC operator 120.

Figure 8:
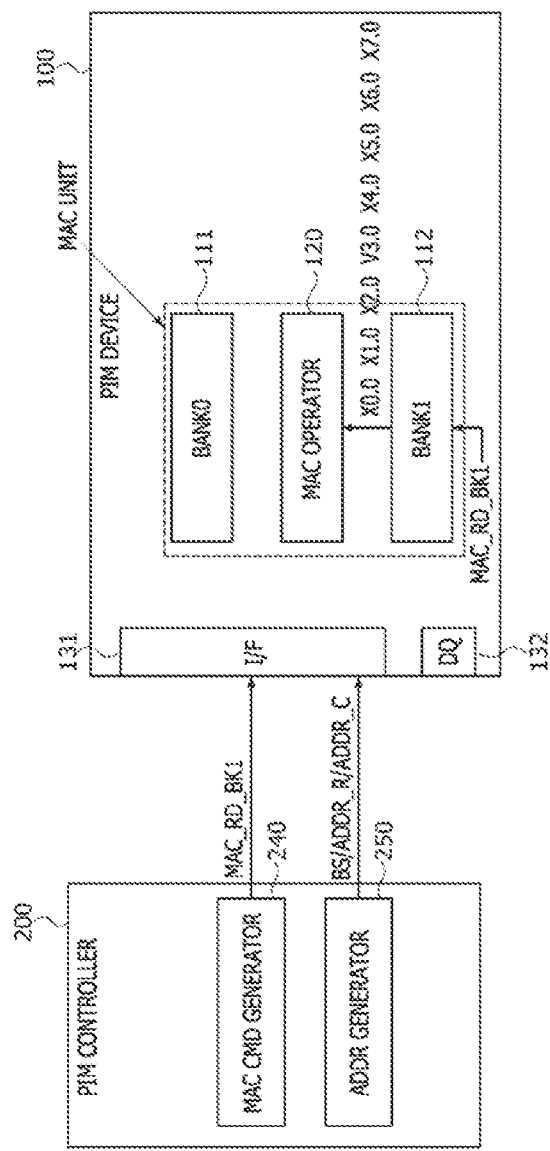

At a step 305, the MAC command generator 240 of the PIM controller 200 may generate and transmit the second MAC read signal MAC_RD_BK1 to the PIM device 100, as illustrated in FIG. 8. In such a case, the address generator 250 of the PIM controller 200 may generate and transmit the bank selection signal BS for selecting the second memory bank 112 and the row/column address ADDR_R/ADDR_C to the PIM device 100. The second MAC read signal MAC_RD_BK1 may control the data read operation for the second memory bank 112 of the PIM device 100. The second memory bank 112 may output and transmit the elements X0.0, . . . , and X7.0 in the first column of the vector matrix corresponding to the vector data stored in a region of the second memory bank 112, which is selected by the row/column address ADDR_R/ADDR_C, to the MAC operator 120 in response to the second MAC read signal MAC_RD_BK1. In an embodiment, the data transmission from the second memory bank 112 to the MAC operator 120 may be executed through the GIO line in the PIM device 100. Alternatively, the data transmission from the second memory bank 112 to the MAC operator 120 may be executed through a second BIO line which is provided specifically for data transmission between the second memory bank 112 and the MAC operator 120.

Figure 9:
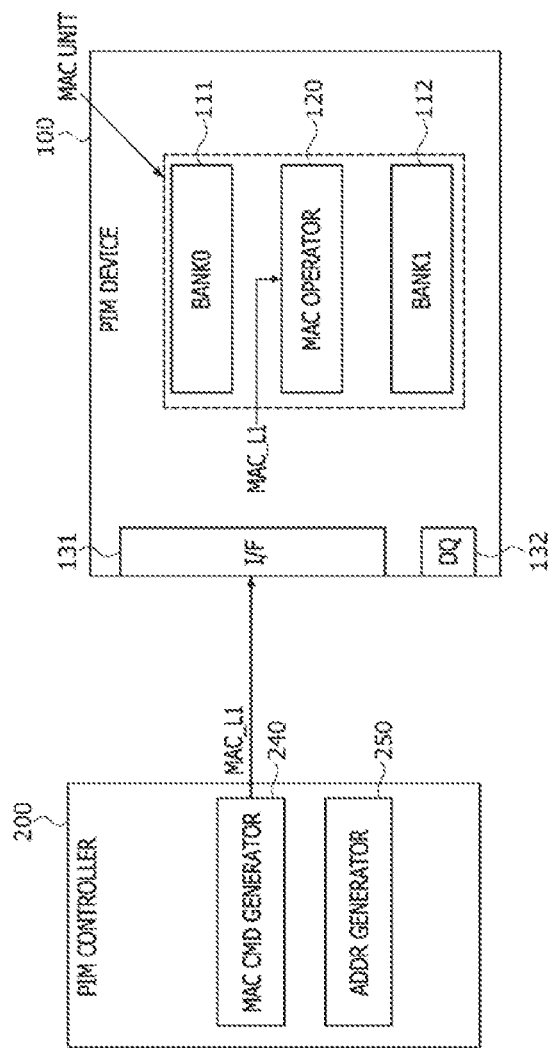
Figure 11:
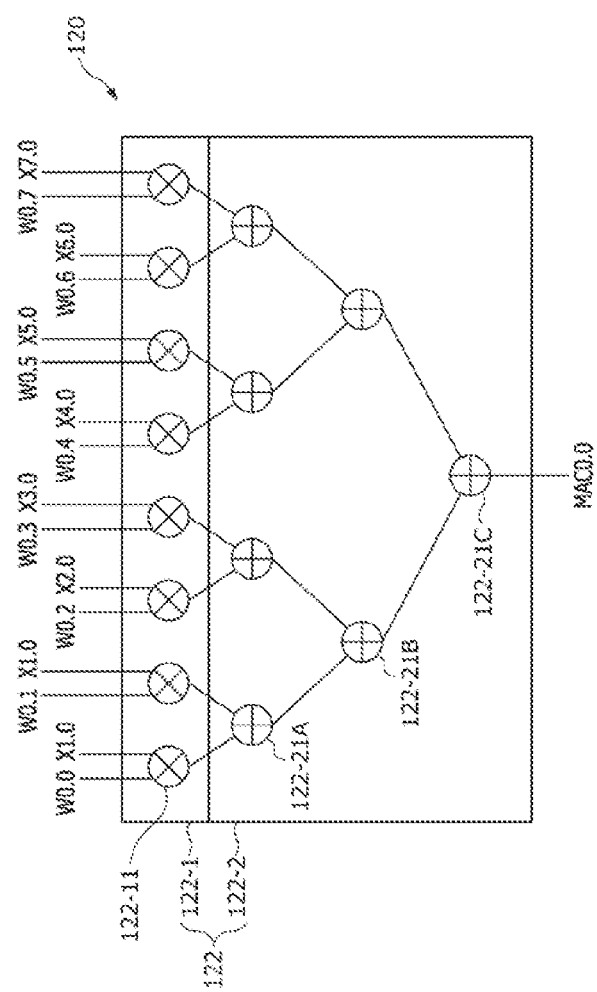

At a step 306, the MAC command generator 240 of the PIM controller 200 may generate and transmit the first MAC input latch signal MAC_L1 to the PIM device 100, as illustrated in FIG. 9. The first MAC input latch signal MAC_L1 may control the input latch operation of the first data for the MAC operator 120 of the PIM device 100. The elements W0.0, . . . , and W0.7 in the first row of the weight matrix may be input to the MAC circuit 122 of the MAC operator 120 by the input latch operation, as illustrated in FIG. 11. The MAC circuit 122 may include the plurality of multipliers 122-11 (e.g., eight multipliers 122-11), the number of which is equal to the number of columns of the weight matrix. In such a case, the elements W0.0, . . . , and W0.7 in the first row of the weight matrix may be input to the eight multipliers 122-11, respectively.

Figure 10:
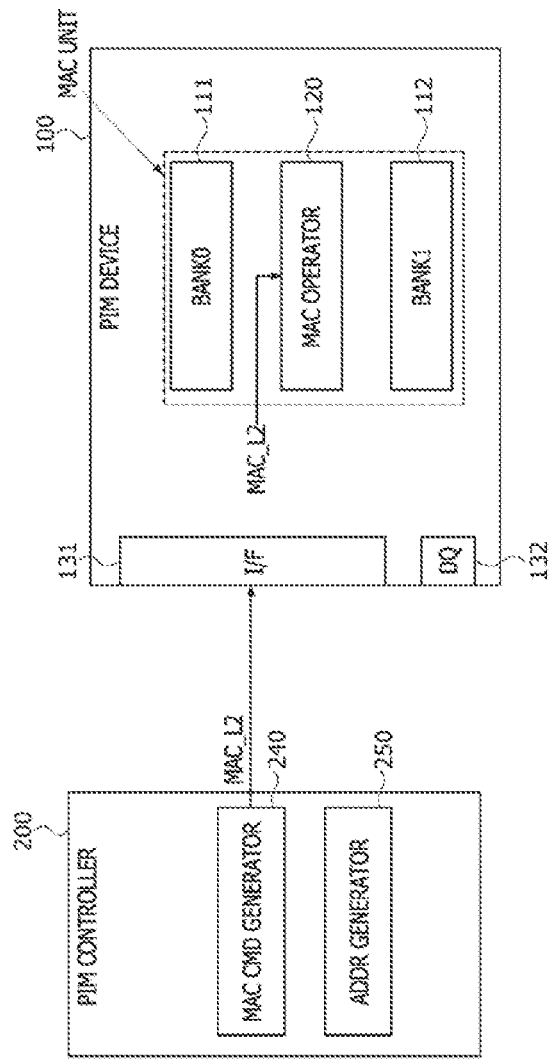

At a step 307, the MAC command generator 240 of the PIM controller 200 may generate and transmit the second MAC input latch signal MAC_L2 to the PIM device 100, as illustrated in FIG. 10. The second MAC input latch signal MAC_L2 may control the input latch operation of the second data for the MAC operator 120 of the PIM device 100. The elements X0.0, . . . , and X7.0 in the first column of the vector matrix may be input to the MAC circuit 122 of the MAC operator 120 by the input latch operation, as illustrated in FIG. 11. In such a case, the elements X0.0, . . . , and X7.0 in the first column of the vector matrix may be input to the eight multipliers 122-11, respectively.

At a step 308, the MAC circuit 122 of the MAC operator 120 may perform the MAC arithmetic operation of an $R^{th}$ row of the weight matrix and the first column of the vector matrix, which are input to the MAC circuit 122. An initial value of 'R' may be set as '1'. Thus, the MAC arithmetic operation of the first row of the weight matrix and the first column of the vector matrix may be performed a first time. For example, the scalar product is calculated of the Rth '1×N' row vector of the 'M×N' weight matrix and the 'N×1' vector matrix as an 'R×1' element of the 'M×1' MAC result matrix. For R=1, the scalar product of the first row of the weight matrix and the first column of the vector matrix shown in FIG. 5 is W0.0*X0.0+W0.1*X1.0+W0.2*X2.0+ W0.3*X3.0+W0.4*X4.0+W0.5*X5.0+W0.6*X6.0+ W0.7*X7.0. Specifically, each of the multipliers 122-11 of the multiplication logic circuit 122-1 may perform a multiplying calculation of the input data, and the result data of the multiplying calculation may be input to the addition logic circuit 122-2. The addition logic circuit 122-2, as illustrated in FIG. 11, may include four adders 122-21A disposed at a first stage, two adders 122-21B disposed at a second stage, and an adder 122-21C disposed at a third stage.

Each of the adders 122-21A disposed at the first stage may receive output data of two of the multipliers 122-11 and may perform an adding calculation of the output data of the two multipliers 122-11 to output the result of the adding calculation. Each of the adders 122-21B disposed at the second stage may receive output data of two of the adders 122-21A disposed at the first stage and may perform an adding calculation of the output data of the two adders 122-21A to output the result of the adding calculation. The adder 122-21C disposed at the third stage may receive output data of two of the adders 122-21B disposed at the second stage and may perform an adding calculation of the output data of the two adders 122-21B to output the result of the adding calculation. The output data of the addition logic circuit 122-2 may correspond to result data (i.e., MAC result data) of the MAC arithmetic operation of the first row included in the weight matrix and the column included in the vector matrix. Thus, the output data of the addition logic circuit 122-2 may correspond to an element MAC0.0 located at a first row of an '8×1' MAC result matrix having eight elements of MAC0.0, . . . , and MAC7.0, as illustrated in FIG. 5. The output data MAC0.0 of the addition logic circuit 122-2 may be input to the output latch 123-1 disposed in the data output circuit 123 of the MAC operator 120, as described with reference to FIG. 4.

Figure 12:
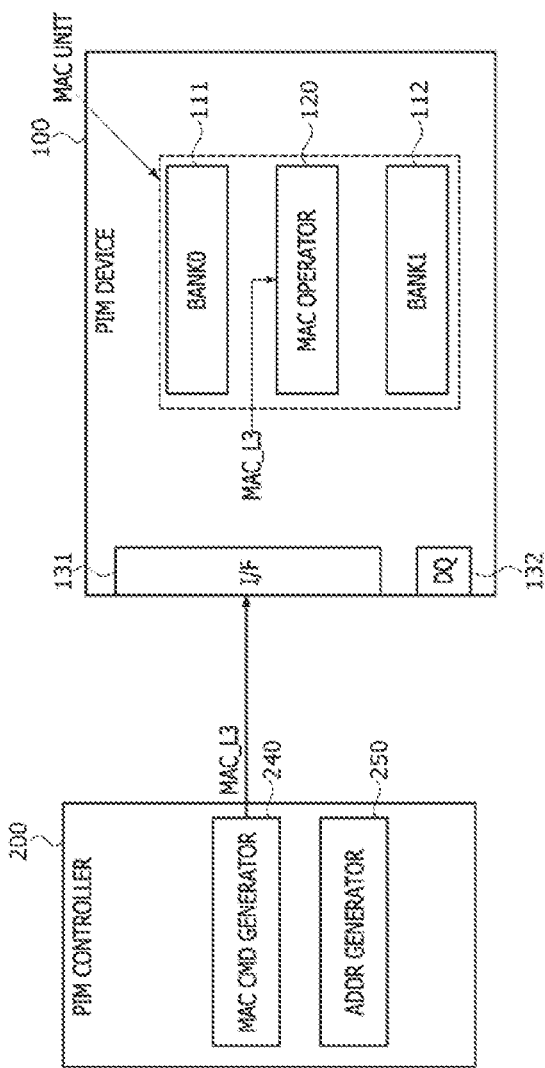

At a step 309, the MAC command generator 240 of the PIM controller 200 may generate and transmit the MAC output latch signal MAC_L3 to the PIM device 100, as illustrated in FIG. 12. The MAC output latch signal MAC_L3 may control the output latch operation of the MAC result data MAC0.0 performed by the MAC operator 120 of the PIM device 100. The MAC result data MAC0.0 input from the MAC circuit 122 of the MAC operator 120 may be output from the output latch 123-1 in synchronization with the MAC output latch signal MAC_L3, as described with reference to FIG. 4. The MAC result data MAC0.0 output from the output latch 123-1 may be input to the transfer gate 123-2 of the data output circuit 123.

Figure 13:
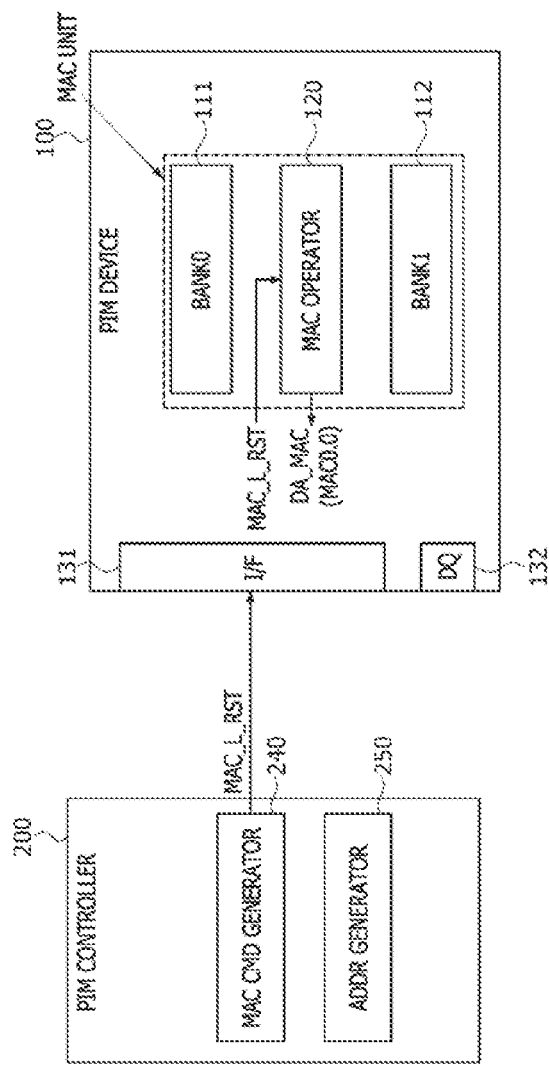

At a step 310, the MAC command generator 240 of the PIM controller 200 may generate and transmit the MAC latch reset signal MAC_L_RST to the PIM device 100, as illustrated in FIG. 13. The MAC latch reset signal MAC_L_RST may control an output operation of the MAC result data MAC0.0 generated by the MAC operator 120 and a reset operation of the output latch included in the MAC operator 120. As described with reference to FIG. 4, the transfer gate 123-2 receiving the MAC result data MAC0.0 from the output latch 123-1 of the MAC operator 120 may be synchronized with the MAC latch reset signal MAC_L_RST to output the MAC result data MAC0.0. In an embodiment, the MAC result data MAC0.0 output from the MAC operator 120 may be stored into the first memory bank 111 or the second memory bank 112 through the first BIO line or the second BIO line in the PIM device 100.

At a step 311, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 311. At a step 312, whether the row number changed at the step 311 is greater than the row number of the last row (i.e., the eighth row of the current example) of the weight matrix may be determined. Because the row number of the weight matrix is changed to '2' at the step 311, a process of the MAC arithmetic operation may be fed back to the step 304.

If the process of the MAC arithmetic operation is fed back to the step 304 from the step 312, then the same processes as described with reference to the steps 304 to 310 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 304 at the step 312, then the processes from the step 304 to the step 311 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 311, the MAC arithmetic operation may terminate because the row number of '9' is greater than the last row number of '8' at the step 312.

Figure 14:
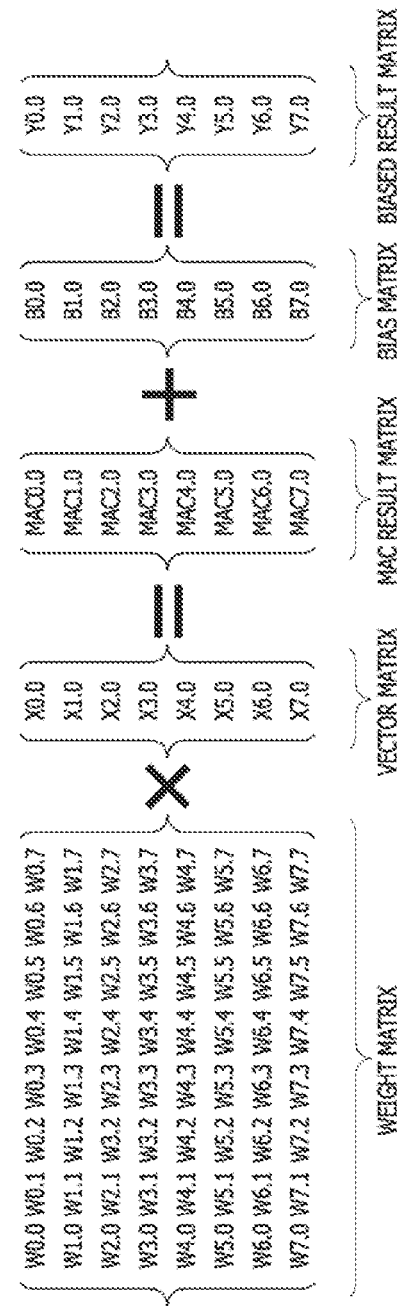
FIG. 14 illustrates another example of a MAC arithmetic operation performed in a PIM system according to a first embodiment of the present disclosure.

FIG. 14 illustrates another example of a MAC arithmetic operation performed in the PIM system 1-1 according to the first embodiment of the present disclosure. As illustrated in FIG. 14, the MAC arithmetic operation performed by the PIM system 1-1 may further include an adding calculation of the MAC result matrix and a bias matrix. Specifically, as described with reference to FIG. 5, the PIM device 100 may execute the matrix multiplying calculation of the '8×8' weight matrix and the '8×1' vector matrix according to control of the PIM controller 200. As a result of the matrix multiplying calculation of the '8×8' weight matrix and the '8×1' vector matrix, the '8×1' MAC result matrix having the eight elements MAC0.0, . . . , and MAC7.0 may be generated. The '8×1' MAC result matrix may be added to a '8×1' bias matrix. The '8×1' bias matrix may have elements B0.0, . . . , and B7.0 corresponding to bias data. The bias data may be set to reduce an error of the MAC result matrix. As a result of the adding calculation of the MAC result matrix and the bias matrix, a '8×1' biased result matrix having eight elements Y0.0, . . . , and Y7.0 may be generated.

Figure 15:
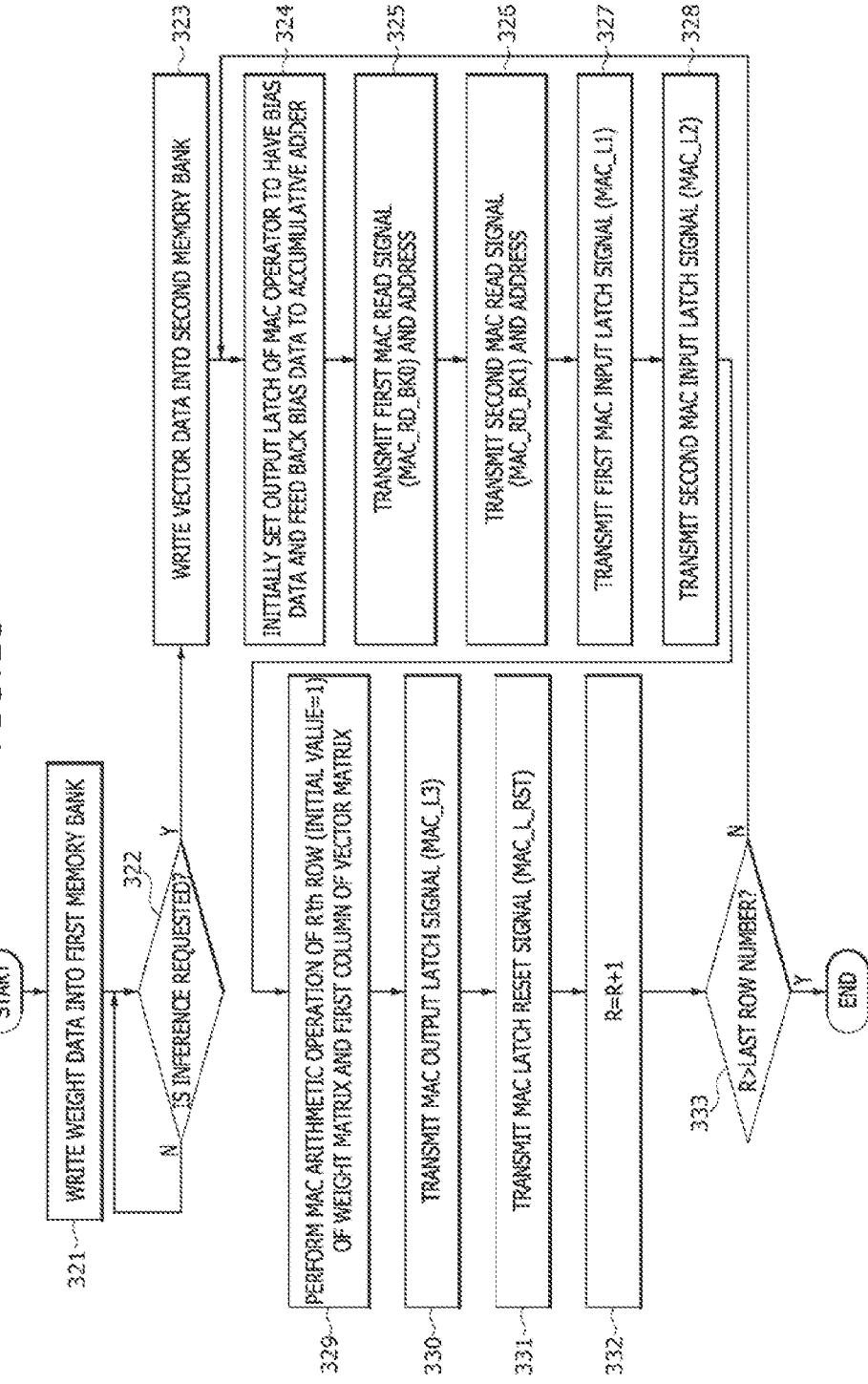
FIG. 15 is a flowchart illustrating processes of the MAC arithmetic operation illustrated in FIG. 14 in a PIM system according to a first embodiment of the present disclosure.
Figure 16:
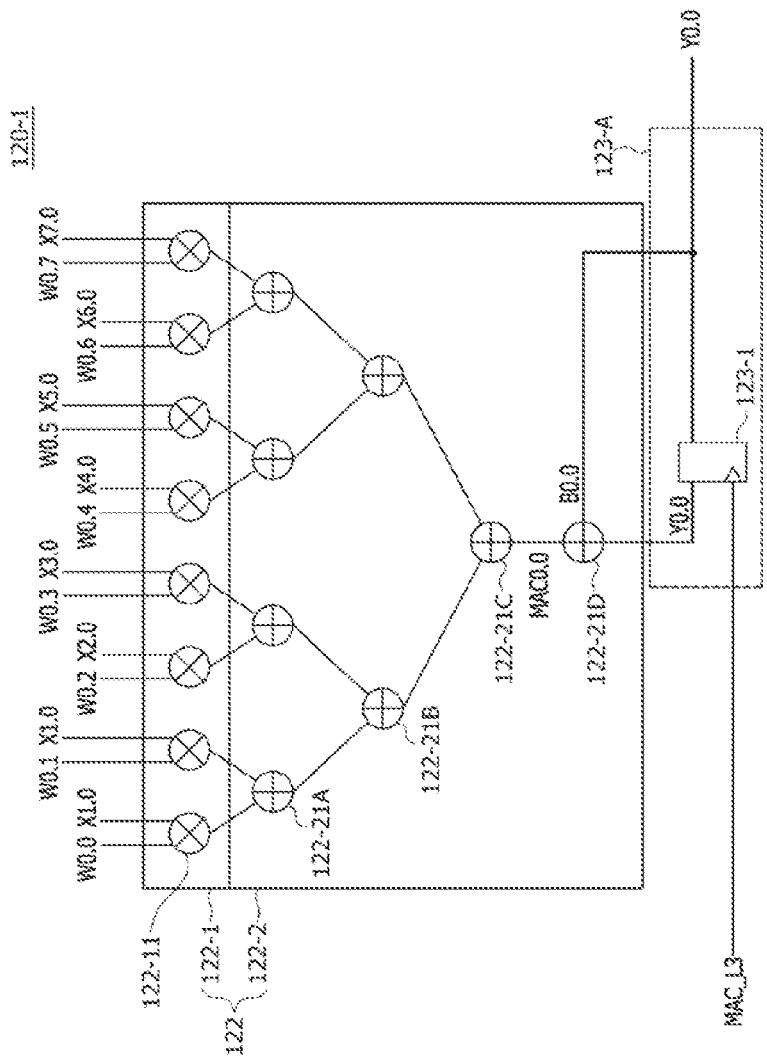
FIG. 16 illustrates an example of a configuration of a MAC operator for performing the MAC arithmetic operation of FIG. 14 in a PIM system according to a first embodiment of the present disclosure.

FIG. 15 is a flowchart illustrating processes of the MAC arithmetic operation described with reference to FIG. 14 in the PIM system 1-1 according to the first embodiment of the present disclosure. Moreover, FIG. 16 illustrates an example of a configuration of a MAC operator 120-1 for performing the MAC arithmetic operation of FIG. 14 in the PIM system 1-1 according to the first embodiment of the present disclosure. In FIG. 16, the same reference numerals or the same reference symbols as used in FIG. 4 denote the same elements, and the detailed descriptions of the same elements as indicated in the previous embodiment will be omitted hereinafter. Referring to FIG. 15, the first data (i.e., the weight data) may be written into the first memory bank 111 at a step 321 to perform the MAC arithmetic operation in the PIM device 100. Thus, the weight data may be stored in the first memory bank 111 of the PIM device 100. In the present embodiment, it may be assumed that the weight data are the elements W0.0, . . . , and W7.7 constituting the weight matrix of FIG. 14.

At a step 322, whether an inference is requested may be determined. An inference request signal may be transmitted from an external device located outside of the PIM system 1-1 to the PIM controller 200 of the PIM system 1-1. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 14. If the inference request signal is transmitted to the PIM controller 200 at the step 322, the PIM controller 200 may write the vector data transmitted with the inference request signal into the second memory bank 112 at a step 323. Accordingly, the vector data may be stored in the second memory bank 112 of the PIM device 100.

At a step 324, the output latch of the MAC operator may be initially set to have the bias data and the initially set bias data may be fed back to an accumulative adder of the MAC operator. This process is executed to perform the matrix adding calculation of the MAC result matrix and the bias matrix, which is described with reference to FIG. 14. In other words, the output latch 123-1 in the data output circuit 123-A of the MAC operator (120-1) is set to have the bias data. Because the matrix multiplying calculation is executed for the first row of the weight matrix, the output latch 123-1 may be initially set to have the element B0.0 located at a cross point of the first row and the first column of the bias matrix as the bias data. The output latch 123-1 may output the bias data B0.0, and the bias data B0.0 output from the output latch 123-1 may be input to the accumulative adder 122-21D of the addition logic circuit 122-2, as illustrated in FIG. 16.

In an embodiment, in order to output the bias data B0.0 out of the output latch 123-1 and to feed back the bias data B0.0 to the accumulative adder 122-21D, the MAC command generator 240 of the PIM controller 200 may transmit the MAC output latch signal MAC_L3 to the MAC operator 120-1 of the PIM device 100. When a subsequent MAC arithmetic operation is performed, the accumulative adder 122-21D of the MAC operator 120-1 may add the MAC result data MAC0.0 output from the adder 122-21C disposed at the last stage to the bias data B0.0 which is fed back from the output latch 123-1 to generate the biased result data Y0.0 and may output the biased result data Y0.0 to the output latch 123-1. The biased result data Y0.0 may be output from the output latch 123-1 in synchronization with the MAC output latch signal MAC_L3 transmitted in a subsequent process.

In a step 325, the MAC command generator 240 of the PIM controller 200 may generate and transmit the first MAC read signal MAC_RD_BK0 to the PIM device 100. In addition, the address generator 250 of the PIM controller 200 may generate and transmit the bank selection signal BS and the row/column address ADDR_R/ADDR_C to the PIM device 100. The step 325 may be executed in the same way as described with reference to FIG. 7. In a step 326, the MAC command generator 240 of the PIM controller 200 may generate and transmit the second MAC read signal MAC_RD_BK1 to the PIM device 100. In addition, the address generator 250 of the PIM controller 200 may generate and transmit the bank selection signal BS for selecting the second memory bank 112 and the row/column address ADDR_R/ADDR_C to the PIM device 100. The step 326 may be executed in the same way as described with reference to FIG. 8.

At a step 327, the MAC command generator 240 of the PIM controller 200 may generate and transmit the first MAC input latch signal MAC_L1 to the PIM device 100. The step 327 may be executed in the same way as described with reference to FIG. 9. The first MAC Input latch signal MAC_L1 may control the input latch operation of the first data for the MAC operator 120 of the PIM device 100. The input latch operation of the first data may be performed in the same way as described with reference to FIG. 11. At a step 328, the MAC command generator 240 of the PIM controller 200 may generate and transmit the second MAC input latch signal MAC_L2 to the PIM device 100. The step 328 may be executed in the same way as described with reference to FIG. 10. The second MAC Input latch signal MAC_L2 may control the input latch operation of the second data for the MAC operator 120 of the PIM device 100. The input latch operation of the second data may be performed in the same way as described with reference to FIG. 11.

At a step 329, the MAC circuit 122 of the MAC operator 120 may perform the MAC arithmetic operation of an R row of the weight matrix and the first column of the vector matrix, which are Input to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the input data, and the result data of the multiplying calculation may be input to the addition logic circuit 122-2. The addition logic circuit 122-2 may include the four adders 122-21A disposed at the first stage, the two adders 122-21B disposed at the second stage, the adder 122-21C disposed at the third stage, and the accumulative adder 122-21D, as illustrated in FIG. 16. The accumulative adder 122-21D may add output data of the adder 122-21C to feedback data fed back from the output latch 123-1 to output the result of the adding calculation. The output data of the adder 122-21C may be the matrix multiplying result MAC0.0, which corresponds to the result of the matrix multiplying calculation of the first row of the weight matrix and the first column of the vector matrix. The accumulative adder 122-21D may add the output data MAC0.0 of the adder 122-21C to the bias data B0.0 fed back from the output latch 123-1 to output the result of the adding calculation. The output data Y0.0 of the accumulative adder 122-21D may be input to the output latch 123 disposed in a data output circuit 123-A of the MAC operator 120-1.

At a step 330, the MAC command generator 240 of the PIM controller 200 may generate and transmit the MAC output latch signal MAC_L3 to the PIM device 100. The step 330 may be executed in the same way as described with reference to FIG. 12. The MAC output latch signal MAC_L3 may control the output latch operation of the MAC result data MAC0.0, which is performed by the MAC operator 120-1 of the PIM device 100. The biased result data Y0.0 transmitted from the MAC circuit 122 of the MAC operator 120 to the output latch 123-1 may be output from the output latch 123-1 in synchronization with the MAC output latch signal MAC_L3. The biased result data Y0.0 output from the output latch 123 may be input to the transfer gate 123-2.

At a step 331, the MAC command generator 240 of the PIM controller 200 may generate and transmit the MAC latch reset signal MAC_L_RST to the PIM device 100. The step 331 may be executed in the same way as described with reference to FIG. 13. The MAC latch reset signal MAC_L_RST may control an output operation of the biased result data Y0.0 generated by the MAC operator 120 and a reset operation of the output latch 123-1 included in the MAC operator 120. The transfer gate 123-2 receiving the biased result data Y0.0 from the output latch 123-1 of the data output circuit 123-A included in the MAC operator 120 may be synchronized with the MAC latch reset signal MAC_L_RST to output the biased result data Y0.0. In an embodiment, the biased result data Y0.0 output from the MAC operator 120 may be stored into the first memory bank 111 or the second memory bank 112 through the first BIO line or the second BIO line in the PIM device 100.

At a step 332, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 332. At a step 333, whether the row number changed at the step 332 is greater than the row number of the last row (i.e., the eighth row of the current example) of the weight matrix may be determined. Because the row number of the weight matrix is changed to '2' at the step 332, a process of the MAC arithmetic operation may be fed back to the step 324.

If the process of the MAC arithmetic operation is fed back to the step 324 from the step 333, then the same processes as described with reference to the steps 324 to 331 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix and the bias data B0.0 in the output latch 123-1 initially set at the step 324 may be changed into the bias data B1.0. If the process of the MAC arithmetic operation is fed back to the step 324 at the step 333, the processes from the step 324 to the step 332 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 332, the MAC arithmetic operation may terminate because the row number of '9' is greater than the last row number of '8' at the step 333.

Figure 17:
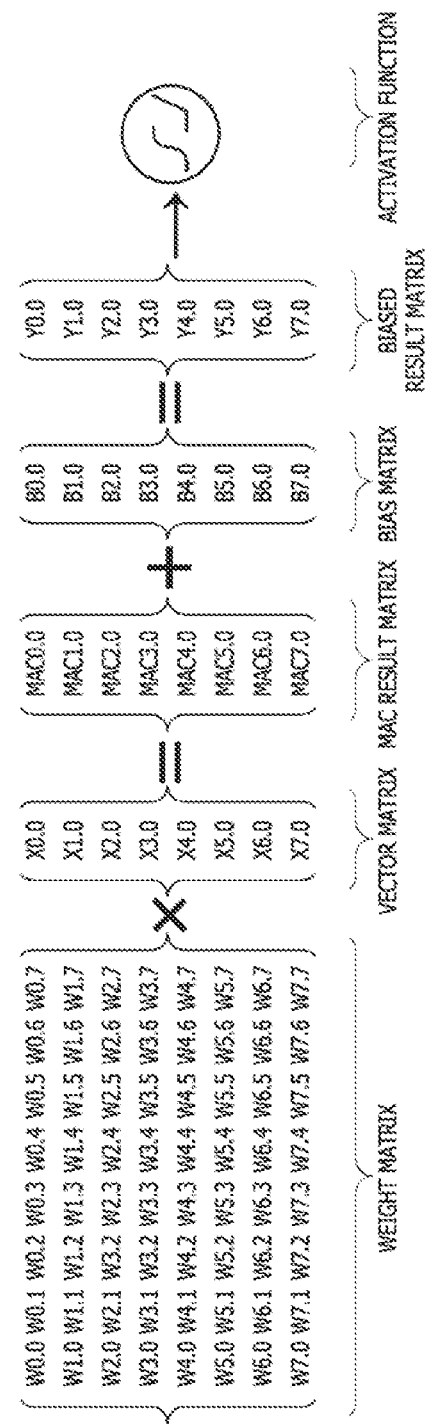
FIG. 17 illustrates yet another example of a MAC arithmetic operation performed in a PIM system according to a first embodiment of the present disclosure.

FIG. 17 illustrates yet another example of a MAC arithmetic operation performed in the PIM system 1-1 according to the first embodiment of the present disclosure. As illustrated in FIG. 17, the MAC arithmetic operation performed by the PIM system 1-1 may further include a process for applying the biased result matrix to an activation function. Specifically, as described with reference to FIG. 14, the PIM device 100 may execute the matrix multiplying calculation of the '8×8' weight matrix and the '8×1' vector matrix according to control of the PIM controller 200 to generate the MAC result matrix. In addition, the MAC result matrix may be added to the bias matrix to generate biased result matrix.

The biased result matrix may be applied to the activation function. The activation function means a function which is used to calculate a unique output value by comparing a MAC calculation value with a critical value in an MLP-type neural network. In an embodiment, the activation function may be a unipolar activation function which generates only positive output values or a bipolar activation function which generates negative output values as well as positive output values. In different embodiments, the activation function may include a sigmoid function, a hyperbolic tangent (Tan h) function, a rectified linear unit (ReLU) function, a leaky ReLU function, an identity function, and a maxout function.

Figure 18:
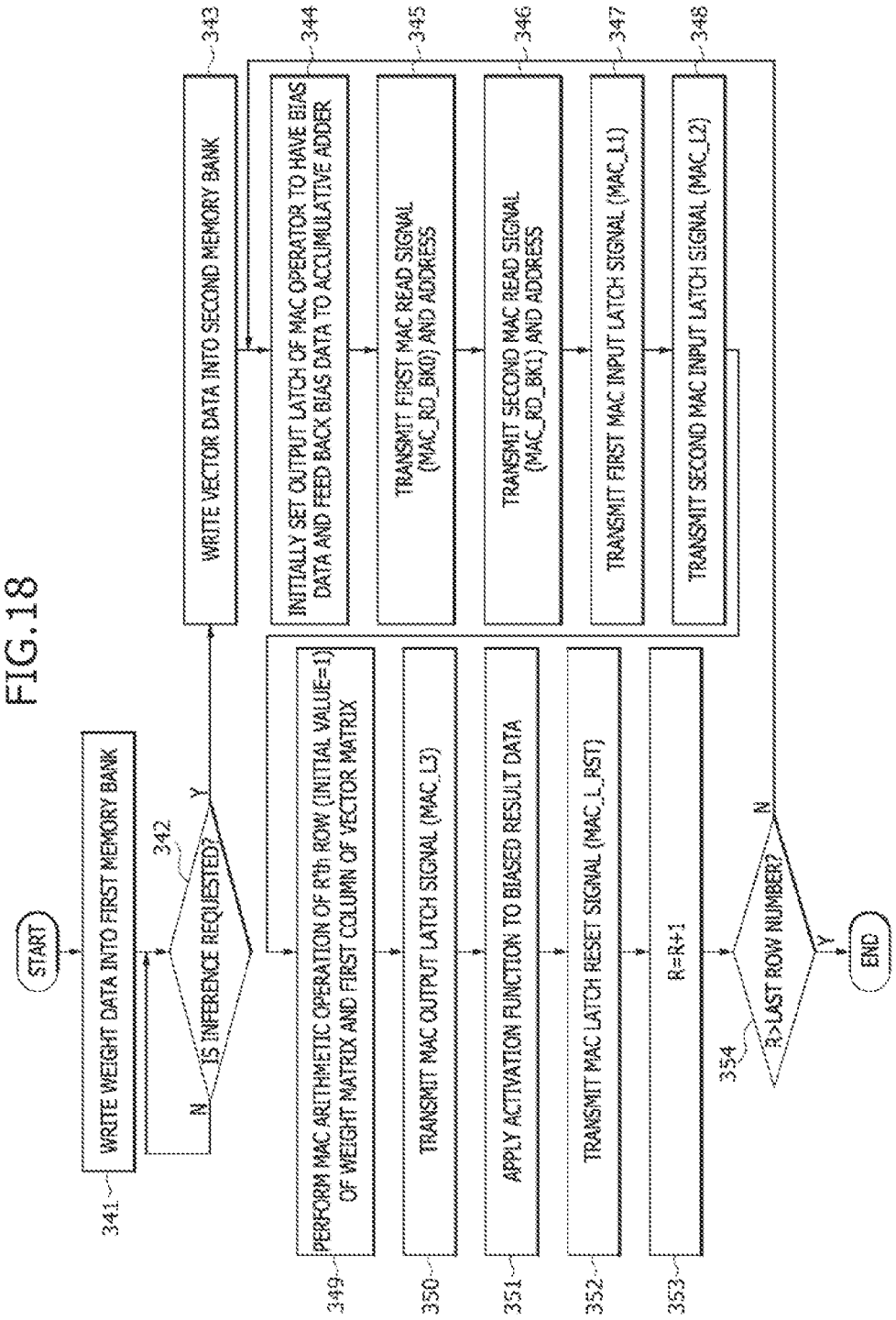
FIG. 18 is a flowchart illustrating processes of the MAC arithmetic operation illustrated in FIG. 17 in a PIM system according to a first embodiment of the present disclosure.
Figure 19:
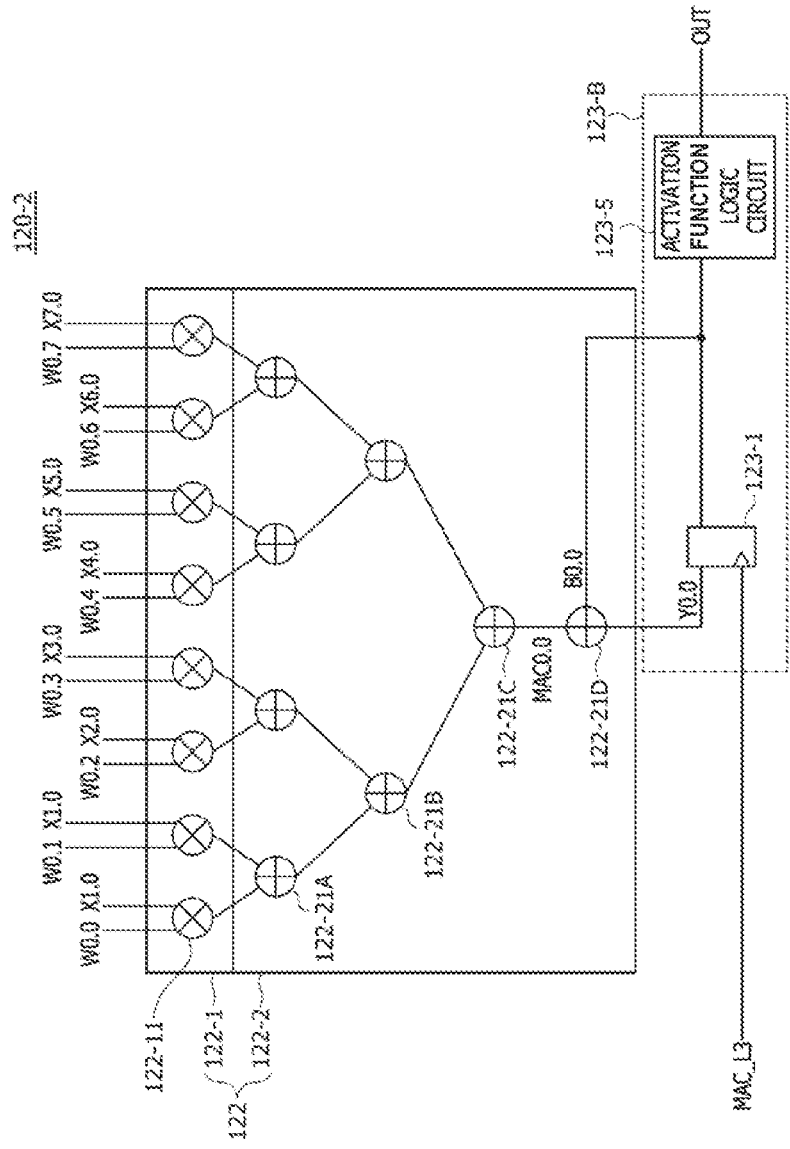
FIG. 19 illustrates an example of a configuration of a MAC operator for performing the MAC arithmetic operation of FIG. 17 in a PIM system according to a first embodiment of the present disclosure.

FIG. 18 is a flowchart illustrating processes of the MAC arithmetic operation described with reference to FIG. 17 in the PIM system 1-1 according to the first embodiment of the present disclosure. Moreover, FIG. 19 illustrates an example of a configuration of a MAC operator 120-2 for performing the MAC arithmetic operation of FIG. 17 in the PIM system 1-1 according to the first embodiment of the present disclosure. In FIG. 19, the same reference numerals or the same reference symbols as used in FIG. 4 denote the same elements, and the detailed descriptions of the same elements as mentioned in the previous embodiment will be omitted hereinafter. Referring to FIG. 18, the first data (i.e., the weight data) may be written into the first memory bank 111 at a step 341 to perform the MAC arithmetic operation in the PIM device 100. Thus, the weight data may be stored in the first memory bank 111 of the PIM device 100. In the present embodiment, it may be assumed that the weight data are the elements W0.0, . . . , and W7.7 constituting the weight matrix of FIG. 17.

At a step 342, whether an inference is requested may be determined. An inference request signal may be transmitted from an external device located outside of the PIM system 1-1 to the PIM controller 200 of the PIM system 1-1. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., the data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 17. If the inference request signal is transmitted to the PIM controller 200 at the step 342, then the PIM controller 200 may write the vector data transmitted with the inference request signal into the second memory bank 112 at a step 343. Accordingly, the vector data may be stored in the second memory bank 112 of the PIM device 100.

At a step 344, an output latch of a MAC operator may be initially set to have bias data and the initially set bias data may be fed back to an accumulative adder of the MAC operator. This process is executed to perform the matrix adding calculation of the MAC result matrix and the bias matrix, which is described with reference to FIG. 17. That is, as illustrated in FIG. 19, the output latch 123-1 of the MAC operator (120-2 of FIG. 19) may be initially set to have the bias data of the bias matrix. Because the matrix multiplying calculation is executed for the first row of the weight matrix, the element B0.0 located at first row and the first column of the bias matrix may be initially set as the bias data in the output latch 123-1. The output latch 123-1 may output the bias data B0.0, and the bias data B0.0 output from the output latch 123-1 may be input to the accumulative adder 122-21D of the MAC operator 120-2.

In an embodiment, in order to output the bias data B0.0 out of the output latch 123-1 and to feed back the bias data B0.0 to the accumulative adder 122-21D, the MAC command generator 240 of the PIM controller 200 may transmit the MAC output latch signal MAC_L3 to the MAC operator 120-2 of the PIM device 100. When a subsequent MAC arithmetic operation is performed, the accumulative adder 122-21D of the MAC operator 120-2 may add the MAC result data MAC0.0 output from the adder 122-21C disposed at the last stage to the bias data B0.0 which is fed back from the output latch 123-1 to generate the biased result data Y0.0 and may output the biased result data Y0.0 to the output latch 123-1. As illustrated in FIG. 19, the biased result data Y0.0 may be transmitted from the output latch 123-1 to an activation function logic circuit 123-5 disposed in a data output circuit 123-B of the MAC operator 120-2 in synchronization with the MAC output latch signal MAC_L3 transmitted in a subsequent process.

In a step 345, the MAC command generator 240 of the PIM controller 200 may generate and transmit the first MAC read signal MAC_RD_BK0 to the PIM device 100. In addition, the address generator 250 of the PIM controller 200 may generate and transmit the bank selection signal BS and the row/column address ADDR_R/ADDR_C to the PIM device 100. The step 345 may be executed in the same way as described with reference to FIG. 7. In a step 346, the MAC command generator 240 of the PIM controller 200 may generate and transmit the second MAC read signal MAC_RD_BK1 to the PIM device 100. In addition, the address generator 250 of the PIM controller 200 may generate and transmit the bank selection signal BS for selecting the second memory bank 112 and the row/column address ADDR_R/ADDR_C to the PIM device 100. The step 346 may be executed in the same way as described with reference to FIG. 8.

At a step 347, the MAC command generator 240 of the PIM controller 200 may generate and transmit the first MAC input latch signal MAC_L1 to the PIM device 100. The step 347 may be executed in the same way as described with reference to FIG. 9. The first MAC input latch signal MAC_L1 may control the input latch operation of the first data for the MAC operator 120 of the PIM device 100. The input latch operation of the first data may be performed in the same way as described with reference to FIG. 11. At a step 348, the MAC command generator 240 of the PIM controller 200 may generate and transmit the second MAC input latch signal MAC_L2 to the PIM device 100. The step 348 may be executed in the same way as described with reference to FIG. 10. The second MAC input latch signal MAC_L2 may control the input latch operation of the second data for the MAC operator 120 of the PIM device 100. The input latch operation of the second data may be performed in the same way as described with reference to FIG. 11.

At a step 349, the MAC circuit 122 of the MAC operator 120 may perform the MAC arithmetic operation of an $R^{th}$ row of the weight matrix and the first column of the vector matrix, which are input to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the input data, and the result data of the multiplying calculation may be input to the addition logic circuit 122-2. The addition logic circuit 122-2 may include the four adders 122-21A disposed at the first stage, the two adders 122-21B disposed at the second stage, the adder 122-21C disposed at the third stage, and the accumulative adder 122-21D, as illustrated in FIG. 19. The accumulative adder 122-21D may add output data of the adder 122-21C to feedback data fed back from the output latch 123-1 to output the result of the adding calculation. The output data of the adder 122-21C may be the element MAC0.0 of the '8×1' MAC result matrix, which corresponds to the result of the matrix multiplying calculation of the first row of the weight matrix and the first column of the vector matrix. The accumulative adder 122-21D may add the output data MAC0.0 of the adder 122-21C to the bias data B0.0 fed back from the output latch 123-1 to output the result of the adding calculation. The output data Y0.0 of the accumulative adder 122-21D may be input to the output latch 123-1 disposed in the data output circuit 123-A of the MAC operator 120.

At a step 350, the MAC command generator 240 of the PIM controller 200 may generate and transmit the MAC output latch signal MAC_L3 to the PIM device 100. The step 350 may be executed in the same way as described with reference to FIG. 12. The MAC output latch signal MAC_L3 may control the output latch operation of the output latch 123-1 included in the MAC operator 120 of the PIM device 100. The biased result data Y0.0 transmitted from the MAC circuit 122 of the MAC operator 120 to the output latch 123-1 may be output from the output latch 123-1 in synchronization with the MAC output latch signal MAC_L3. The biased result data Y0.0 output from the output latch 123-1 may be input to the activation function logic circuit 123-5. At a step 351, the activation function logic circuit 123-5 may apply an activation function to the biased result data Y0.0 to generate a final output value, and the final output value may be input to the transfer gate (123-2 of FIG. 4). This, for example, is the final output value for the current of R which is incremented in step 354.

At a step 352, the MAC command generator 240 of the PIM controller 200 may generate and transmit the MAC latch reset signal MAC_L_RST to the PIM device 100. The step 352 may be executed in the same way as described with reference to FIG. 13. The MAC latch reset signal MAC_L_RST may control an output operation of the final output value generated by the MAC operator 120 and a reset operation of the output latch 123-1 included in the MAC operator 120. The transfer gate 123-2 receiving the final output value from the activation function logic circuit 123-5 of the data output circuit 123-B included in the MAC operator 120 may be synchronized with the MAC latch reset signal MAC_L_RST to output the final output value. In an embodiment, the final output value output from the MAC operator 120 may be stored into the first memory bank 111 or the second memory bank 112 through the first BIO line or the second BIO line in the PIM device 100.

At a step 353, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 353. At a step 354, whether the row number changed at the step 353 is greater than the row number of the last row (i.e., the eighth row) of the weight matrix may be determined. Because the row number of the weight matrix is changed to '2' at the step 353, a process of the MAC arithmetic operation may be fed back to the step 344.

If the process of the MAC arithmetic operation is fed back to the step 344 from the step 354, the same processes as described with reference to the steps 344 to 354 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix, and the bias data B0.0 in the output latch 123-1 initially set at the step 344 may be changed to the bias data B1.0. If the process of the MAC arithmetic operation is fed back to the step 344 from the step 354, the processes from the step 344 to the step 354 may be iteratively performed until the MAC arithmetic operation is performed for all of the rows of the weight matrix with the vector matrix. For an embodiment, a plurality of final output values, namely, one final output value for each incremented value of R, represents an 'N×1' final result matrix. If the MAC arithmetic operation for the eighth row of the weight matrix terminates and the row number of the weight matrix changes from '8' to '9' at the step 354, the MAC arithmetic operation may terminate because the row number of '9' is greater than the last row number of '8' at the step 354.

Figure 20:
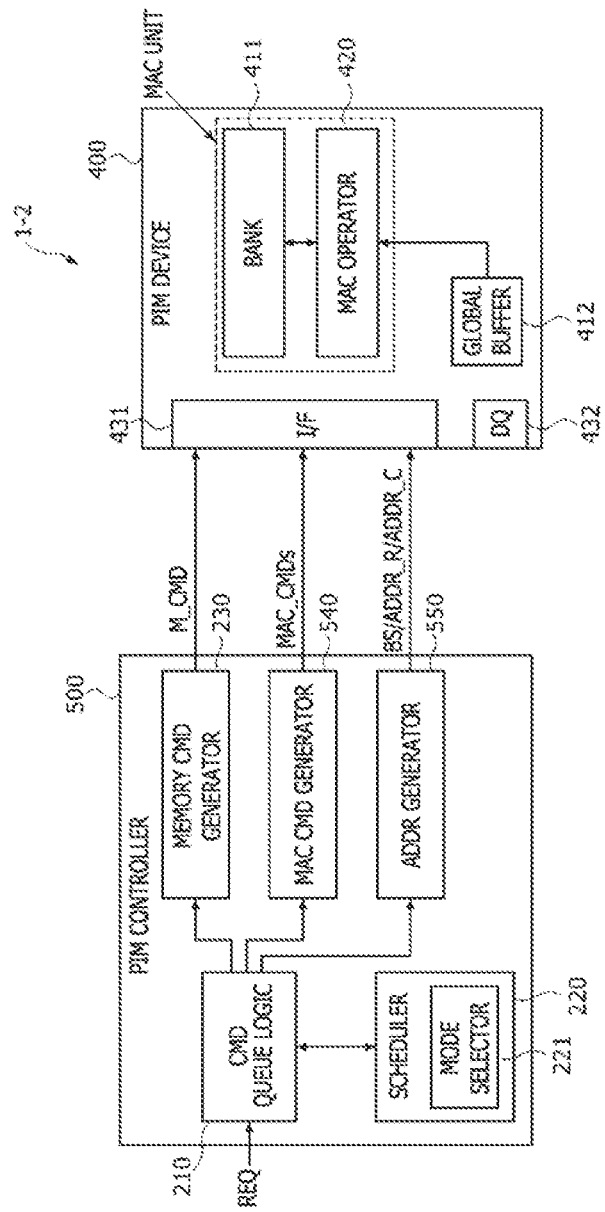
FIG. 20 is a block diagram illustrating a PIM system according to a second embodiment of the present disclosure.

FIG. 20 is a block diagram illustrating a PIM system 1-2 according to a second embodiment of the present disclosure. In FIG. 20, the same reference numerals or the same reference symbols as used in FIG. 2 denote the same elements. As illustrated in FIG. 20, the PIM system 1-2 may be configured to include a PIM device 400 and a PIM controller 500. The PIM device 400 may be configured to include a memory bank (BANK) 411 corresponding to a storage region, a global buffer 412, a MAC operator 420, an interface (I/F) 431, and a data input/output (I/O) pad 432. For an embodiment, the MAC operator 420 represents a MAC operator circuit. The memory bank (BANK) 411 and the MAC operator 420 included in the PIM device 400 may constitute one MAC unit. In another embodiment, the PIM device 400 may include a plurality of MAC units. The memory bank (BANK) 411 may represent a memory region for storing data, for example, a DRAM device. The global buffer 412 may also represent a memory region for storing data, for example, a DRAM device or an SRAM device. The memory bank (BANK) 411 may be a component unit which is independently activated and may be configured to have the same data bus width as data I/O lines in the PIM device 400. In an embodiment, the memory bank 411 may operate through interleaving such that an active operation of the memory bank 411 is performed in parallel while another memory bank is selected. The memory bank 411 may include at least one cell array which includes memory unit cells located at cross points of a plurality of rows and a plurality of columns.

Although not shown in the drawings, a core circuit may be disposed adjacent to the memory bank 411. The core circuit may include X-decoders XDECs and Y-decoders/IO circuits YDEC/IOs. An X-decoder XDEC may also be referred to as a word line decoder or a row decoder. The X-decoder XDEC may receive a row address ADDR_R from the PIM controller 500 and may decode the row address ADDR_R to select and enable one of the rows (i.e., word lines) coupled to the selected memory bank. Each of the Y-decoders/IO circuits YDEC/IOs may include a Y-decoder YDEC and an I/O circuit IO. The Y-decoder YDEC may also be referred to as a bit line decoder or a column decoder. The Y-decoder YDEC may receive a column address ADD_C from the PIM controller 500 and may decode the column address ADD_C to select and enable at least one of the columns (i.e., bit lines) coupled to the selected memory bank. Each of the I/O circuits may include an I/O sense amplifier for sensing and amplifying a level of a read datum output from the corresponding memory bank during a read operation for the memory bank 411. In addition, the I/O circuit may include a write driver for driving a write datum during a write operation for the memory bank 411.

The MAC operator 420 of the PIM device 400 may have mostly the same configuration as the MAC operator 120 described with reference to FIG. 4. That is, the MAC operator 420 may be configured to include the data input circuit 121, the MAC circuit 122, and the data output circuit 123, as described with reference to FIG. 4. The data input circuit 121 may be configured to include the first input latch 121-1 and the second input latch 121-2. The MAC circuit 122 may be configured to include the multiplication logic circuit 122-1 and the addition logic circuit 122-2. The data output circuit 123 may be configured to include the output latch 123-1, the transfer gate 123-2, the delay circuit 123-3, and the inverter 123-4. In an embodiment, the first input latch 121-1, the second input latch 121-2, and the output latch 123-1 may be realized using flip-flops.

The MAC operator 420 may be different from the MAC operator 120 in that a MAC input latch signal MAC_L1 is simultaneously input to both of clock terminals of the first and second input latches 121-1 and 121-2. As indicated in the following descriptions, the weight data and the vector data may be simultaneously transmitted to the MAC operator 420 of the PIM device 400 included in the PIM system 1-2 according to the present embodiment. That is, the first data DA1 (i.e., the weight data) and the second data DA2 (i.e., the vector data) may be simultaneously input to both of the first input latch 121-1 and the second input latch 121-2 constituting the data input circuit 121, respectively. Accordingly, it may be unnecessary to apply an extra control signal to the clock terminals of the first and second input latches 121-1 and 121-2, and thus the MAC input latch signal MAC_L1 may be simultaneously input to both of the clock terminals of the first and second input latches 121-1 and 121-2 included in the MAC operator 420.

In another embodiment, the MAC operator 420 may be realized to have the same configuration as the MAC operator 120-1 described with reference to FIG. 16 to perform the operation illustrated in FIG. 14. Even in such a case, the MAC operator 420 may have the same configuration as described with reference to FIG. 16 except that the MAC input latch signal MAC_L1 is simultaneously input to both of the clock terminals of the first and second input latches 121-1 and 121-2 constituting the data input circuit 121. In yet another embodiment, the MAC operator 420 may be realized to have the same configuration as the MAC operator 120-2 described with reference to FIG. 19 to perform the operation illustrated in FIG. 17. Even in such a case, the MAC operator 420 may have the same configuration as described with reference to FIG. 19 except that the MAC input latch signal MAC_L1 is simultaneously input to both of the clock terminals of the first and second input latches 121-1 and 121-2 constituting the data input circuit 121.

The interface 431 of the PIM device 400 may receive the memory command M_CMD, the MAC commands MAC_CMDs, the bank selection signal BS, and the row/column addresses ADDR_R/ADDR_C from the PIM controller 500. The interface 431 may output the memory command M_CMD, together with the bank selection signal BS and the row/column addresses ADDR_R/ADDR_C, to the memory bank 411. The interface 431 may output the MAC commands MAC_CMDs to the memory bank 411 and the MAC operator 420. In such a case, the interface 431 may output the bank selection signal BS and the row/column addresses ADDR_R/ADDR_C to the memory bank 411. The data I/O pad 432 of the PIM device 400 may function as a data communication terminal between a device external to the PIM device 400, the global buffer 412, and the MAC unit (which includes the memory bank 411 and the MAC operator 420) included in the PIM device 400. The external device to the PIM device 400 may correspond to the PIM controller 500 of the PIM system 1-2 or a host located outside the PIM system 1-2. Accordingly, data output from the host or the PIM controller 500 may be input into the PIM device 400 through the data I/O pad 432. In addition, data generated by the PIM device 400 may be transmitted to the external device to the PIM device 400 through the data I/O pad 432.

The PIM controller 500 may control operations of the PIM device 400. In an embodiment, the PIM controller 500 may control the PIM device 400 such that the PIM device 400 operates in the memory mode or the MAC mode. In the event that the PIM controller 500 controls the PIM device 400 such that the PIM device 400 operates in the memory mode, the PIM device 400 may perform a data read operation or a data write operation for the memory bank 411. In the event that the PIM controller 500 controls the PIM device 400 such that the PIM device 400 operates in the MAC mode, the PIM device 400 may perform the MAC arithmetic operation for the MAC operator 420. In the event that the PIM controller 500 controls the PIM device 400 such that the PIM device 400 operates in the MAC mode, the PIM device 400 may also perform the data read operation and the data write operation for the memory bank 411 and the global buffer 412 to execute the MAC arithmetic operation.

The PIM controller 500 may be configured to include the command queue logic 210, the scheduler 220, the memory command generator 230, a MAC command generator 540, and an address generator 550. The scheduler 220 may include the mode selector 221. The command queue logic 210 may receive the request REQ from an external device (e.g., a host of the PIM system 1-2) and store a command queue corresponding the request REQ in the command queue logic 210. The command queue stored in the command queue logic 210 may be transmitted to the memory command generator 230 or the MAC command generator 540 according to a sequence determined by the scheduler 220. The scheduler 220 may adjust a timing of the command queue when the command queue stored in the command queue logic 210 is output from the command queue logic 210. The scheduler 210 may include the mode selector 221 that generates a mode selection signal including information on whether command queue stored in the command queue logic 210 relates to the memory mode or the MAC mode. The memory command generator 230 may receive the command queue related to the memory mode of the PIM device 400 from the command queue logic 210 to generate and output the memory command M_CMD. The command queue logic 210, the scheduler 220, the mode selector 221, and the memory command generator 230 may have the same function as described with reference to FIG. 2.

The MAC command generator 540 may receive the command queue related to the MAC mode of the PIM device 400 from the command queue logic 210. The MAC command generator 540 may decode the command queue to generate and output the MAC commands MAC_CMDs. The MAC commands MAC_CMDs output from the MAC command generator 540 may be transmitted to the PIM device 400. The data read operation for the memory bank 411 of the PIM device 400 may be performed by the MAC commands MAC_CMDs output from the MAC command generator 540, and the MAC arithmetic operation of the MAC operator 420 may also be performed by the MAC commands MAC_CMDs output from the MAC command generator 540. The MAC commands MAC_CMDs and the MAC arithmetic operation of the PIM device 400 according to the MAC commands MAC_CMDs will be described in detail with reference to FIG. 21.

The address generator 550 may receive address information from the command queue logic 210. The address generator 550 may generate the bank selection signal BS for selecting a memory bank where, for example, the memory bank 411 represents multiple memory banks. The address generator 550 may transmit the bank selection signal BS to the PIM device 400. In addition, the address generator 550 may generate the row address ADDR_R and the column address ADDR_C for accessing a region (e.g., memory cells) in the memory bank 411 and may transmit the row address ADDR_R and the column address ADDR_C to the PIM device 400.

Figure 21:
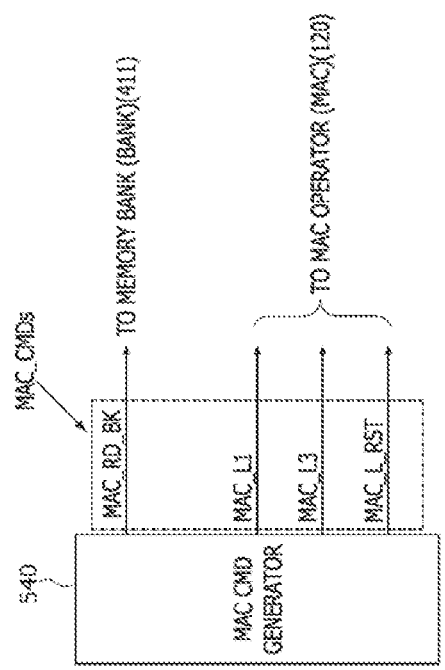
FIG. 21 illustrates MAC commands output from a MAC command generator of a PIM controller included in a PIM system according to a second embodiment of the present disclosure.

FIG. 21 illustrates the MAC commands MAC_CMDs output from the MAC command generator 540 included in the PIM system 1-2 according to the second embodiment of the present disclosure. As illustrated in FIG. 21, the MAC commands MAC_CMDs may include first to fourth MAC command signals. In an embodiment, the first MAC command signal may be a MAC read signal MAC_RD_BK, the second MAC command signal may be a MAC input latch signal MAC_L1, the third MAC command signal may be a MAC output latch signal MAC_L3, and the fourth MAC command signal may be a MAC latch reset signal MAC_L_RST.

The MAC read signal MAC_RD_BK may control an operation for reading the first data (e.g., the weight data) out of the memory bank 411 to transmit the first data to the MAC operator 420. The MAC input latch signal MAC_L1 may control an input latch operation of the weight data transmitted from the first memory bank 411 to the MAC operator 420. The MAC output latch signal MAC_L3 may control an output latch operation of the MAC result data generated by the MAC operator 420. And, the MAC latch reset signal MAC_L_RST may control an output operation of the MAC result data generated by the MAC operator 420 and a reset operation of an output latch included in the MAC operator 420.

The PIM system 1-2 according to the present embodiment may also be configured to perform the deterministic MAC arithmetic operation. Thus, the MAC commands MAC_CMDs transmitted from the PIM controller 500 to the PIM device 400 may be sequentially generated with fixed time intervals. Accordingly, the PIM controller 500 does not require any extra end signals of various operations executed for the MAC arithmetic operation to generate the MAC commands MAC_CMDs for controlling the MAC arithmetic operation. In an embodiment, latencies of the various operations executed by MAC commands MAC_CMDs for controlling the MAC arithmetic operation may be set to have fixed values in order to perform the deterministic MAC arithmetic operation. In such a case, the MAC commands MAC_CMDs may be sequentially output from the PIM controller 500 with fixed time intervals corresponding to the fixed latencies.

Figure 22:
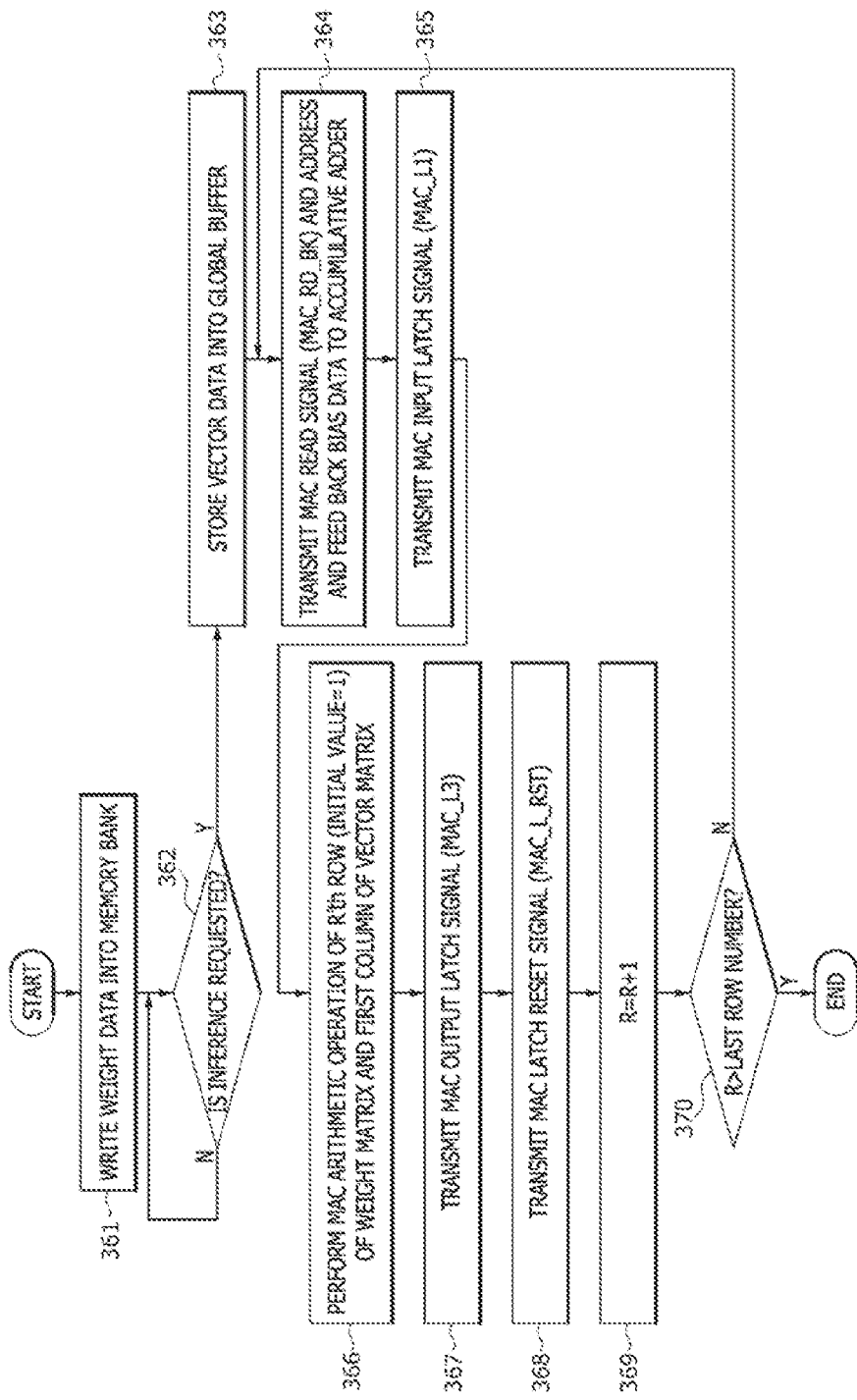
FIG. 22 is a flowchart illustrating processes of the MAC arithmetic operation illustrated in FIG. 5 in a PIM system according to a second embodiment of the present disclosure.

FIG. 22 is a flowchart illustrating processes of the MAC arithmetic operation described with reference to FIG. 5, which are performed in the PIM system 1-2 according to the second (4 embodiment of the present disclosure. In addition, FIGS. 23 to 26 are block diagrams illustrating the processes of the MAC arithmetic operation illustrated in FIG. 5, which are performed in the PIM system 1-2 according to the second embodiment of the present disclosure. Referring to FIGS. 22 to 26, the first data (i.e., the weight data) may be written into the memory bank 411 at a step 361 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 5.

At a step 362, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 5. If the inference request signal is transmitted to the PIM controller 500 at the step 362, then the PIM controller 500 may write the vector data transmitted with the inference request signal into the global buffer 412 at a step 363. Accordingly, the vector data may be stored in the global buffer 412 of the PIM device 400.

Figure 23:
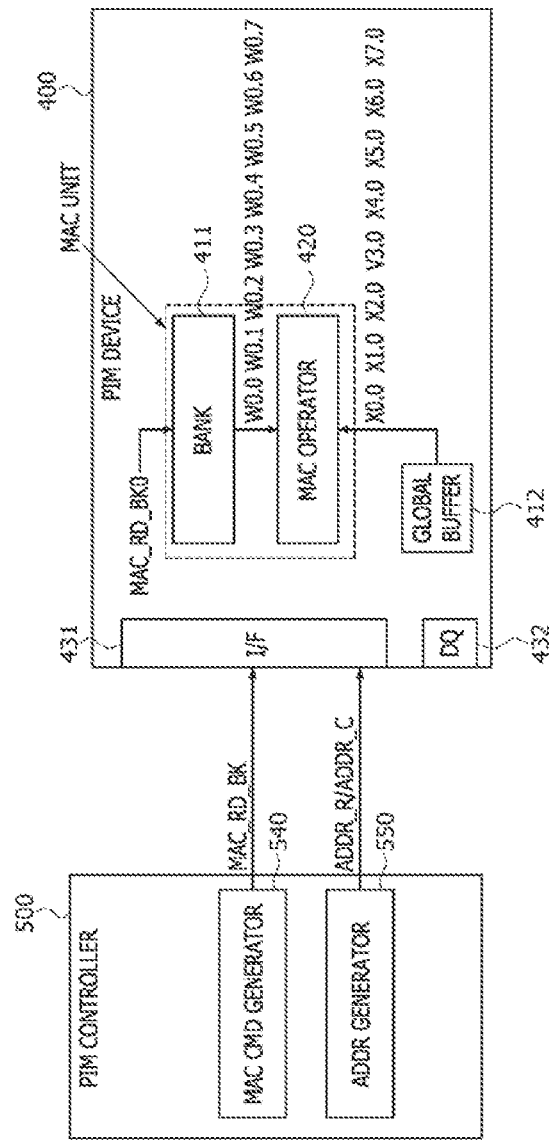
FIGS. 23 to 26 are block diagrams illustrating processes of the MAC arithmetic operation illustrated in FIG. 5 in a PIM system according to a second embodiment of the present disclosure.

At a step 364, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. Although not shown in the drawings, if a plurality of memory banks are disposed in the PIM device 400, the address generator 550 may transmit a bank selection signal for selecting the memory bank 411 among the plurality of memory banks as well as the row/column address ADDR_R/ADDR_C to the PIM device 400. The MAC read signal MAC_RD_BK input to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK output from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

Figure 24:
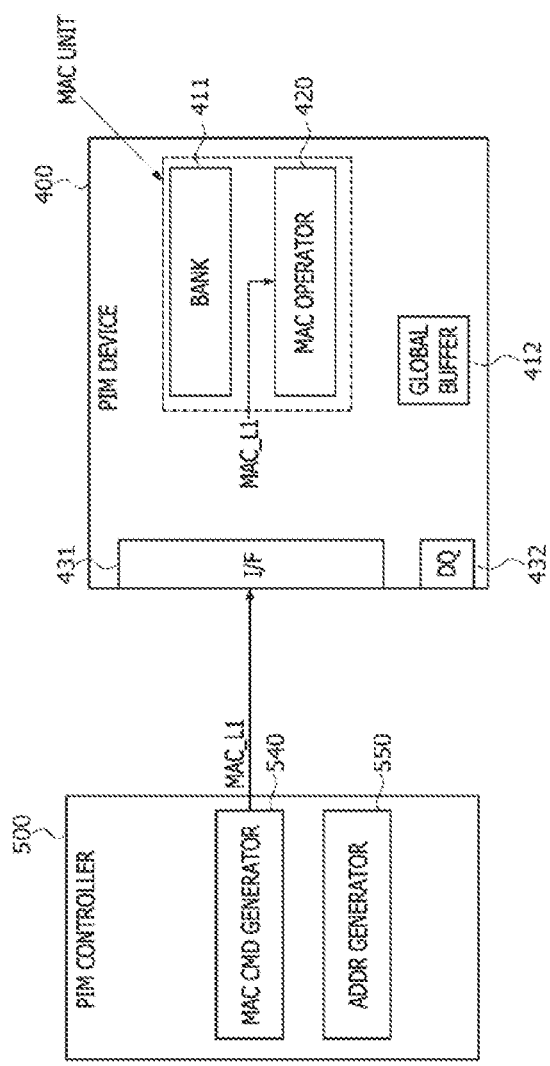

At a step 365, the MAC command generator 540 of the PIM controller 500 may generate and transmit the MAC input latch signal MAC_L1 to the PIM device 400, as illustrated in FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be input to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be input to the first to eighth multipliers 122-11, respectively, and the elements X0.0, . . . , and X7.0 in the first column of the vector matrix may also be input to the first to eighth multipliers 122-11, respectively.

At a step 366, the MAC circuit 122 of the MAC operator 420 may perform the MAC arithmetic operation of an R row of the weight matrix and the first column of the vector matrix, which are input to the MAC circuit 122. An initial value of 'R' may be set as '1'. Thus, the MAC arithmetic operation of the first row of the weight matrix and the first column of the vector matrix may be performed a first time. Specifically, as described with reference to FIG. 4, each of the multipliers 122-11 of the multiplication logic circuit 122-1 may perform a multiplying calculation of the input data, and the result data of the multiplying calculation may be input to the addition logic circuit 122-2. The addition logic circuit 122-2 may receive output data from the multipliers 122-11 and may perform the adding calculation of the output data of the multipliers 122-11 to output the result data of the adding calculation. The output data of the addition logic circuit 122-2 may correspond to result data (i.e., MAC result data) of the MAC arithmetic operation of the first row included in the weight matrix and the column included in the vector matrix. Thus, the output data of the addition logic circuit 122-2 may correspond to the element MAC0.0 located at the first row of the '8×1' MAC result matrix having the eight elements of MAC0.0, . . . , and MAC7.0 illustrated in FIG. 5. The output data MAC0.0 of the addition logic circuit 122-2 may be input to the output latch 123-1 disposed in the data output circuit 123 of the MAC operator 420, as described with reference to FIG. 4.

Figure 25:
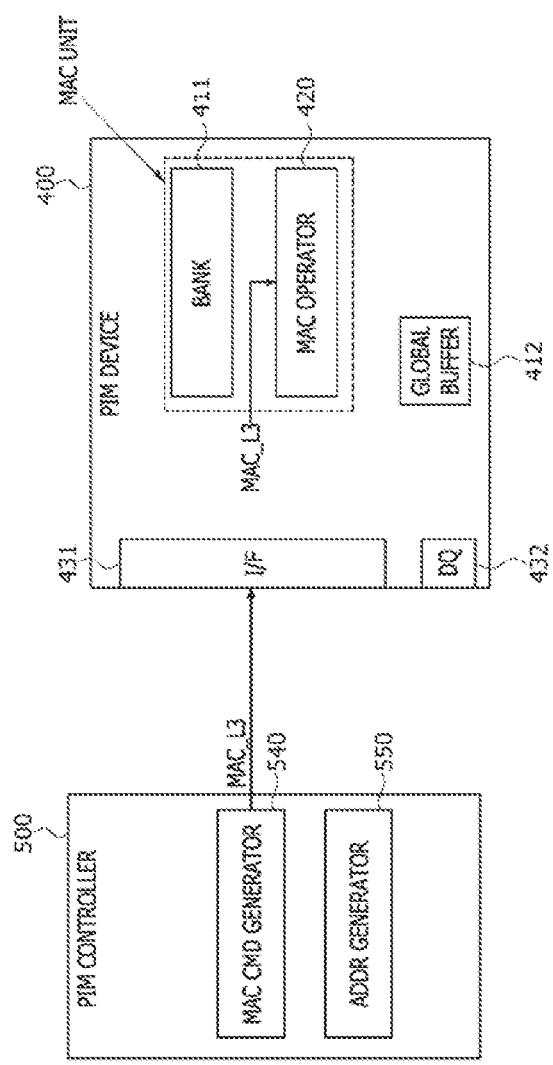

At a step 367, the MAC command generator 540 of the PIM controller 500 may generate and transmit the MAC output latch signal MAC_L3 to the PIM device 400, as illustrated in FIG. 25. The MAC output latch signal MAC_L3 may control the output latch operation of the MAC result data MAC0.0 performed by the MAC operator 420 of the PIM device 400. The MAC result data MAC0.0 transmitted from the MAC circuit 122 of the MAC operator 420 to the output latch 123-1 may be output from the output latch 123-1 by the output latch operation performed in synchronization with the MAC output latch signal MAC_L3, as described with reference to FIG. 4. The MAC result data MAC0.0 output from the output latch 123-1 may be input to the transfer gate 123-2 of the data output circuit 123.

Figure 26:
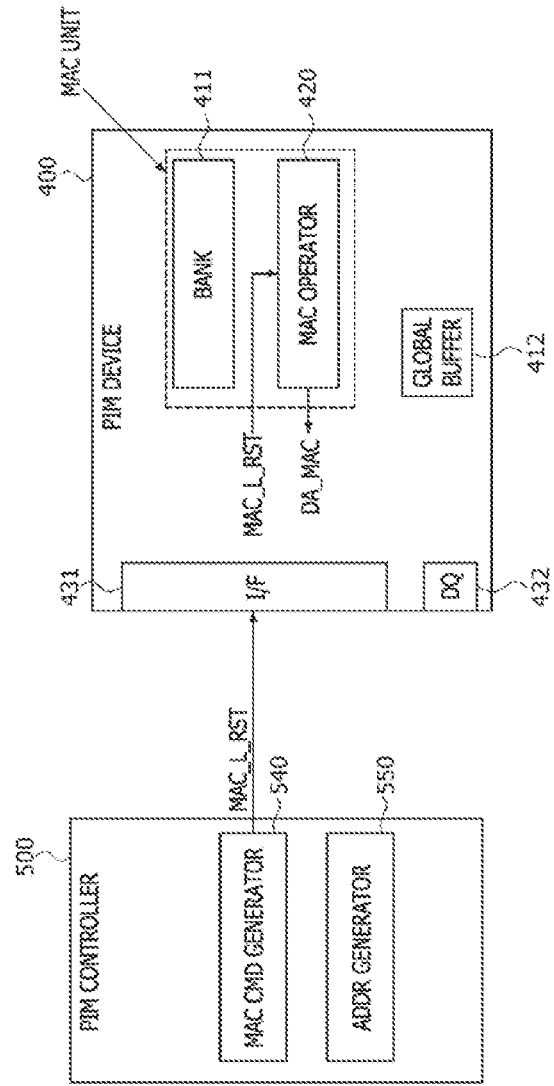

At a step 368, the MAC command generator 540 of the PIM controller 500 may generate and transmit the MAC latch reset signal MAC_L_RST to the PIM device 400, as illustrated in FIG. 26. The MAC latch reset signal MAC_L_RST may control an output operation of the MAC result data MAC0.0 generated by the MAC operator 420 and a reset operation of the output latch 123-1 included in the MAC operator 420. As described with reference to FIG. 4, the transfer gate 123-2 receiving the MAC result data MAC0.0 from the output latch 123-1 of the MAC operator 420 may be synchronized with the MAC latch reset signal MAC_L_RST to output the MAC result data MAC0.0. In an embodiment, the MAC result data MAC0.0 output from the MAC operator 420 may be stored into the memory bank 411 through the BIO line in the PIM device 400.

At a step 369, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 369. At a step 370, whether the row number changed at the step 369 is greater than the row number of the last row (i.e., the eighth row) of the weight matrix may be determined. Because the row number of the weight matrix is changed to '2' at the step 370, a process of the MAC arithmetic operation may be fed back to the step 364.

If the process of the MAC arithmetic operation is fed back to the step 364 from the step 370, the same processes as described with reference to the steps 364 to 370 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 364 from the step 370, the processes from the step 364 to the step 370 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 369, the MAC arithmetic operation may terminate because the row number of '9' is greater than the last row number of '8' at the step 370.

Figure 27:
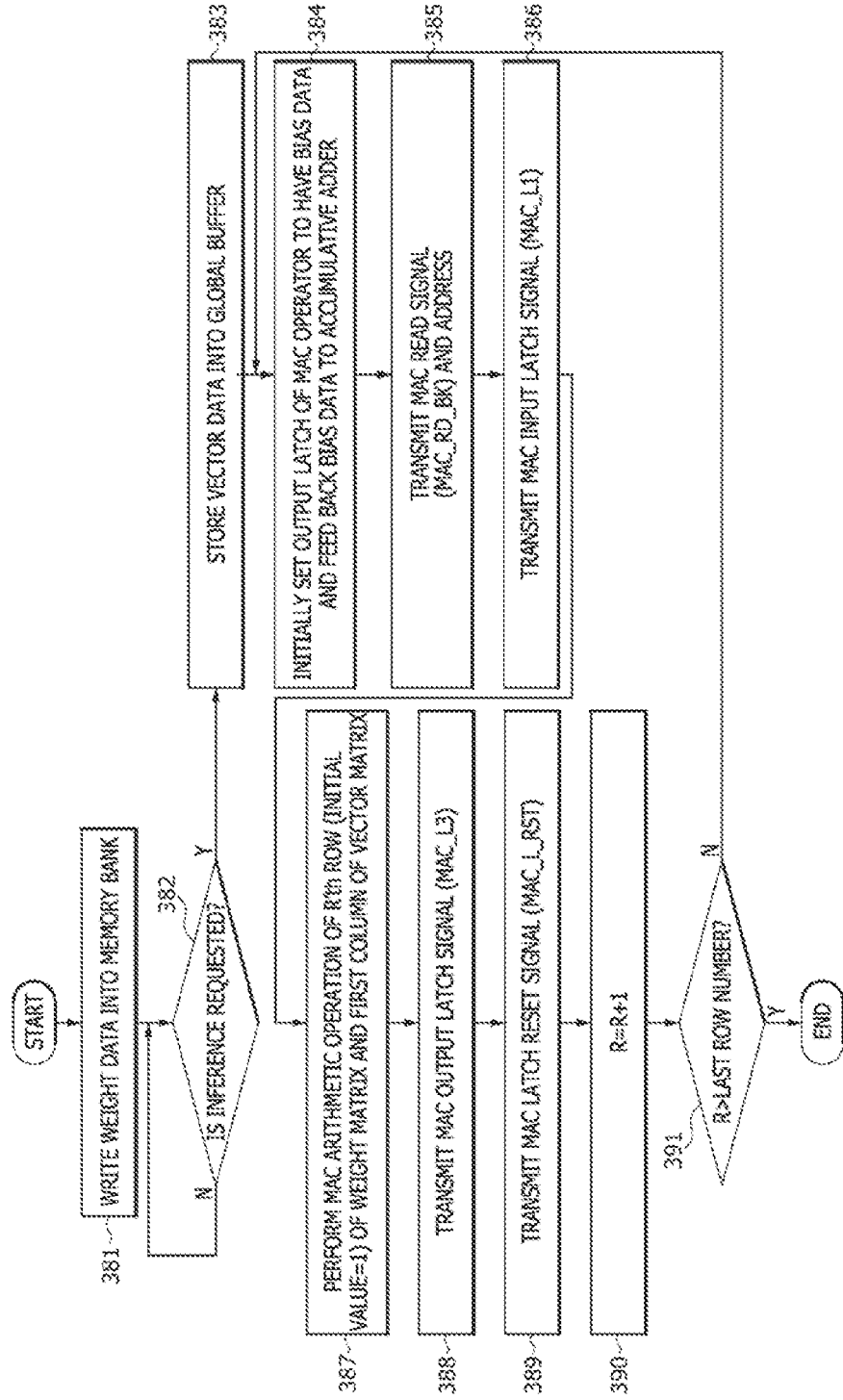
FIG. 27 is a flowchart illustrating processes of the MAC arithmetic operation illustrated in FIG. 14 in a PIM system according to a second embodiment of the present disclosure.

FIG. 27 is a flowchart illustrating processes of the MAC arithmetic operation described with reference to FIG. 14, which are performed in the PIM system 1-2 according to the second embodiment of the present disclosure. In order to perform the MAC arithmetic operation according to the present embodiment, the MAC operator 420 of the PIM device 400 may have the same configuration as the MAC operator 120-1 illustrated in FIG. 16. Referring to FIGS. 20 and 27, the first data (i.e., the weight data) may be written into the memory bank 411 at a step 381 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 14.

At a step 382, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 14. If the inference request signal is transmitted to the PIM controller 500 at the step 382, then the PIM controller 500 may write the vector data transmitted with the inference request signal into the global buffer 412 at a step 383. Accordingly, the vector data may be stored in the global buffer 412 of the PIM device 400.

At a step 384, an output latch of a MAC operator 420 may be initially set to have bias data and the initially set bias data may be fed back to an accumulative adder of the MAC operator 420. This process is executed to perform the matrix adding calculation of the MAC result matrix and the bias matrix, which is described with reference to FIG. 14. That is, as illustrated in FIG. 16, the output latch 123-1 of the data output circuit 123-A included in the MAC operator 420 may be initially set to have the bias data of the bias matrix. Because the matrix multiplying calculation is executed for the first row of the weight matrix, the element B0.0 located at first row of the bias matrix may be initially set as the bias data in the output latch 123-1. The output latch 123-1 may output the bias data B0.0, and the bias data B0.0 output from the output latch 123-1 may be input to the accumulative adder 122-21D of the addition logic circuit 122-2 included in the MAC operator 420.

In an embodiment, in order to output the bias data B0.0 out of the output latch 123-1 and to feed back the bias data B0.0 to the accumulative adder 122-21D, the MAC command generator 540 of the PIM controller 500 may transmit the MAC output latch signal MAC_L3 to the MAC operator 420 of the PIM device 400. When a subsequent MAC arithmetic operation is performed, the accumulative adder 122-21D of the MAC operator 420 may add the MAC result data MAC0.0 output from the adder 122-21C disposed at the last stage to the bias data B0.0 which is fed back from the output latch 123-1 to generate the biased result data Y0.0 and may output the biased result data Y0.0 to the output latch 123-1. The biased result data Y0.0 may be output from the output latch 123-1 in synchronization with the MAC output latch signal MAC_L3 transmitted in a subsequent process.

At a step 385, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. The MAC read signal MAC_RD_BK input to the PIM device 400 may control the data read operation for the memory bank 411 of the PIM device 400. The memory bank 411 may output and transmit the elements W0.0, ..., and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, ..., and X7.0 stored in the global buffer 412 may also be transmitted to the MAC operator 420 in synchronization with a point in time when the weight data are transmitted from the memory bank 411 to the MAC operator 420. In order to transmit the vector data X0.0, ..., and X7.0 from the global buffer 412 to the MAC operator 420, a control signal for controlling the read operation for the global buffer 412 may be generated in synchronization with the MAC read signal MAC_RD_BK output from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

At a step 386, the MAC command generator 540 of the PIM controller 500 may generate and transmit the MAC input latch signal MAC_L1 to the PIM device 400, as illustrated in FIG. 24. The MAC input latch signal MAC_L1 may control the input latch operation of the weight data and the vector data for the MAC operator 420 of the PIM device 400. The elements W0.0, ..., and W0.7 in the first row of the weight matrix and the elements X0.0, ..., and X7.0 in the first column of the vector matrix may be input to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, ..., and W0.7 in the first row of the weight matrix may be input to the first to eighth multipliers 122-11, respectively, and the elements X0.0, ..., and X7.0 in the first column of the vector matrix may also be input to the first to eighth multipliers 122-11, respectively.

At a step 387, the MAC circuit 122 of the MAC operator 420 may perform the MAC arithmetic operation of an $R^{th}$ row of the weight matrix and the first column of the vector matrix, which are input to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the input data, and the result data of the multiplying calculation may be input to the addition logic circuit 122-2. The addition logic circuit 122-2 may receive output data of the multipliers 122-11 and may perform the adding calculation of the output data of the multipliers 122-11 to output the result data of the adding calculation to the accumulative adder 122-21D. The output data of the adder 122-21C included in the addition logic circuit 122-2 may correspond to result data (i.e., MAC result data) of the MAC arithmetic operation of the first row included in the weight matrix and the column included in the vector matrix. The accumulative adder 122-21D may add the output data MAC0.0 of the adder 122-21C to the bias data B0.0 fed back from the output latch 123-1 and may output the result data of the adding calculation. The output data (i.e., the biased result data Y0.0) of the accumulative adder 122-21D may be input to the output latch 123-1 disposed in the data output circuit 123-A of the MAC operator 420.

At a step 388, the MAC command generator 540 of the PIM controller 500 may generate and transmit the MAC output latch signal MAC_L3 to the PIM device 400, as described with reference to FIG. 25. The MAC output latch signal MAC_L3 may control the output latch operation for the output latch 123-1 of the MAC operator 420 included in the PIM device 400. The output latch 123-1 of the MAC operator 420 may output the biased result data Y0.0 according to the output latch operation performed in synchronization with the MAC output latch signal MAC_L3. The biased result data Y0.0 output from the output latch 123-1 may be input to the transfer gate 123-2 of the data output circuit 123-A.

At a step 389, the MAC command generator 540 of the PIM controller 500 may generate and transmit the MAC latch reset signal MAC_L_RST to the PIM device 400, as illustrated in FIG. 26. The MAC latch reset signal MAC_L_RST may control an output operation of the biased result data Y0.0 generated by the MAC operator 420 and a reset operation of the output latch 123-1 included in the MAC operator 420. The transfer gate 123-2 receiving the biased result data Y0.0 from the output latch 123-1 of the MAC operator 420 may be synchronized with the MAC latch reset signal MAC_L_RST to output the biased result data Y0.0. In an embodiment, the biased result data Y0.0 output from the MAC operator 120 may be stored into the memory bank 411 through the BIO line in the PIM device 400.

At a step 390, the row number 'R' of the weight matrix for which the MAC arithmetic operation is performed may be increased by '1'. Because the MAC arithmetic operation for the first row among the first to eight rows of the weight matrix has been performed at the previous steps, the row number of the weight matrix may change from '1' to '2' at the step 390. At a step 391, whether the row number changed at the step 390 is greater than the row number of the last row (i.e., the eighth row) of the weight matrix may be determined. Because the row number of the weight matrix is changed to '2' at the step 390, a process of the MAC arithmetic operation may be fed back to the step 384.

If the process of the MAC arithmetic operation is fed back to the step 384 at the step 391, the same processes as described with reference to the steps 384 to 391 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 384 at the step 391, then the processes from the step 384 to the step 390 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 390, then the MAC arithmetic operation may terminate because the row number of '9' is greater than the last row number of '8' at the step 391.

Figure 28:
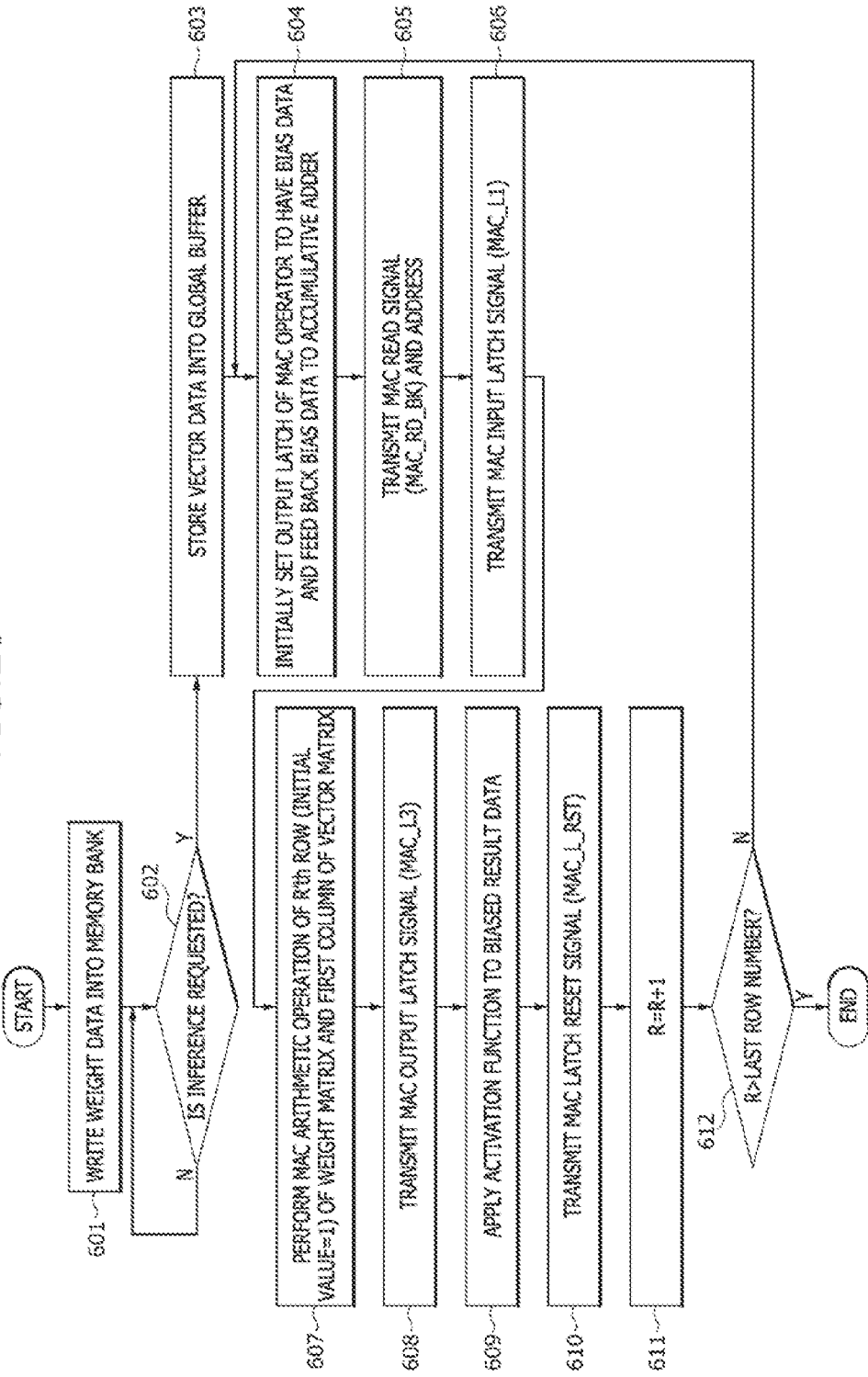
FIG. 28 is a flowchart illustrating processes of the MAC arithmetic operation illustrated in FIG. 17 in a PIM system according to a second embodiment of the present disclosure.

FIG. 28 is a flowchart illustrating processes of the MAC arithmetic operation described with reference to FIG. 17, which are performed in the PIM system 1-2 according to the second embodiment of the present disclosure. In order to perform the MAC arithmetic operation according to the present embodiment, the MAC operator 420 of the PIM device 400 may have the same configuration as the MAC operator 120-2 illustrated in FIG. 19. Referring to FIGS. 19 and 28, the first data (i.e., the weight data) may be written into the memory bank 411 at a step 601 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 17.

At a step 602, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 17. If the inference request signal is transmitted to the PIM controller 500 at the step 602, then the PIM controller 500 may write the vector data transmitted with the inference request signal into the global buffer 412 at a step 603. Accordingly, the vector data may be stored in the global buffer 412 of the PIM device 400.

At a step 604, an output latch of a MAC operator 420 may be initially set to have bias data and the initially set bias data may be fed back to an accumulative adder of the MAC operator 420. This process is executed to perform the matrix adding calculation of the MAC result matrix and the bias matrix, which is described with reference to FIG. 17. That is, as described with reference to FIG. 19, the output latch 123-1 of the data output circuit 123-B included in the MAC operator 420 may be initially set to have the bias data of the bias matrix. Because the matrix multiplying calculation is executed for the first row of the weight matrix, the element B0.0 located at first row of the bias matrix may be initially set as the bias data in the output latch 123-1. The output latch 123-1 may output the bias data B0.0, and the bias data B0.0 output from the output latch 123-1 may be input to the accumulative adder 122-21D of the addition logic circuit 122-2 included in the MAC operator 420.

In an embodiment, in order to output the bias data B0.0 out of the output latch 123-1 and to feed back the bias data B0.0 to the accumulative adder 122-21D, the MAC command generator 540 of the PIM controller 500 may transmit the MAC output latch signal MAC_L3 to the MAC operator 420 of the PIM device 400. When a subsequent MAC arithmetic operation is performed, the accumulative adder 122-21D of the MAC operator 420 may add the MAC result data MAC0.0 output from the adder 122-21C disposed at the last stage of the addition logic circuit 122-2 to the bias data B0.0 which is fed back from the output latch 123-1 to generate the biased result data Y0.0 and may output the biased result data Y0.0 to the output latch 123-1. The biased result data Y0.0 may be output from the output latch 123-1 in synchronization with the MAC output latch signal MAC_L3 transmitted in a subsequent process.

At a step 605, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. The MAC read signal MAC_RD_BK input to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK output from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

At a step 606, the MAC command generator 540 of the PIM controller 500 may generate and transmit the MAC input latch signal MAC_L1 to the PIM device 400, as described with reference to FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be input to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be input to the first to eighth multipliers 122-11, respectively, and the elements X0.0, . . . , and X7.0 in the first column of the vector matrix may also be input to the first to eighth multipliers 122-11, respectively.

At a step 607, the MAC circuit 122 of the MAC operator 420 may perform the MAC arithmetic operation of an $R^{th}$ row of the weight matrix and the first column of the vector matrix, which are input to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the input data, and the result data of the multiplying calculation may be input to the addition logic circuit 122-2. The addition logic circuit 122-2 may receive output data of the multipliers 122-11 and may perform the adding calculation of the output data of the multipliers 122-11 to output the result data of the adding calculation to the accumulative adder 122-21D. The output data of the adder 122-21C included in the addition logic circuit 122-2 may correspond to result data (i.e., the MAC result data MAC0.0) of the MAC arithmetic operation of the first row included in the weight matrix and the column included in the vector matrix. The accumulative adder 122-21D may add the output data MAC0.0 of the adder 122-21C to the bias data B0.0 fed back from the output latch 123-1 and may output the result data of the adding calculation. The output data (i.e., the biased result data Y0.0) of the accumulative adder 122-21D may be input to the output latch 123-1 disposed in the data output circuit 123-A of the MAC operator 420.

At a step 608, the MAC command generator 540 of the PIM controller 500 may generate and transmit the MAC output latch signal MAC_L3 to the PIM device 400, as described with reference to FIG. 25. The MAC output latch signal MAC_L3 may control the output latch operation for the output latch 123-1 of the MAC operator 420 included in the PIM device 400. The output latch 123-1 of the MAC operator 420 may output the biased result data Y0.0 according to the output latch operation performed in synchronization with the MAC output latch signal MAC_L3. The biased result data Y0.0 output from the output latch 123-1 may be input to the activation function logic circuit 123-5, which is illustrated in FIG. 19. At a step 610, the activation function logic circuit 123-5 may apply an activation function to the biased result data Y0.0 to generate a final output value, and the final output value may be input to the transfer gate (123-2 of FIG. 4).

At a step 610, the MAC command generator 540 of the PIM controller 500 may generate and transmit the MAC latch reset signal MAC_L_RST to the PIM device 400, as described with reference to FIG. 26. The MAC latch reset signal MAC_L_RST may control an output operation of the final output value generated by the MAC operator 420 and a reset operation of the output latch 123-1 included in the MAC operator 420. The transfer gate 123-2 receiving the final output value from the activation function logic circuit 123-5 of the data output circuit 123-B included in the MAC operator 420 may be synchronized with the MAC latch reset signal MAC_L_RST to output the final output value. In an embodiment, the final output value output from the MAC operator 420 may be stored into the memory bank 411 through the BIO line in the PIM device 400.

At a step 611, the row number 'R' of the weight matrix for which the MAC arithmetic operation is performed may be increased by '1'. Because the MAC arithmetic operation for the first row among the first to eight rows of the weight matrix has been performed at the previous steps, the row number of the weight matrix may change from '1' to '2' at the step 611. At a step 612, whether the row number changed at the step 611 is greater than the row number of the last row (i.e., the eighth row) of the weight matrix may be determined. Because the row number of the weight matrix is changed to '2' at the step 611, a process of the MAC arithmetic operation may be fed back to the step 604.

If the process of the MAC arithmetic operation is fed back to the step 604 from the step 612, the same processes as described with reference to the steps 604 to 612 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix to generate the MAC result data (corresponding to the element MAC1.0 located in the second row of the MAC result matrix) and the bias data (corresponding to the element B1.0 located in the second row of the bias matrix). If the process of the MAC arithmetic operation is fed back to the step 604 from the step 612, the processes from the step 604 to the step 612 may be iteratively performed until the MAC arithmetic operation is performed for all of the rows (i.e., first to eighth rows) of the weight matrix with the vector matrix. If the MAC arithmetic operation for the eighth row of the weight matrix terminates and the row number of the weight matrix changes from '8' to '9' at the step 611, the MAC arithmetic operation may terminate because the row number of '9' is greater than the last row number of '8' at the step 612.

Figure 29:
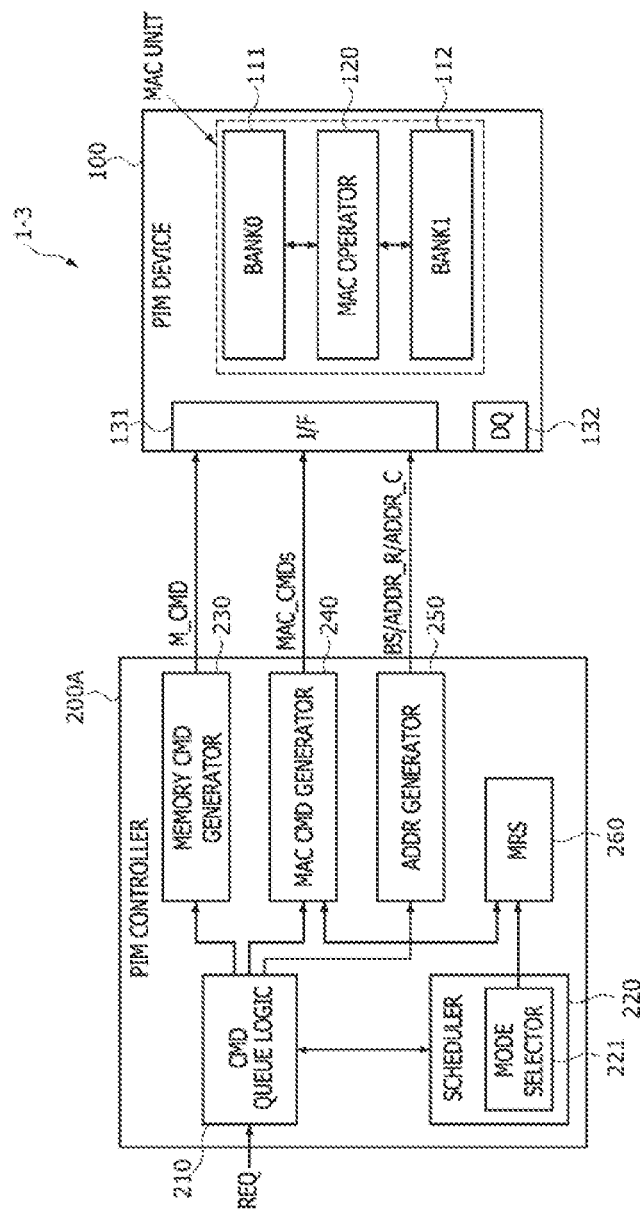
FIG. 29 is a block diagram illustrating a PIM system according to yet another embodiment of the present disclosure.

FIG. 29 is a block diagram illustrating a PIM system 1-3 according to a third embodiment of the present disclosure. As illustrated in FIG. 29, the PIM system 1-3 may have substantially the same configuration as the PIM system 1-1 illustrated in FIG. 2 except that a PIM controller 200A of the PIM system 1-3 further includes a mode register set (MRS) 260 as compared with the PIM controller 200 of the PIM system 1-1. Thus, the same explanation as described with reference to FIG. 2 will be omitted hereinafter. The mode register set 260 in the PIM controller 200A may receive an MRS signal instructing arrangement of various signals necessary for the MAC arithmetic operation of the PIM system 1-3. In an embodiment, the mode register set 260 may receive the MRS signal from the mode selector 221 included in the scheduler 220. However, in another embodiment, the MRS signal may be provided by an extra logic circuit other than the mode selector 221. The mode register set 260 receiving the MRS signal may transmit the MRS signal to the MAC command generator 240. For an embodiment, the MRS 260 represents a MRS circuit.

In an embodiment, the MRS signal may include timing information on when the MAC commands MAC_CMDs are generated. In such a case, the deterministic operation of the PIM system 1-3 may be performed by the MRS signal provided by the MRS 260. In another embodiment, the MRS signal may include information on the timing related to an interval between the MAC modes or information on a mode change between the MAC mode and the memory mode. In an embodiment, generation of the MRS signal in the MRS 260 may be executed before the vector data are stored in the second memory bank 112 of the PIM device 100 by the inference request signal transmitted from an external device to the PIM controller 200A. Alternatively, the generation of the MRS signal in the MRS 260 may be executed after the vector data are stored in the second memory bank 112 of the PIM device 100 by the inference request signal transmitted from an external device to the PIM controller 200A.

Figure 30:
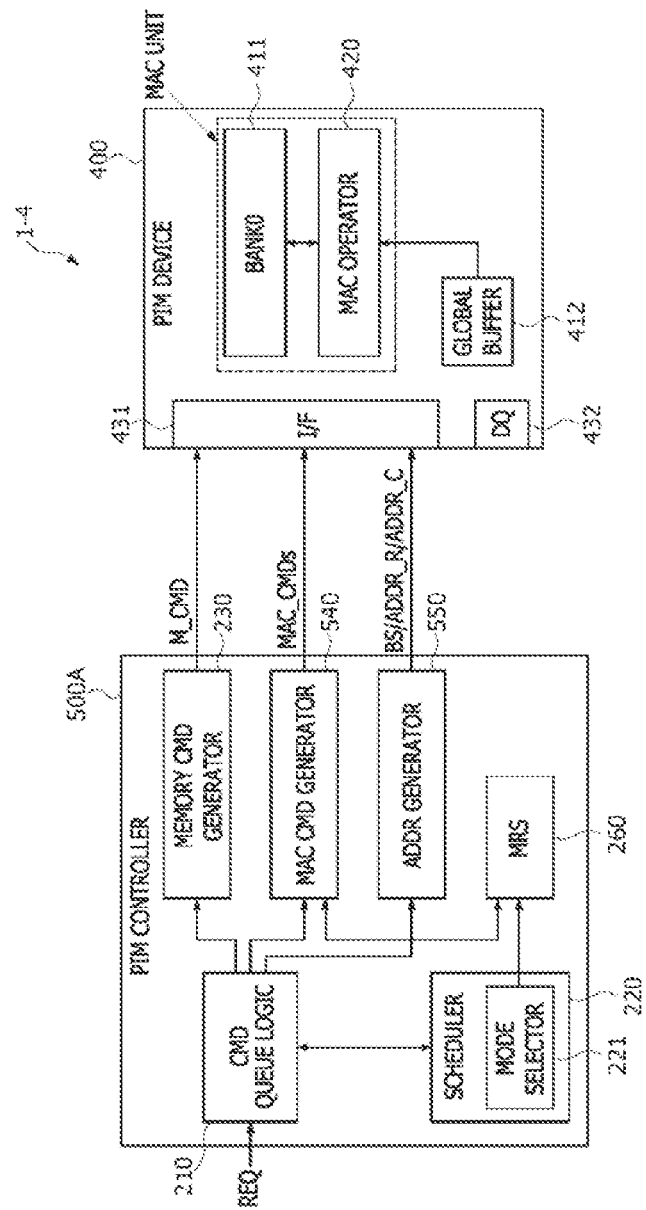
FIG. 30 is a block diagram illustrating a PIM system according to still another embodiment of the present disclosure.

FIG. 30 is a block diagram illustrating a PIM system 1-4 according to a fourth embodiment of the present disclosure. As illustrated in FIG. 30, the PIM system 1-4 may have substantially the same configuration as the PIM system 1-2 illustrated in FIG. 20 except that a PIM controller 500A of the PIM system 1-4 further includes the mode register set (MRS) 260 as compared with the PIM controller 500 of the PIM system 1-2. Thus, the same explanation as described with reference to FIG. 20 will be omitted hereinafter. The mode register set 260 in the PIM controller 500A may receive an MRS signal instructing arrangement of various signals necessary for the MAC arithmetic operation of the PIM system 1-4. In an embodiment, the mode register set 260 may receive the MRS signal from the mode selector 221 included in the scheduler 220. However, in another embodiment, the MRS signal may be provided by an extra logic circuit other than the mode selector 221. The mode register set 260 receiving the MRS signal may transmit the MRS signal to the MAC command generator 540.

In an embodiment, the MRS signal may include timing information on when the MAC commands MAC_CMDs are generated. In such a case, the deterministic operation of the PIM system 1-4 may be performed by the MRS signal provided by the MRS 260. In another embodiment, the MRS signal may include information on the timing related to an interval between the MAC modes or information on a mode change between the MAC mode and the memory mode. In an embodiment, generation of the MRS signal in the MRS 260 may be executed before the vector data are stored in the global buffer 412 of the PIM device 400 by the inference request signal transmitted from an external device to the PIM controller 500A. Alternatively, the generation of the MRS signal in the MRS 260 may be executed after the vector data are stored in the global buffer 412 of the PIM device 400 by the inference request signal transmitted from an external device to the PIM controller 500A.

Figure 31:
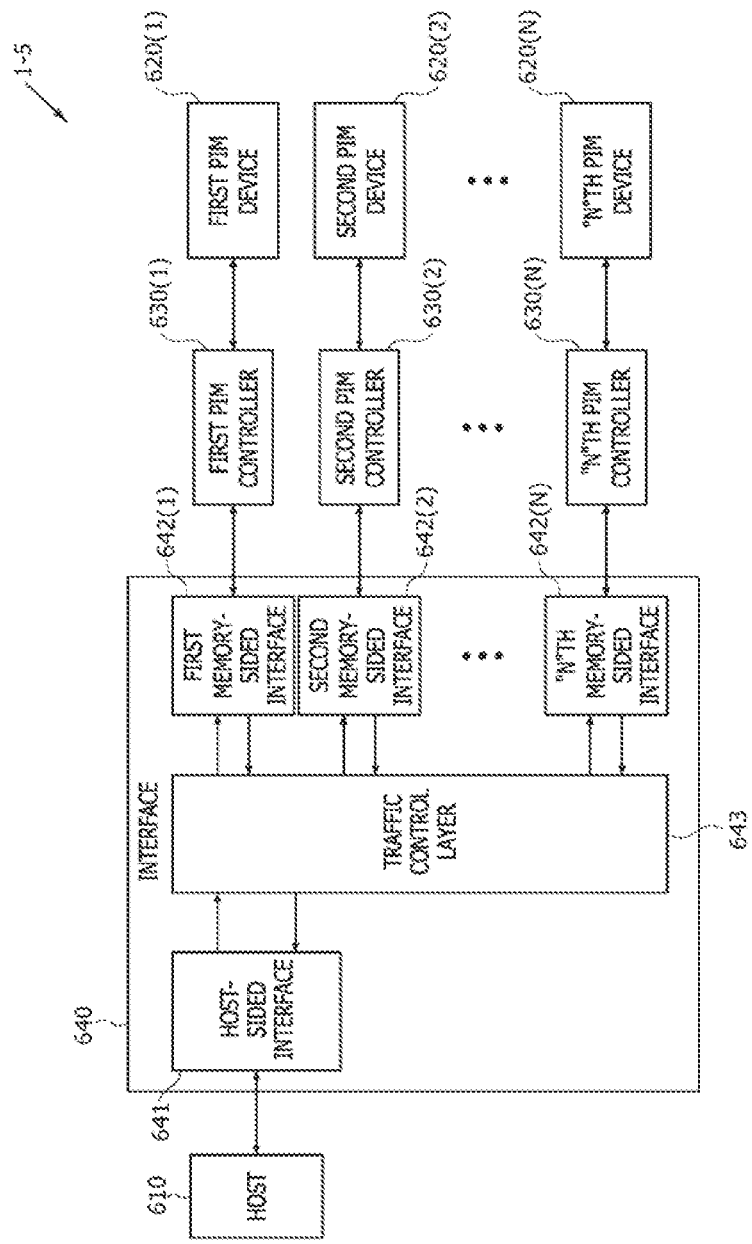
FIG. 31 is a block diagram illustrating a PIM system according to further another embodiment of the present disclosure.

FIG. 31 is a block diagram illustrating a PIM system 1-5 according to another embodiment of the present disclosure. Referring to FIG. 31, the PIM device 1-5 may include a host 610, a plurality of PIM devices (e.g., first to $N^{th}$ PIM devices 620(1)~620(N)), a plurality of PIM controllers (e.g., first to $N^{th}$ PIM controllers 630(1)~630(N)), and an Interface 640 (where, "N" is a natural number which is equal to or greater than two). As used herein, the tilde "~" Indicates a range of components. For example, "620(1)~620(N)" indicates the PIM devices 620(1), 620(2), . . . , and 620(N) shown in FIG. 31. The host 610 may output a memory access request or a MAC-related request that requests operations of the first to $N^{th}$ PIM devices 620(1)~620(N). The first to $N^{th}$ PIM devices 620(1)~620(N) may perform operations corresponding to the memory access request or the MAC-related request output from the host 610. In an embodiment, each of the first to $N^{th}$ PIM devices 620(1)~620(N) may be the PIM device 100 illustrated in FIG. 2 or the PIM device 400 illustrated in FIG. 20. In another embodiment, each of the first to $N^{th}$ PIM devices 620(1)~620(N) may include a plurality of memory banks and a plurality of MAC operators. In yet another embodiment, each of the first to $N^{th}$ PIM devices 620(1)~620(N) may include a plurality of memory banks, a plurality of MAC operators, and a global buffer.

When the memory access request is output from the host 610, each of the first to $N^{th}$ PIM devices 620(1)~620(N) may perform a memory access operation, for example, a data read operation or a data write operation. In such a case, the memory access operation may be performed by any one PIM device (hereinafter, referred to as a target PIM device), which is designated by the host 610, among the first to $N^{th}$ PIM devices 620(1)~620(N). When the MAC-related request is output from the host 610, each of the first to $N^{th}$ PIM devices 620(1)~620(N) may perform an operation which is related to a MAC arithmetic operation. The operation corresponding to the MAC-related request may be performed by only the target PIM device or by all of the first to $N^{th}$ PIM devices 620(1)~620(N). Hereinafter, the memory access request or the MAC-related request for requesting an operation performed by the target PIM device will be referred to as a single access request. In addition, the MAC-related request for requesting an operation performed by all of the PIM device 620(1)~620(N) will be referred to as a multi-access request.

The PIM controllers 630(1)~630(N) may control the PIM devices 620(1)~620(N), respectively. In order that the PIM controllers 630(1)~630(N) control respective ones of the PIM devices 620(1)~620(N), the PIM controllers 630(1)~630(N) may be related to respective ones of the PIM devices 620(1)~620(N). Hereinafter, the term "be related to" or "relate to" may be used to describe a connection relationship between two elements which are capable of communicating with each other. For example, the first PIM controller 630(1) may be related to the first PIM device 620(1) to control an operation of the first PIM device 620(1), and the second PIM controller 630(2) may be related to the second PIM device 620(2) to control an operation of the second PIM device 620(2). Similarly, the $N^{th}$ second PIM controller 630(N) may be related to the $N^{th}$ PIM device 620(N) to control an operation of the $N^{th}$ PIM device 620(N). One PIM controller (hereinafter, referred to as a target PIM controller) controlling the target PIM device among the PIM controller 630(1)~630(N) may receive the memory access request or the MAC-related request from the host 610 through the interface 640 and may transmit a command corresponding to the received memory access request or the received MAC-related request to the related PIM device.

The interface 640 may be disposed between the host 610 and the PIM controllers 630(1)~630(N). That is, the interface 640 may communicate with the host 610 and may also communicate with the PIM controller 630(1)~630(N). The interface 640 may include a host-sided interface 641, a plurality of memory-sided interfaces (e.g., first to $N^{th}$ memory-sided interfaces 642(1)~642(N), and a traffic control layer 643. The host-sided interface 641 may transmit request data, which are output from the host 610, to the traffic control layer 643. The request data may include request/address information or request/address/data information. In addition, the host-sided interface 641 may transmit completion data, read data, or MAC result data, which are output from the traffic control layer 643, to the host 610. The completion data may be generated when response data indicating termination of a requested operation of the PIM device are transmitted to the traffic control layer 643 of the interface 640.

The first to $N^{th}$ memory-sided interfaces 642(1)~642(N) of the interface 640 may be related to the first to $N^{th}$ PIM controllers 630(1)~630(N), respectively. For example, the first memory-sided interface 642(1) may be related to the first PIM controller 630(1). That is, the first memory-sided interface 642(1) communicates with only the first PIM controller 630(1) and does not communicate with the other PIM controllers (i.e., the second to $N^{th}$ PIM controllers 630(2)~630(N)). In addition, the second memory-sided interface 642(2) may be related to the second PIM controller 630(2). That is, the second memory-sided interface 642(2) communicates with only the second PIM controller 630(2) and does not communicate with the other PIM controllers (i.e., the first and third to $N^{th}$ PIM controllers 630(1) and 630(3)~630(N)). Similarly, the $N^{th}$ memory-sided interface 642(N) communicates with only the $N^{th}$ PIM controller 630(N) and does not communicate with the other PIM controllers (i.e., the first to $(N-1)^{th}$ PIM controllers 630(1)~630(N-1)). When the request/address Information or the request/address/data information is transmitted from the traffic control layer 643 to a certain memory-sided interface of the first to $N^{th}$ memory-sided interfaces 642(1)~642(N), the certain memory-sided interface may supply the request/address information or the request/address/data information to a PIM controller related to the certain memory-sided interface among the first to $N^{th}$ PIM controllers 630(1)~630(N). As used herein, the "/" means "and." For example, "the request/address information" means "the request information and the address information." In addition, when the response data, the read data, or the MAC result data are transmitted from one of the first to $N^{th}$ PIM controllers 630(1)~630(N) to a certain memory-sided interface of the first to $N^{th}$ memory-sided interfaces 642(1)~642(N), the certain memory-sided interface may supply the response data, the read data, or the MAC result data to the traffic control layer 643.

The traffic control layer 643 may be disposed between the host-sided interface 641 and the first to $N^{th}$ memory-sided interfaces 642(1)~642(N). The traffic control layer 643 may set a flag signal to a first logic level or a second logic level according to a request output from the host-sided interface 641. Hereinafter, it may be assumed that the first logic level is a logic "low" level and the second logic level is a logic "high" level. In an embodiment, when the single access request is transmitted from the host-sided interface 641 to the traffic control layer 643, the traffic control layer 643 may set the flag signal to a logic "low" level. In such a case, the traffic control layer 643 may transmit the request/address information or the request/address/data information to a target memory-sided interface. The target memory-sided interface means a memory-sided interface which is related to a PIM controller controlling a target PIM device that performs an operation corresponding to a request. In addition, when the response data, the read data, or the MAC result data are transmitted from the target memory-sided interface to the traffic control layer 643, the traffic control layer 643 may transmit the completion data, the read data, or the MAC result data to the host-sided interface 641. In another embodiment, when the multi-access request is transmitted from the host-sided interface 641 to the traffic control layer 643, the traffic control layer 643 may set the flag signal to the flag signal to a logic "high" level. In such a case, the traffic control layer 643 may transmit the request/address information or the request/address/data information to all of the first to $N^{th}$ memory-sided interfaces 642(1)~642(N). In addition, when the response data are transmitted from all of the first to $N^{th}$ memory-sided interfaces 642(1)~642(N) to the traffic control layer 643, the traffic control layer 643 may transmit the completion data to the host-sided interface 641.

Figure 32:
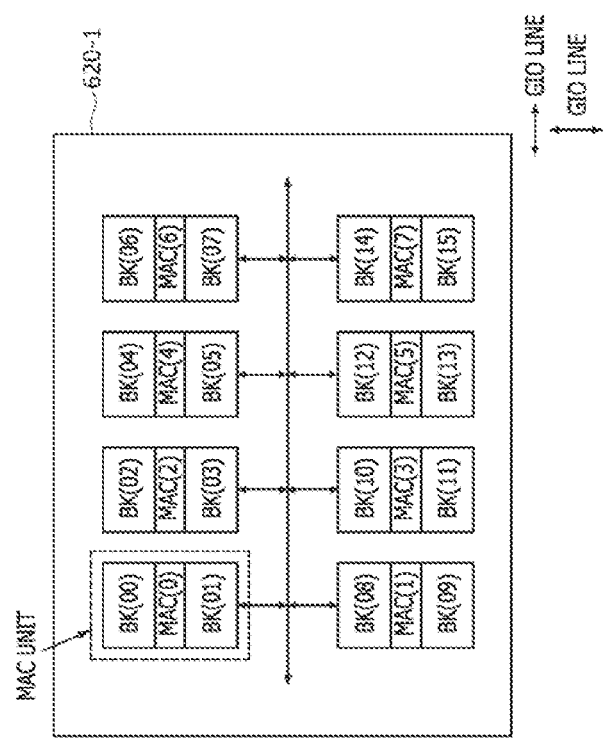
FIG. 32 illustrates an example of one of PIM devices included in the PIM system illustrated in FIG. 31.

FIG. 32 illustrates a PIM device 620-1 corresponding to an example of one of the first to $N^{th}$ PIM devices 620(1)~620(N) included in the PIM system 1-5 of FIG. 31. The following description for the PIM device 620-1 may be equally applied to each of the first to $N^{th}$ PIM devices 620(1)~620(N) illustrated in FIG. 31. Referring to FIG. 32, the PIM device 620-1 may include a plurality of memory banks (e.g., first to sixteenth memory banks BK(00)~BK(15)) and a plurality of MAC operators (e.g., first to eight MAC operators MAC(0)~MAC(7)). In addition, the PIM device 620-1 may further include global I/O (GIO) lines providing a data transmission path between an external device and internal elements (e.g., the memory banks BK(00)~BK(15), the MAC operators MAC(0)~MAC(7)) of the PIM device 620-1. Two of the memory banks BK(00)~BK(15) and one of the MAC operators MAC(0)~MAC(7) may constitute one MAC unit. For example, the first memory bank BK(00), the second memory bank BK(01), and the first MAC operator MAC(0) may constitute a first MAC unit. As a result, the PIM device 620-1 may include eight MAC units. A MAC operator included in a certain MAC unit may receive weight data and vector data from respective ones of two memory banks included in the certain MAC unit. For example, the first MAC operator MAC(0) may receive the weight data from the first memory bank BK(00) and may receive the vector data from the second memory bank BK(01). Each of the MAC units may perform the same operation as described with reference to FIGS. 7 to 13.

Each of the MAC operators MAC(0)~MAC(7) may perform a MAC arithmetic operation using the weight data and the vector data as input data, thereby generating and outputting MAC result data. Each of the MAC operators MAC(0)~MAC(7) may perform the MAC arithmetic operation in response to various MAC commands input to the PIM device 620-1. The MAC arithmetic operations of the MAC operators MAC(0)~MAC(7) may be performed in synchronization with the same clock signal. While eight groups of weight data input to respective ones of the first to eighth MAC operators MAC(0)~MAC(7) are different from each other, eight groups of vector data input to respective ones of the first to eighth MAC operators MAC(0)~MAC(7) may be the same vector data. For example, while first to eighth groups of weight data are transmitted to respective ones of the first to eighth MAC operators MAC(0)~MAC(7), one group of vector data may be transmitted to each of the first to eighth MAC operators MAC(0)~MAC(7).

Figure 33:
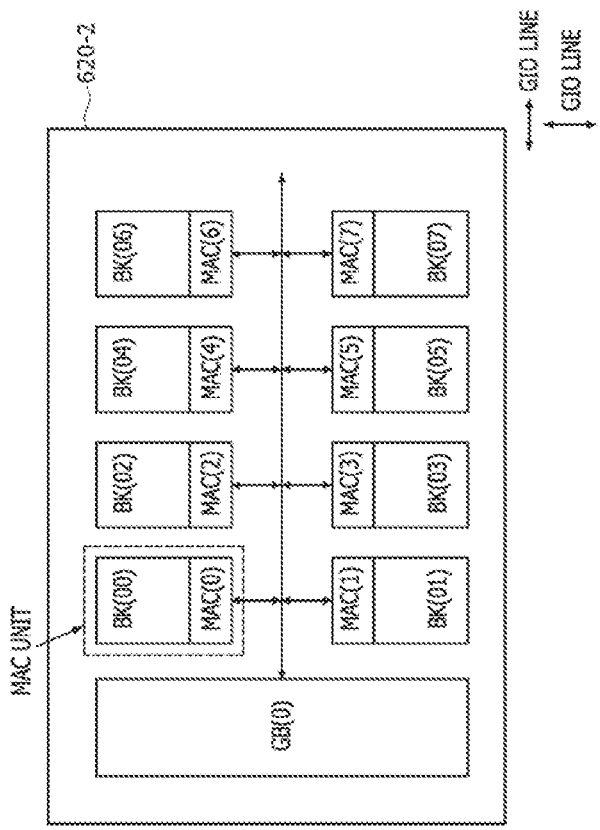
FIG. 33 illustrates another example of one of PIM devices included in the PIM system illustrated in FIG. 31.

FIG. 33 illustrates a PIM device 620-2 corresponding to another example of one of the first to $N^{th}$ PIM devices 620(1)~620(N) included in the PIM system 1-5 of FIG. 31. The following description for the PIM device 620-2 may be equally applied to each of the first to $N^{th}$ PIM devices 620(1)~620(N) illustrated in FIG. 31. Referring to FIG. 33, the PIM device 620-2 may include a plurality of memory banks (e.g., first to eighth memory banks BK(00)~BK(07)), a global buffer GB(0), and a plurality of MAC operators (e.g., first to eight MAC operators MAC(0)~MAC(7)). In addition, the PIM device 620-2 may further include a global I/O (GIO) line providing a data transmission path between an external device and internal elements (e.g., the memory banks BK(00)~BK(07)) of the PIM device 620-2. One of the memory banks BK(00)~BK(07) and one of the MAC operators MAC(0)~MAC(7) may constitute one MAC unit. For example, the first memory bank BK(00) and the first MAC operator MAC(0) may constitute a first MAC unit. As a result, the PIM device 620-2 may include eight MAC units. A MAC operator included in a certain MAC unit may receive weight data from a memory bank included in the certain MAC unit. For example, the first MAC operator MAC(0) may receive the weight data from the first memory bank BK(00). In an embodiment, first to eighth groups of weight data may be output from respective ones of the first to eighth memory banks BK(00)~BK(07) and may be transmitted to respective ones of the first to eighth MAC operators MAC(0)~MAC(7). The global buffer GB(0) may provide each of the first to eighth MAC operators MAC(0)~MAC(7) with vector data (i.e., one group of vector data). Each of the eight MAC units and the global buffer may perform the same operations as described with reference to FIGS. 23 to 26.

Each of the MAC operators MAC(0)~MAC(7) may perform a MAC arithmetic operation using the weight data and the vector data as input data, thereby generating and outputting MAC result data. Each of the MAC operators MAC(0)~MAC(7) may perform the MAC arithmetic operation in response to various MAC commands input to the PIM device 620-2. The MAC arithmetic operations of the MAC operators MAC(0)~MAC(7) may be performed in synchronization with the same clock signal. While eight groups of weight data input to respective ones of the first to eighth MAC operators MAC(0)~MAC(7) are different from each other, eight groups of vector data input to respective ones of the first to eighth MAC operators MAC(0)~MAC(7) may be the same vector data. For example, while first to eighth groups of weight data are transmitted to respective ones of the first to eighth MAC operators MAC(0)~MAC(7), one group of vector data may be transmitted to each of the first to eighth MAC operators MAC(0)~MAC(7).

FIG. 34 is a table illustrating operations of the PIM devices 620(1)~620(N) performed according to various requests generated by the host 610 of the PIM system 1-5 illustrated in FIG. 31. Referring to FIG. 34, in the PIM system 1-5, a request transmitted from the host 610 to the interface 640 may be categorized as either a memory access request REQ_ME or a MAC-related request REQ_MO. The memory access request REQ_ME may be a request related to a memory access operation, and the MAC-related request REQ_MO may be a request related to the MAC arithmetic operation. The memory access request REQ_ME may be classified as a write request REQ_W or a read request REQ_R. The write request REQ_W may request an operation for writing write data into a target PIM device, and the read request REQ_R may request an operation for reading out read data stored in the target PIM device. The MAC-related request REQ_MO may be classified as a write request REQ_WW or REQ_VW, a read request REQ_MR, or a MAC operation request REQ_MAC. The write request REQ_WW may request an operation for writing the weight data into the target PIM device. The write request REQ_VW may request an operation for writing the vector data into each of the PIM devices 620(1)~620(N). In addition, the read request REQ_MR may request an operation for reading the MAC result data out of the target PIM device. Moreover, the MAC operation request REQ_MAC may be a request for performing the MAC arithmetic operations of the PIM devices 620(1)~620(N).

When a certain write request of the write requests REQ_W, REQ_WW, and REQ_VW is output from the host 610, the certain write request of the write requests REQ_W, REQ_WW, and REQ_VW may be transmitted to a target PIM controller or all of the PIM controllers 630(1)~630(N) through the interface 640, and the target PIM controller or all of the PIM controllers 630(1)~630(N) may generate and output a write command CMD_W to a target PIM device or all of the PIM devices 620(1)~620(N). When a certain read request of the read requests REQ_R and REQ_MR is output from the host 610, the certain read request of the read requests REQ_R and REQ_MR may be transmitted to the target PIM controller or all of the PIM controllers 630(1)~630(N) through the interface 640, and the target PIM controller or all of the PIM controllers 630(1)~630(N) may generate and output a read command CMD_R to the target PIM device or all of the PIM devices 620(1)~620(N). When the MAC operation request REQ_MAC is output from the host 610, the MAC operation request REQ_MAC may be transmitted to all of the PIM controllers 630(1)~630(N) through the interface 640, and all of the PIM controllers 630(1)~630(N) may generate and output a MAC command CMD_MAC to all of the PIM devices 620(1)~620(N).

The write command CMD_W or the read command CMD_R generated by the memory access request REQ_ME may control an operation which is performed by the target PIM device according to the single access request. The write command CMD_W generated by the write request REQ_WW for the weight data in the MAC-related request REQ_MO may control an operation which is performed by the target PIM device according to the single access request. The read command CMD_R generated by the read request REQ_MR for the MAC result data MAC_RST in the MAC-related request REQ_MO may control an operation which is performed by the target PIM device according to the single access request. In contrast, the MAC command CMD_MAC generated by the MAC operation request REQ_MAC in the MAC-related request REQ_MO may control operations which are performed by all of the target PIM devices 620(1)~620(N) according to the multi-access request. In addition, the write command CMD_W generated by the write request REQ_VW for the vector data in the MAC-related request REQ_MO may control operations which are performed by all of the target PIM devices 620(1)~620(N) according to the multi-access request.

As described with reference to FIG. 31, the traffic control layer 643 of the interface 640 may set the flag signal to a logic "low" level when the single access request is transmitted from the host-sided interface 641 to the traffic control layer 643. In contrast, when the multi-access request is transmitted from the host-sided interface 641 to the traffic control layer 643, the traffic control layer 643 may set the flag signal to a logic "high" level. Thus, when the write request REQ_W or the read request REQ_R in the memory access request REQ_ME is transmitted from the host 610 to the interface 640, the traffic control layer 643 of the interface 640 may set the flag signal to a logic "low" level. In addition, even when the write request REQ_WW for the weight data or the read request REQ_MR for the MAC result data is transmitted from the host 610 to the interface 640, the traffic control layer 643 of the interface 640 may set the flag signal to a logic "low" level. In contrast, when the MAC operation request REQ_MAC or the write request REQ_VW for the vector data is transmitted from the host 610 to the interface 640, the traffic control layer 643 of the interface 640 may set the flag signal to a logic "high" level.

Figure 35:
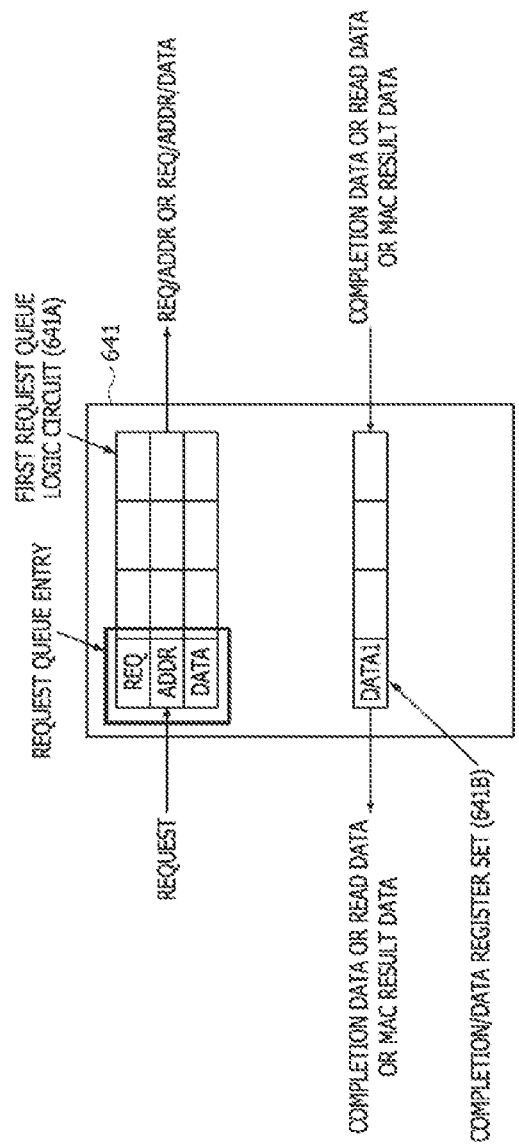
FIG. 35 illustrates an example of a host-sided interface included in an interface of the PIM system illustrated in FIG. 31.

FIG. 35 illustrates an example of the host-sided interface 641 included in the interface 640 of the PIM system 1-5 illustrated in FIG. 31. Referring to FIGS. 31 and 35, the host-sided interface 641 may include a first request queue logic circuit 641A and a completion/data register set 641B. The first request queue logic circuit 641A may temporarily store request data REQUEST output from the host 610. The completion/data register set 641B may temporarily store first data DATA1 output from the traffic control layer 643. Specifically, the first request queue logic circuit 641A may have a plurality of request queue entries. Information (e.g., request/address (REQ/ADDR) information or request/address/data (REQ/ADDR/DATA) information) included in the request data REQUEST output from the host 610 may be stored in each of the plurality of request queue entries included in the first request queue logic circuit 641A.

The completion/data register set 641B may have a plurality of storage regions. The first data DATA1 output from the traffic control layer 643 may be stored in one of the storage regions of the completion/data register set 641B. In an embodiment, the first data DATA1 may include the completion data, the read data, or the MAC result data. The number of the storage regions in the completion/data register set 641B may be equal to the number of the request queue entries in the first request queue logic circuit 641A. The storage regions in the completion/data register set 641B may be related to the request queue entries in the first request queue logic circuit 641A, respectively. For example, a first storage region of the completion/data register set 641B may be related to a first request queue entry of the first request queue logic circuit 641A. Thus, when the completion data corresponding to the first data DATA1 are stored in the first storage region of the completion/data register set 641B, it may mean that an operation according to a request REQ of the first request queue entry of the first request queue logic circuit 641A terminates in the target PIM device. When the first data DATA1 are stored in the completion/data register set 641B, the host-sided interface 641 may transmit the first data DATA1 to the host 610 to inform the host 610 that a request REQ of the first request queue entry of the first request queue logic circuit 641A terminates in the target PIM device.

Figure 36:
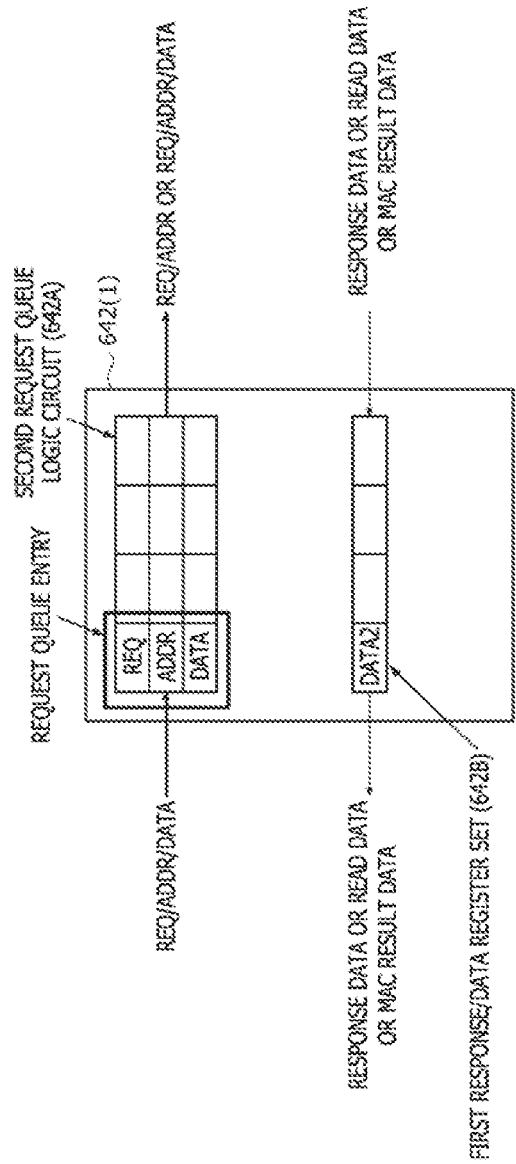
FIG. 36 illustrates an example of a first memory-sided interface included in an interface of the PIM system illustrated in FIG. 31.

FIG. 36 illustrates an example of the first memory-sided interface 642(1) included in the interface 640 of the PIM system 1-5 illustrated in FIG. 31. The following description for the first memory-sided interface 642(1) may be equally applied to each of the second to $N^{th}$ memory-sided interfaces 642(2)~642(N) illustrated in FIG. 31. Referring to FIGS. 31 and 36, the first memory-sided interface 642(1) may include a second request queue logic circuit 642A and a first response/data register set 642B. The second request queue logic circuit 642A may temporarily store the request/address (REQ/ADDR) information or the request/address/data (REQ/ADDR/DATA) information output from the traffic control layer 643. The first response/data register set 642B may temporarily store second data DATA2 output from the first PIM controller 630(1) related to the first memory-sided interface 642(1). Specifically, the second request queue logic circuit 642A may have a plurality of request queue entries. Information (e.g., the request/address (REQ/ADDR) information or the request/address/data (REQ/ADDR/DATA) information) output from the traffic control layer 643 may be stored in each of the plurality of request queue entries included in the second request queue logic circuit 642A.

The first response/data register set 642B may have a plurality of storage regions. In an embodiment, each of the plurality of storage regions may be comprised of a register. The second data DATA2 output from the first PIM controller 630(1) may be stored in one of the storage regions of the first response/data register set 642B. In an embodiment, the second data DATA2 may include the response data, the read data, or the MAC result data. The number of the storage regions in the first response/data register set 642B may be equal to the number of the request queue entries in the second request queue logic circuit 642A. The storage regions in the first response/data register set 642B may be related to the request queue entries in the second request queue logic circuit 642A, respectively. For example, a first storage region of the first response/data register set 642B may be related to a first request queue entry of the second request queue logic circuit 642A. Thus, when the response data corresponding to the second data DATA2 are stored in the first storage region of the first response/data register set 642B, it may mean that an operation according to a request REQ of the first request queue entry of the second request queue logic circuit 642A terminates in the target PIM device. When the second data DATA2 are stored in the first response/data register set 642B, the first memory-sided interface 642(1) may transmit the second data DATA2 to the traffic control layer 643 to inform the traffic control layer 643 that a request REQ of the first request queue entry of the second request queue logic circuit 642A terminates in the target PIM device.

Figure 37:
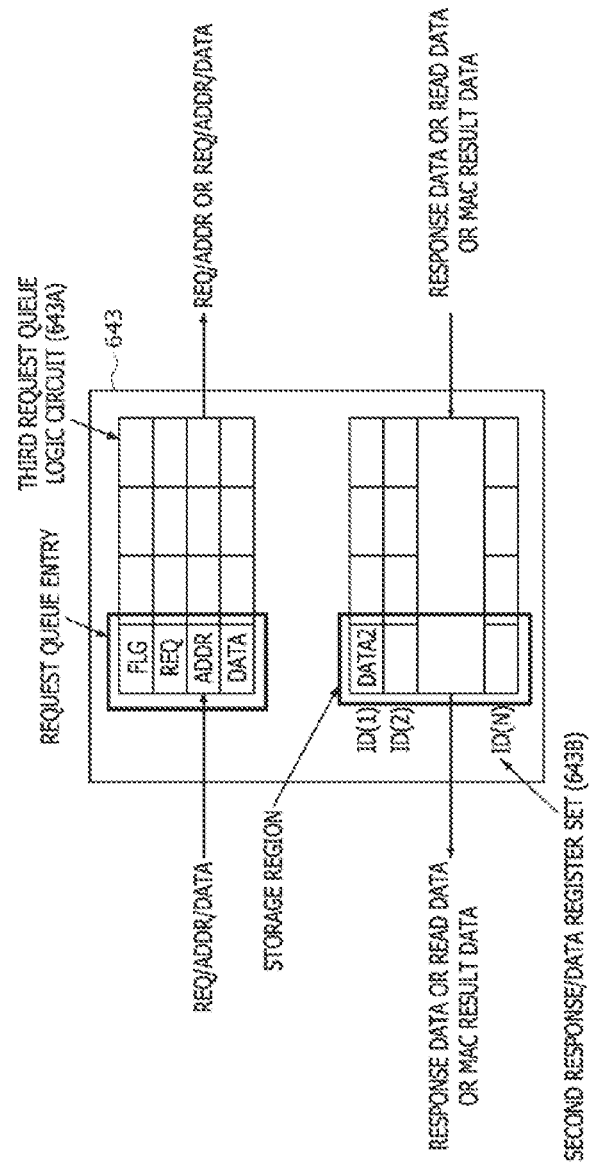
FIG. 37 illustrates an example of a traffic control layer included in an interface of the PIM system illustrated in FIG. 31.

FIG. 37 illustrates an example of the traffic control layer 643 included in the interface 640 of the PIM system 1-5 illustrated in FIG. 31. Referring to FIGS. 31 and 37, the traffic control layer 643 may include a third request queue logic circuit 643A and a second response/data register set 643B. The third request queue logic circuit 643A may temporarily store the request/address (REQ/ADDR) information or the request/address/data (REQ/ADDR/DATA) information output from the host-sided interface 641. The third request queue logic circuit 643A may set a logic level of the flag signal FLG according to a request REQ input to the third request queue logic circuit 643A. The second response/data register set 643B may temporarily store the second data DATA2 output from the first PIM controller 630(1) related to the first memory-sided interface 642(1). Specifically, the third request queue logic circuit 643A may have a plurality of request queue entries. The flag signal FLG may be stored in each of the plurality of request queue entries included in the third request queue logic circuit 643A, and the request/address (REQ/ADDR) information or the request/address/data (REQ/ADDR/DATA) information output from the host-sided interface 641 may be stored in each of the plurality of request queue entries included in the third request queue logic circuit 643A.

The second response/data register set 643B may have a plurality of storage regions. The plurality of storage regions of the second response/data register set 643B may be related to the plurality of request queue entries included in the third request queue logic circuit 643A, respectively. For example, a first storage region of the second response/data register set 643B may be related to a first request queue entry of the third request queue logic circuit 643A. Thus, when the response data corresponding to the second data DATA2 are stored in the first storage region of the second response/data register set 643B, it may mean that an operation according to a request REQ of the first request queue entry of the third request queue logic circuit 643A terminates in the target PIM device. Similarly, when the read data or the MAC result data corresponding to the second data DATA2 are stored in the second storage region of the second response/data register set 643B, it may mean that a read operation according to the request REQ of the second request queue entry of the third request queue logic circuit 643A terminates in the target PIM device.

Each of the plurality of storage regions of the second response/data register set 643B may have "N"-number of entries. That is, the first storage region of the second response/data register set 643B may have first to $N^{th}$ entries, and each of the remaining storage regions of the second response/data register set 643B may also have first to $N^{th}$ entries. The first to $N^{th}$ entries included in each of the plurality of storage regions of the second response/data register set 643B may be allocated to the first to $N^{th}$ PIM devices 620(1)~620(N), respectively. In order to allocate the first to $N^{th}$ entries included in each of the plurality of storage regions of the second response/data register set 643B to respective ones of the first to $N^{th}$ PIM devices 620(1)~

620(N), the first to N$^{th}$ entries included in each of the plurality of storage regions of the second response/data register set 643B may be endowed with their own identification numbers. For example, the first entries of the plurality of storage regions included in the second response/data register set 643B may be endowed with a first identification number ID(1) corresponding to the first PIM device 620(1), and the second entries of the plurality of storage regions included in the second response/data register set 643B may be endowed with a second identification number ID(2) corresponding to the second PIM device 620(2). Similarly, the N$^{th}$ entries of the plurality of storage regions included in the second response/data register set 643B may be endowed with an N$^{th}$ identification number ID(N) corresponding to the N$^{th}$ PIM device 620(N). In an embodiment, the identification numbers IDs may be provided to have an address form. The second data DATA2 output from the first PIM device 620(1) may be stored in the first entries having the first identification number ID(1), and the second data DATA2 output from the second PIM device 620(2) may be stored in the second entries having the second identification number ID(2). Similarly, the second data DATA2 output from the N$^{th}$ PIM device 620(N) may be stored in the N$^{th}$ entries having the N$^{th}$ identification number ID(N).

The traffic control layer 643 may set a logic level of the flag signal FLG according to the request REQ output from the host-sided interface 641. As described with reference to FIG. 31, when the request REQ output from the host-sided interface 641 is the single access request, the traffic control layer 643 may set the flag signal FLG of the request queue entry storing the request REQ to a logic "low" level. Accordingly, when the memory access request REQ_ME (i.e., the write request REQ_W or the read request REQ_R of FIG. 34), the write request (REQ_WW of FIG. 34) for the weight data, or the read request (REQ_MR of FIG. 34) for the MAC result data is output from the host-sided interface 641, the traffic control layer 643 may set the flag signal FLG of the request queue entry storing the request REQ to a logic "low" level. In contrast, when the request REQ output from the host-sided interface 641 is the multi-access request, the traffic control layer 643 may set the flag signal FLG of the request queue entry storing the request REQ to a logic "high" level. Accordingly, when the write request (REQ_VW of FIG. 34) for the vector data or the MAC operation request (REQ_MAC of FIG. 34) is output from the host-sided interface 641, the traffic control layer 643 may set the flag signal FLG of the request queue entry storing the request REQ to a logic "high" level.

The traffic control layer 643 may process the second data DATA2 input to the second response/data register set 643B according to a logic level of the flag signal FLG in the request queue entry. Specifically, when the second data DATA2 (e.g., the response data, the read data, or the MAC result data) output from the first to N$^{th}$ memory-sided interfaces 642(1)~642(N) are transmitted to and stored into one of the plurality of storage regions included in the traffic control layer 643, the traffic control layer 643 may check a logic level of the flag signal FLG of the request queue entry corresponding to the storage region in which the second data DATA2 are stored. When the flag signal FLG has a logic "low" level, the traffic control layer 643 may transmit the response data, the read data, or the MAC result data to the host-sided interface 641. In contrast, when the flag signal FLG has a logic "high" level, the traffic control layer 643 may check whether the second data DATA2 (i.e., the response data) are transmitted to all of the first to N$^{th}$ entries included in the corresponding storage region of the second response/data register set 643B. In the event that the response data corresponding to the second data DATA2 are not transmitted to all of the first to N$^{th}$ entries included in the corresponding storage region, the traffic control layer 643 does not transmit the completion data to the host-sided interface 641. In contrast, in the event that the response data corresponding to the second data DATA2 are transmitted to all of the first to N$^{th}$ entries included in the corresponding storage region, the traffic control layer 643 may transmit the completion data to the host-sided interface 641.

Figure 38:
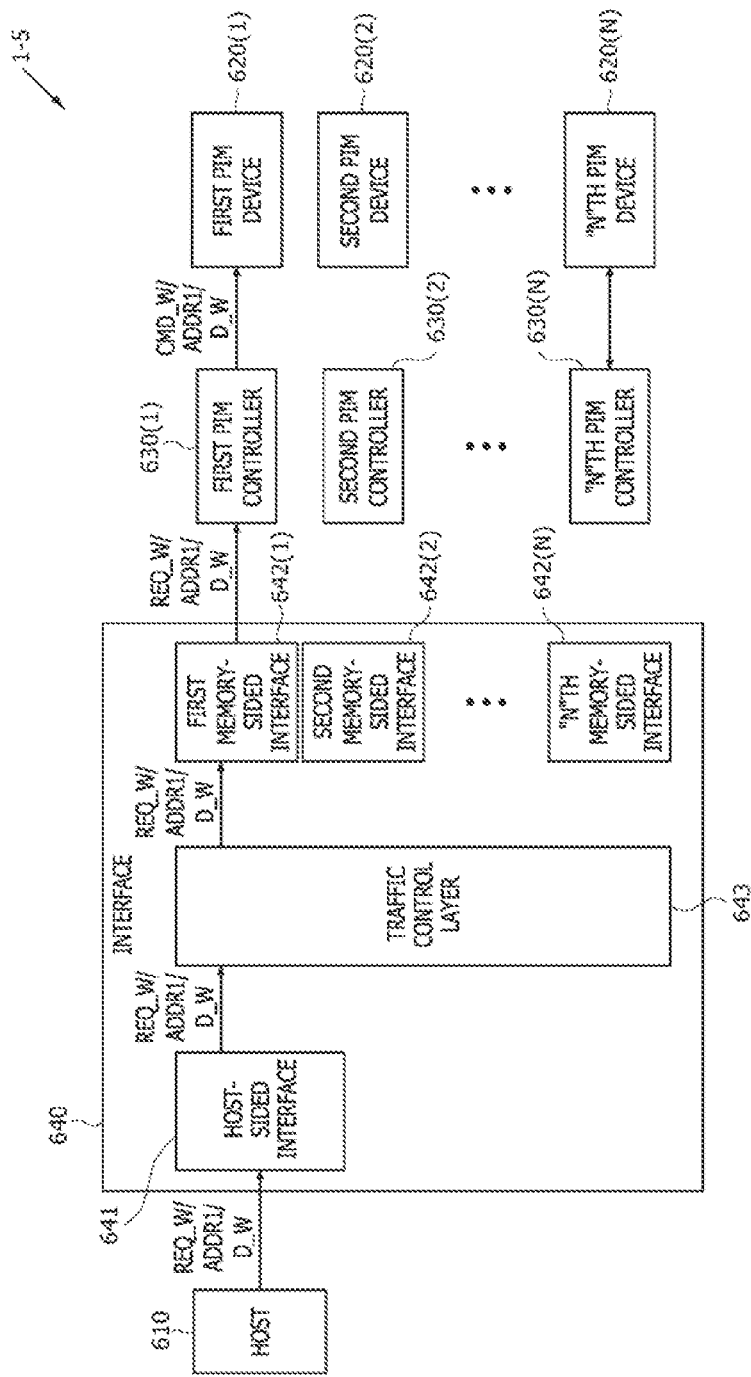
FIG. 38 illustrates a process for transmitting a write request of a memory access request to a target PIM device in a PIM system according to an embodiment of the present disclosure.

FIG. 38 illustrates a process for transmitting the write request REQ_W of the memory access request REQ_ME to a target PIM device in the PIM system 1-5 of FIG. 31, and FIGS. 39 to 41 illustrate various statuses of the interface 640 during the process for transmitting the write request REQ_W of the memory access request REQ_ME to the target PIM device in the PIM system 1-5 illustrated in FIG. 31. In addition, FIG. 42 illustrates a process executed after a write operation for a target PIM device is performed by the write request REQ_W of the memory access request REQ_ME in the PIM system 1-5 illustrated in FIG. 31, and FIGS. 43 to 45 illustrate various statuses of the interface 640 during a process executed after the write operation for the target PIM device is performed. The following description may also be equally applied to an operation performed by the write request REQ_WW for the weight data except that the weight data instead of the write data are transmitted.

Figure 39:
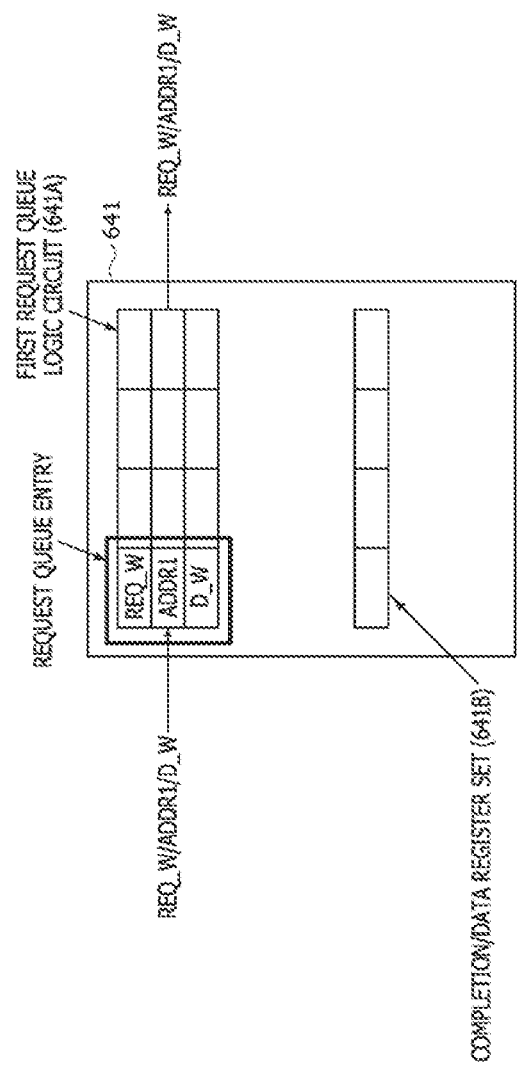
FIGS. 39, 40, and 41 illustrate various statuses of an interface during a process for transmitting a write request of a memory access request to a target PIM device in a PIM system according to an embodiment of the present disclosure.
Figure 40:
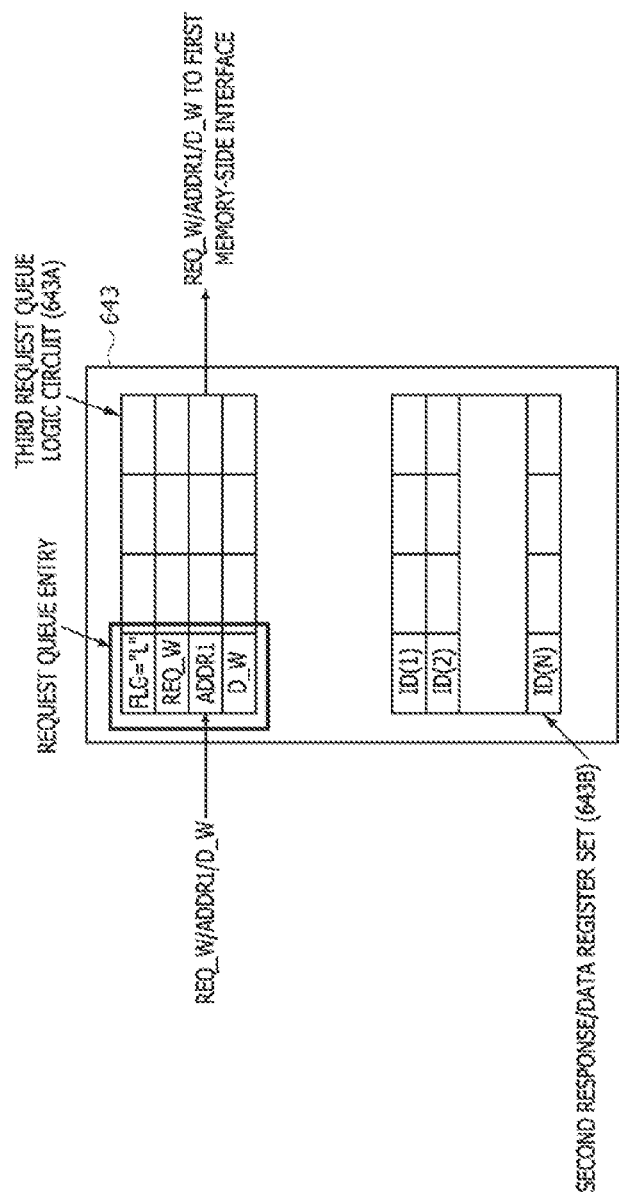

First, referring to FIG. 38, the host 610 may transmit the write request REQ_W, a first address ADDR1, and write data D_W to the host-sided interface 641 of the interface 640. Hereinafter, it may be assumed that the first PIM device 620(1) is designated as the target PIM device by the first address ADDR1. As illustrated in FIG. 39, the host-sided interface 641 may store the write request REQ_W, the first address ADDR1, and the write data D_W into the first request queue entry of the first request queue logic circuit 641A. The host-sided interface 641 may transmit the write request REQ_W, the first address ADDR1, and the write data D_W to the third request queue logic circuit 643A of the traffic control layer 643 of the interface 640. As illustrated in FIG. 40, the traffic control layer 643 may store the write request REQ_W, the first address ADDR1, and the write data D_W into the first request queue entry of the third request queue logic circuit 643A. Because the write request REQ_W is the single access request, the flag signal FLG of the first request queue entry of the third request queue logic circuit 643A may be set to have a logic "low" level. The traffic control layer 643 may transmit the write request REQ_W, the first address ADDR1, and the write data D_W to the second request queue logic circuit 642A of the first memory-sided interface 642(1) corresponding to a target memory-sided interface of the interface 640.

Figure 41:
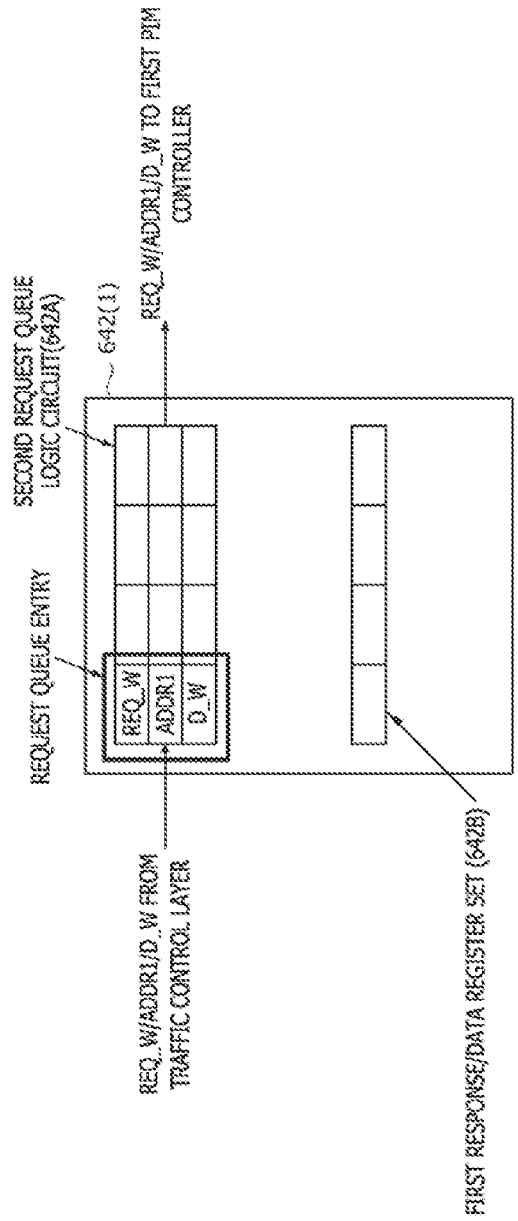
Figure 42:
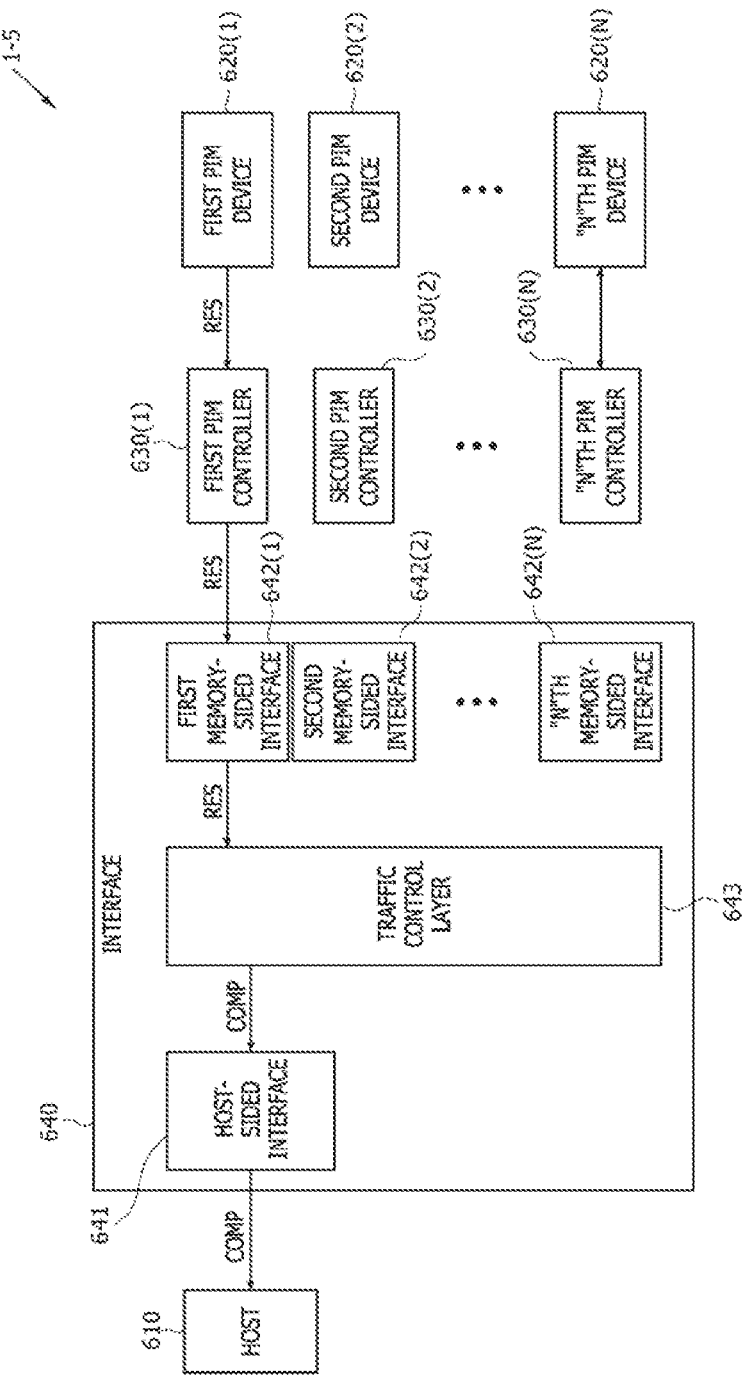
FIG. 42 illustrates a process executed after a write operation for a target PIM device is performed by a write request of a memory access request in a PIM system according to an embodiment of the present disclosure.

As illustrated in FIG. 41, the first memory-sided interface 642(1) may store the write request REQ_W, the first address ADDR1, and the write data D_W into the first request queue entry of the second request queue logic circuit 642A. The first memory-sided interface 642(1) may transmit the write request REQ_W, the first address ADDR1, and the write data D_W to a target PIM controller (i.e., the first PIM controller 630(1)). The first PIM controller 630(1) may decode the write request REQ_W to generate the write command CMD_W. The first PIM controller 630(1) may transmit the write command CMD_W, the first address ADDR1, and the write data D_W to the first PIM device 620(1) corresponding to the target PIM device. Although not shown in FIG. 38, the first PIM device 620(1) may store the write data D_W into a memory bank, which is designated by the first address ADDR1, in response to the write command CMD_W.

Figure 43:
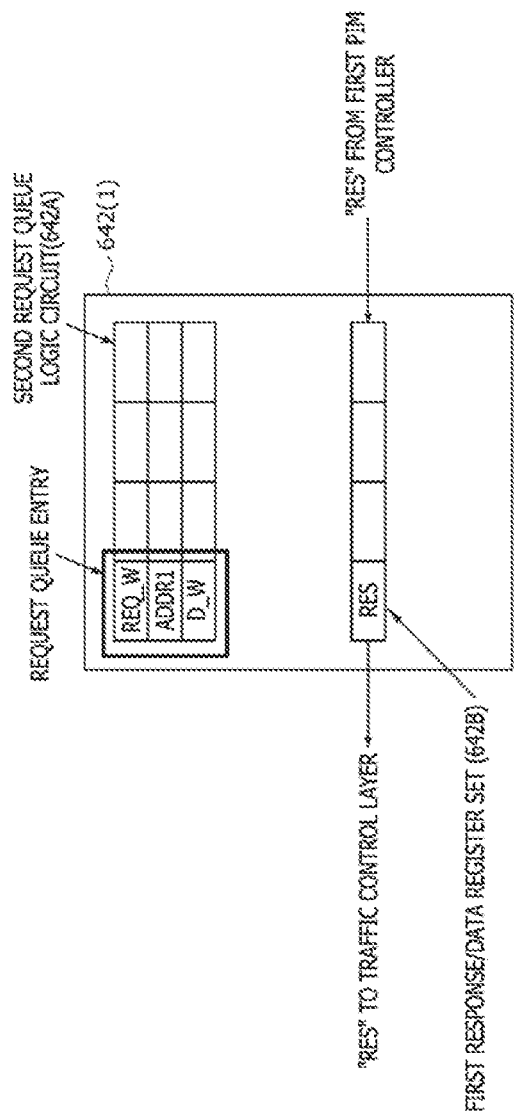
FIGS. 43, 44, and 45 illustrate various statuses of an interface during a process executed after a write operation for a target PIM device is performed.

Next, referring to FIG. 42, the first PIM device 620(1) corresponding to the target PIM device may generate the response data RES to transmit the response data RES to the first PIM controller 630(1) after the write operation. The first PIM controller 630(1) may transmit the response data RES to the first memory-sided interface 642(1) of the interface 640. As illustrated in FIG. 43, the first memory-sided interface 642(1) of the interface 640 may store the response data RES, which are output from the first PIM controller 630(1), into the first storage region of the first response/data register set 642B. The first memory-sided interface 642(1) may transmit the response data RES to the traffic control layer 643.

Figure 44:
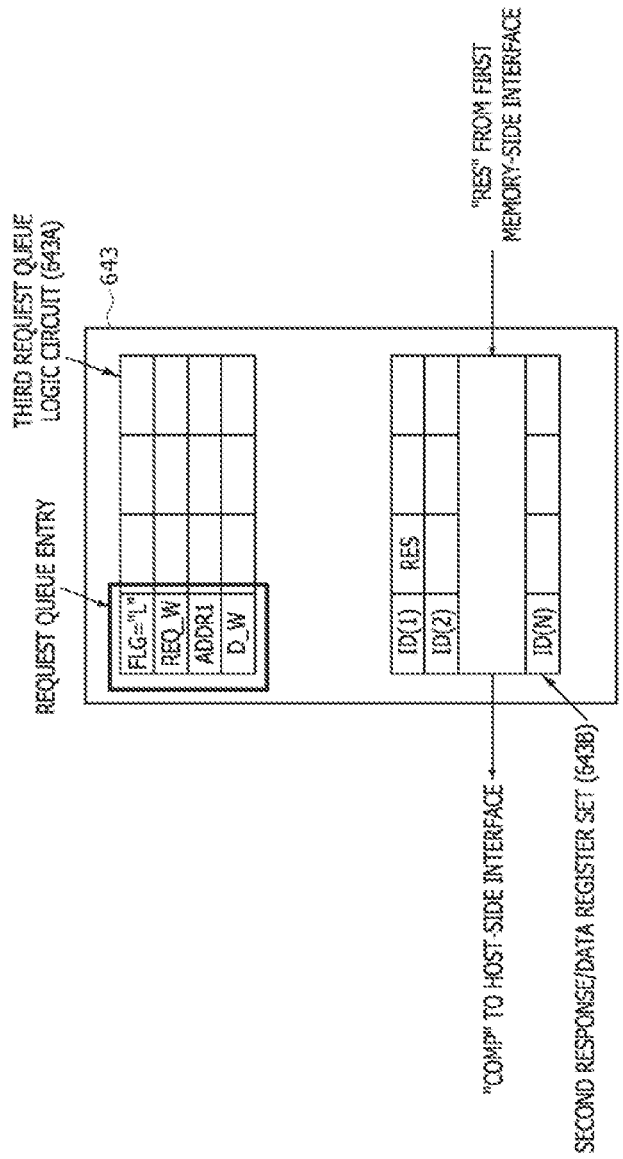
Figure 45:
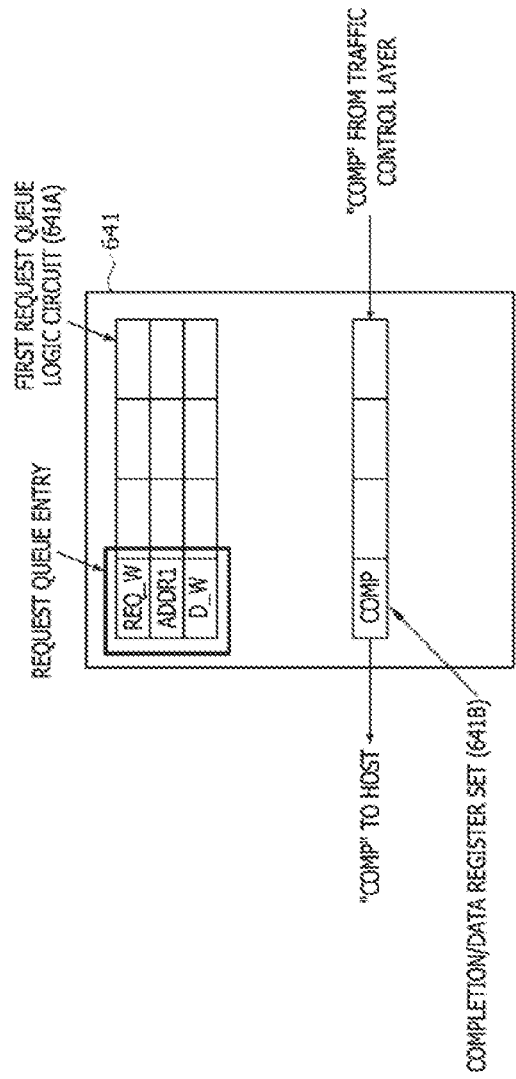

As illustrated in FIG. 44, the traffic control layer 643 may store the response data RES, which are output from the first memory-sided interface 642(1), into an entry having the first identification number ID(1) allocated to the first PIM device 620(1) among the first to $N^{th}$ entries included in the first storage region of the second response/data register set 643B. The traffic control layer 643 may check a logic level of the flag signal FLG of the first request queue entry of the third request queue logic circuit 643A. Because the flag signal FLG of the first request queue entry of the third request queue logic circuit 643A has a logic "low(L)" level, the traffic control layer 643 may transmit the completion data COMP to the host-sided interface 641. As illustrated in FIG. 45, the host-sided interface 641 may store the completion data COMP, which are output from the traffic control layer 643, into the first storage region of the completion/data register set 641B. The host-sided interface 641 may then transmit the completion data COMP to the host 610. The host 610 receiving the completion data COMP from the host-sided interface 641 may regard an operation corresponding to the write request REQ_W as terminating in the first PIM device 620(1) corresponding to the target PIM device and may then perform a subsequent process.

Figure 46:
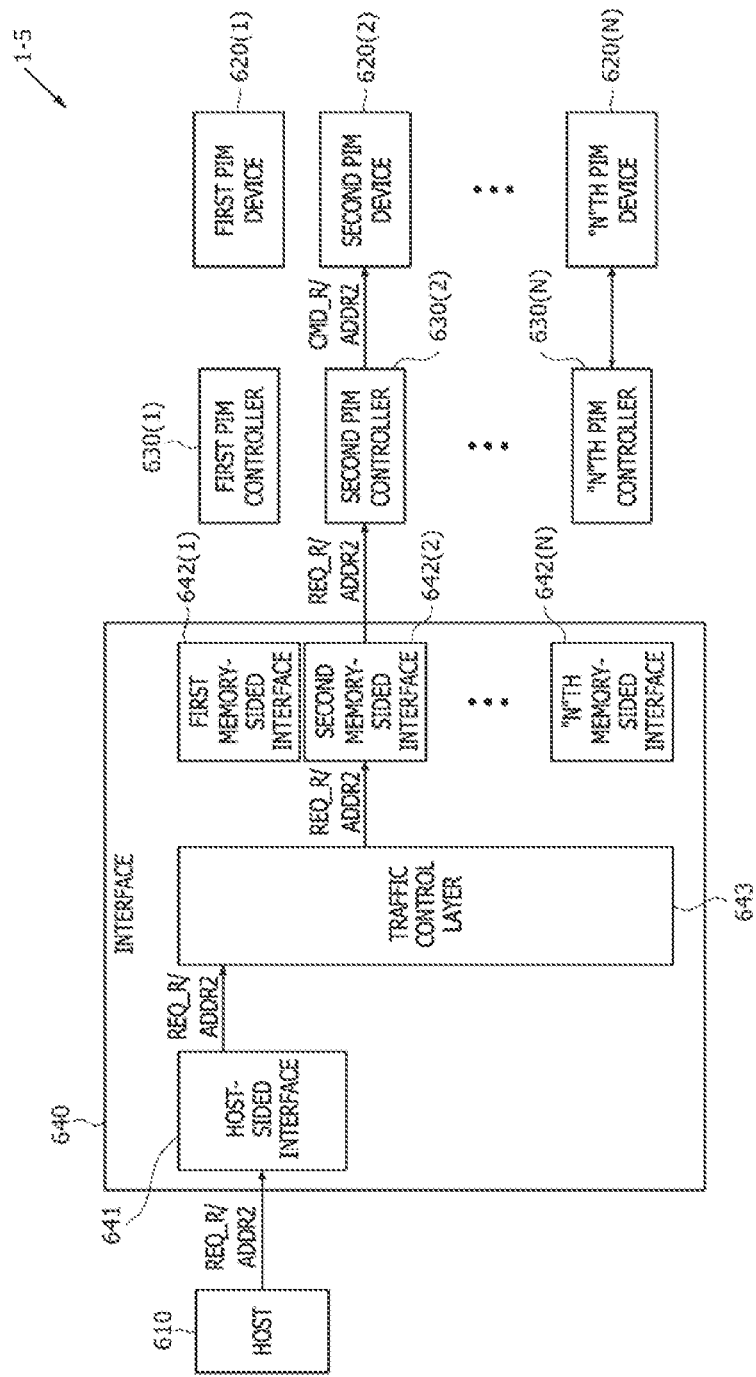
FIG. 46 illustrates a process for transmitting a read request of a memory access request to a target PIM device in a PIM system according to an embodiment of the present disclosure.

FIG. 46 illustrates a process for transmitting the read request REQ_R of the memory access request REQ_ME to a target PIM device in the PIM system 1-5 of FIG. 31, and FIGS. 47 to 49 illustrate various statuses of the interface 640 during the process for transmitting the read request REQ_R of the memory access request REQ_ME to the target PIM device in the PIM system 1-5 illustrated in FIG. 31. In addition, FIG. 50 illustrates a process that read data D_R are transmitted from the target PIM device to the host 610 by the read request REQ_R of the memory access request REQ_ME in the PIM system 1-5 of FIG. 31, and FIGS. 51 to 53 illustrate various statuses of the interface 640 during the process that the read data D_W are transmitted from the target PIM device to the host 610. The following description may also be equally applied to an operation performed by the read request REQ_MR for the MAC result data MAC_RST except that the MAC result data MAC_RST instead of the read data D_R are transmitted. In the following description, it may be assumed that the read request REQ_R is generated after the operation performed by the write request REQ_W described with reference to FIGS. 38 to 45.

Figure 47:
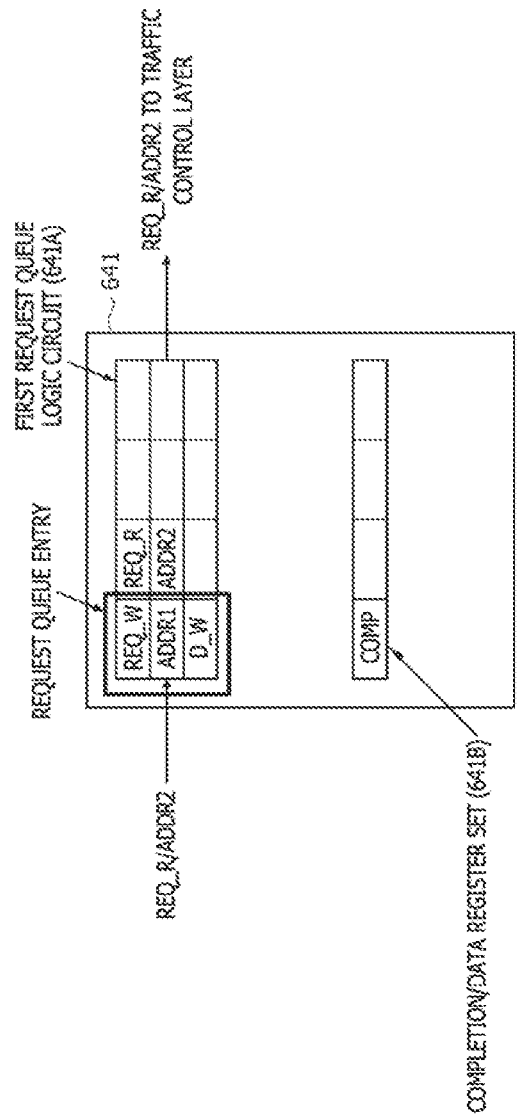
FIGS. 47, 48, and 49 illustrate various statuses of an interface during a process for transmitting a read request of a memory access request to a target PIM device in a PIM system according to an embodiment of the present disclosure.
Figure 48:
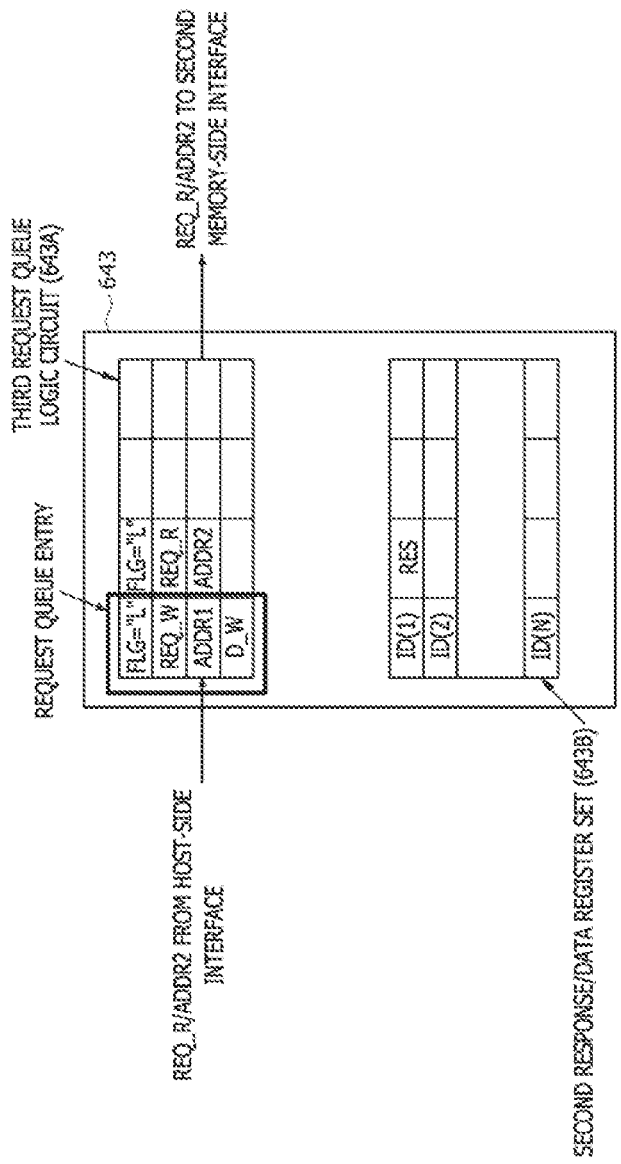

First, referring to FIG. 46, the host 610 may transmit the read request REQ_R and a second address ADDR2 to the host-sided interface 641 of the interface 640 to subsequently read out the read data D_R stored in a memory bank designated by the second address ADDR2 in response to the read request REQ_R. Hereinafter, it may be assumed that the second PIM device 620(2) is designated as the target PIM device by the second address ADDR2. As illustrated in FIG. 47, the host-sided interface 641 may store the read request REQ_R and the second address ADDR2 into the second request queue entry of the first request queue logic circuit 641A. The host-sided interface 641 may transmit the read request REQ_R and the second address ADDR2 to the third request queue logic circuit 643A of the traffic control layer 643 of the interface 640. As illustrated in FIG. 48, the traffic control layer 643 may store the read request REQ_R and the second address ADDR2 into the second request queue entry of the third request queue logic circuit 643A. Because the read request REQ_R is the single access request, the flag signal FLG of the second request queue entry of the third request queue logic circuit 643A may be set to have a logic "low" level. The traffic control layer 643 may transmit the read request REQ_R and the second address ADDR2 to the second request queue logic circuit 642A of the second memory-sided interface 642(2) corresponding to a target memory-sided interface of the interface 640.

Figure 49:
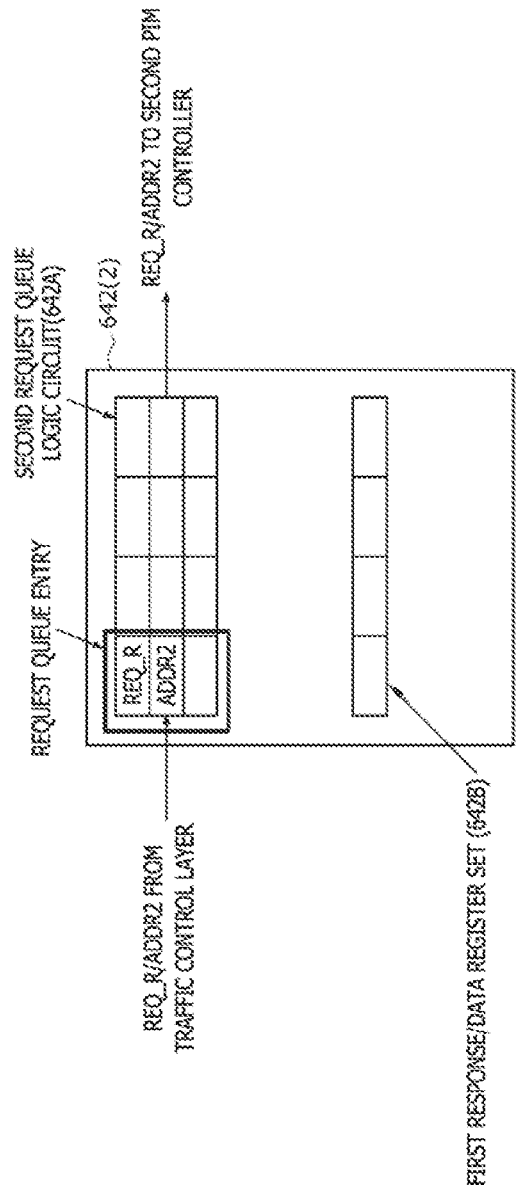
Figure 50:
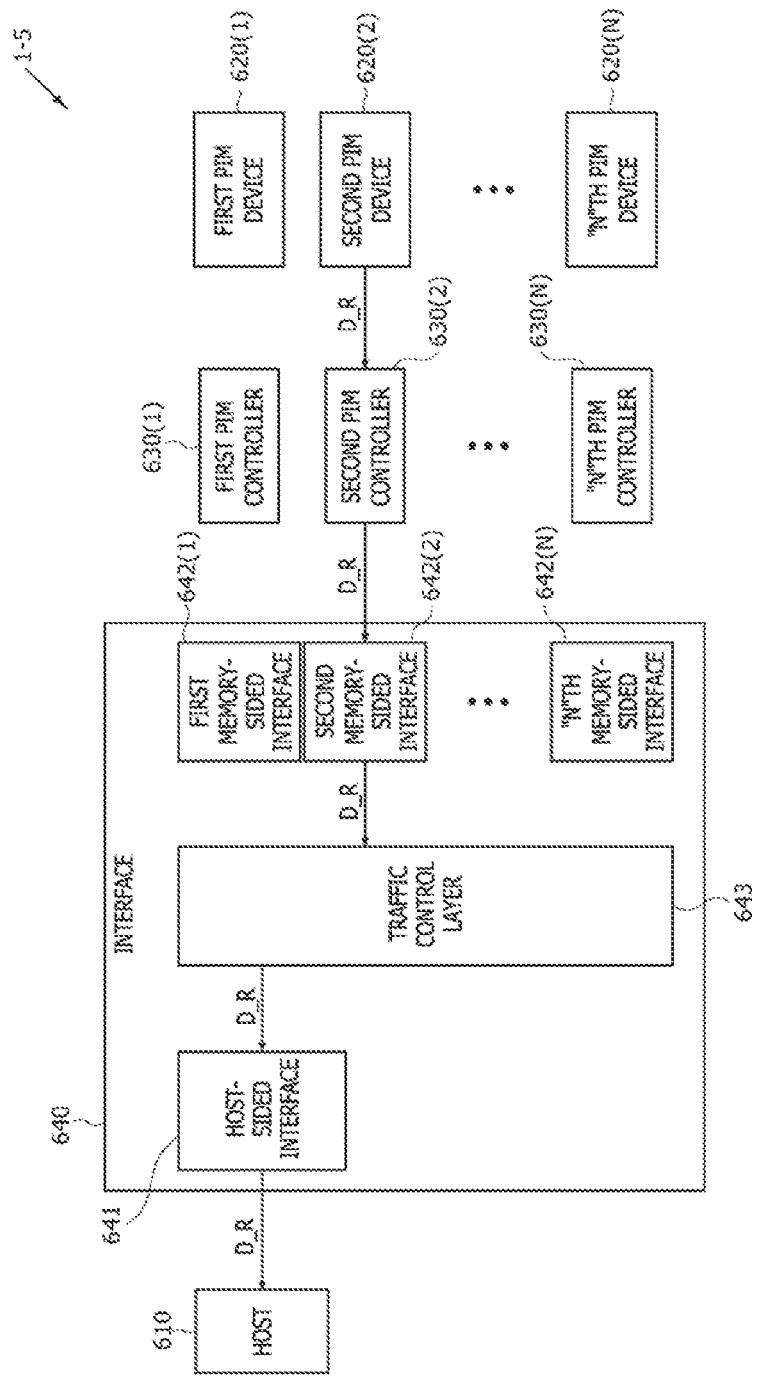
FIG. 50 illustrates a process that read data are transmitted from a target PIM device to a host by a read request of a memory access request in a PIM system according to an embodiment of the present disclosure.

As illustrated in FIG. 49, the second memory-sided interface 642(2) may store the read request REQ_R and the second address ADDR2 into the first request queue entry of the second request queue logic circuit 642A. The second memory-sided interface 642(2) may transmit the read request REQ_R and the second address ADDR2 to a target PIM controller (i.e., the second PIM controller 630(2)). The second PIM controller 630(2) may decode the read request REQ_R to generate the read command CMD_R. The second PIM controller 630(2) may transmit the read command CMD_R and the second address ADDR2 to the second PIM device 620(2) corresponding to the target PIM device.

Figure 51:
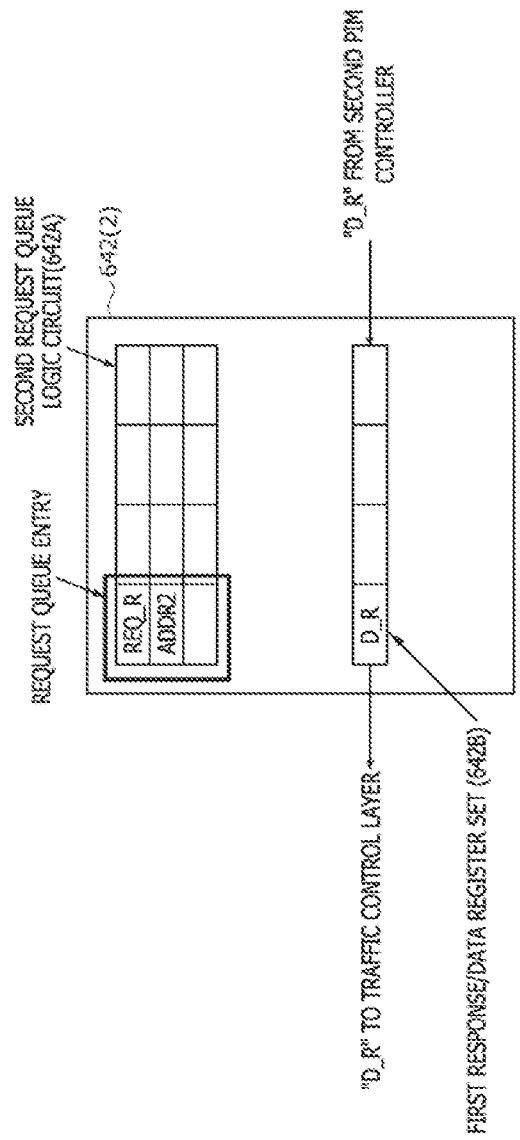
FIGS. 51, 52, and 53 illustrate various statuses of an interface during a process that read data are transmitted from a target PIM device to a host.

Next, referring to FIG. 50, the second PIM device 620(2) may read out the read data D_R stored in a memory bank designated by the second address ADDR2 in response to the read command CMD_R and may transmit the read data D_R to the second PIM controller 630(2). The second PIM controller 630(2) may transmit the read data D_R to the second memory-sided interface 642(2) of the interface 640. As illustrated in FIG. 51, the second memory-sided interface 642(2) of the interface 640 may store the read data D_R, which are output from the second PIM controller 630(2), into the first storage region of the first response/data register set 642B. The second memory-sided interface 642(2) may transmit the read data D_R to the traffic control layer 643.

Figure 52:
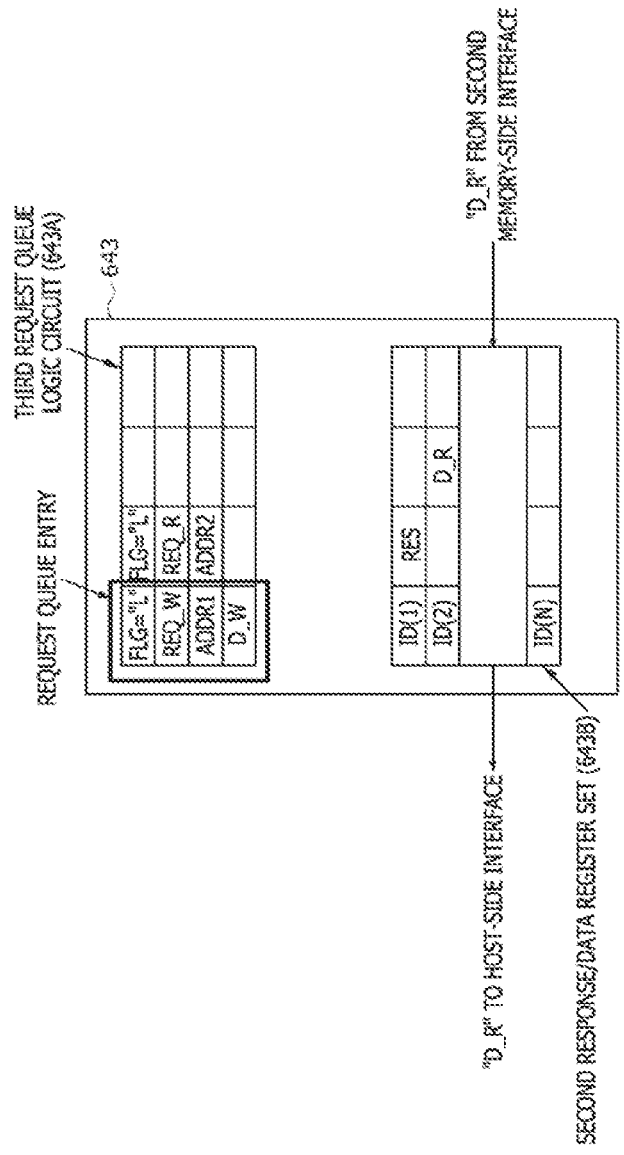
Figure 53:
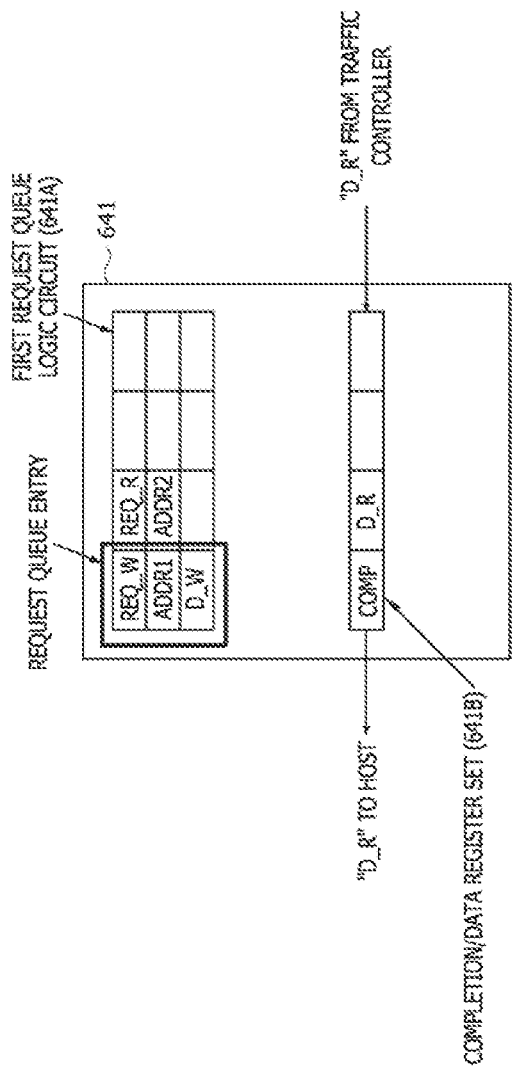
Figure 54:
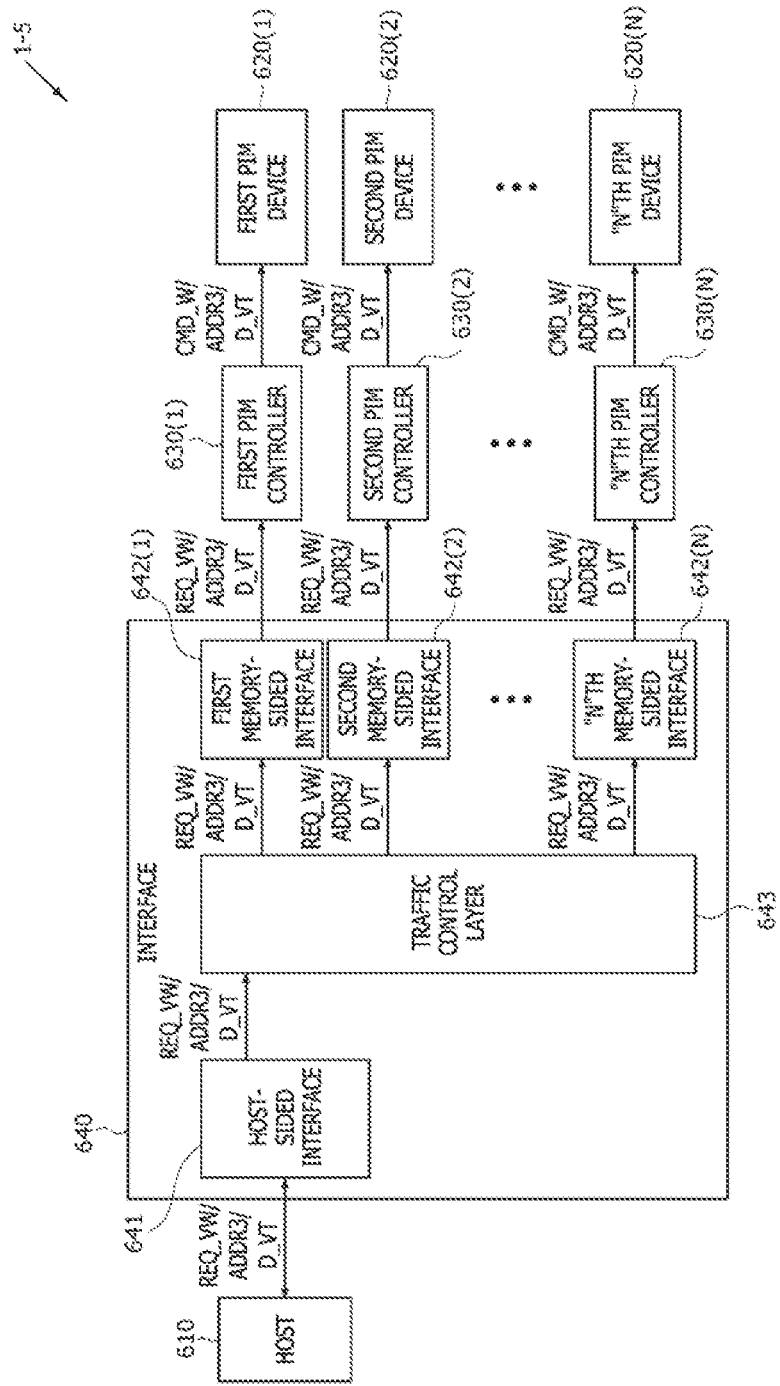
FIG. 54 illustrates a process for transmitting a write request for vector data to all of PIM devices in a PIM system according to an embodiment of the present disclosure.

As illustrated in FIG. 52, the traffic control layer 643 may store the read data D_R, which are output from the second memory-sided interface 642(2), into an entry having the second identification number ID(2) allocated to the second PIM device 620(2) among the first to N entries included in the second storage region of the second response/data register set 643B. The traffic control layer 643 may check a logic level of the flag signal FLG of the second request queue entry of the third request queue logic circuit 643A. Because the flag signal FLG of the second request queue entry of the third request queue logic circuit 643A has a logic "low(L)" level, the traffic control layer 643 may transmit the read data D_R to the host-sided interface 641. As illustrated in FIG. 54, the host-sided interface 641 may store the read data D_R, which are output from the traffic control layer 643, into the second storage region of the completion/data register set 641B. The host-sided interface 641 may then transmit the read data D_R to the host 610. The host 610 receiving the read data D_R from the host-sided interface 641 may perform a subsequent process.

Figure 58:
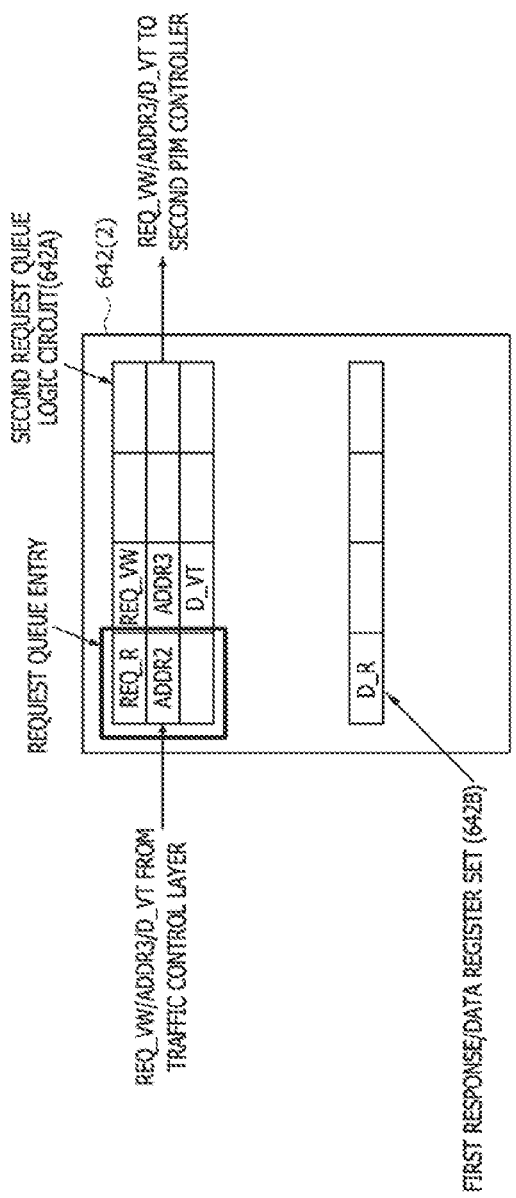
Figure 59:
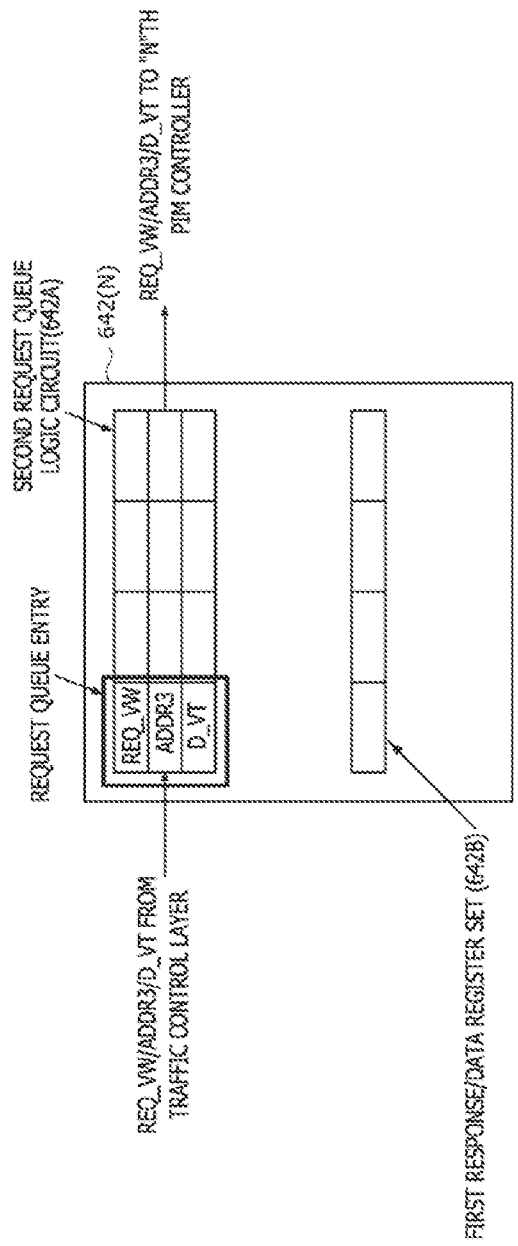
Figure 60:
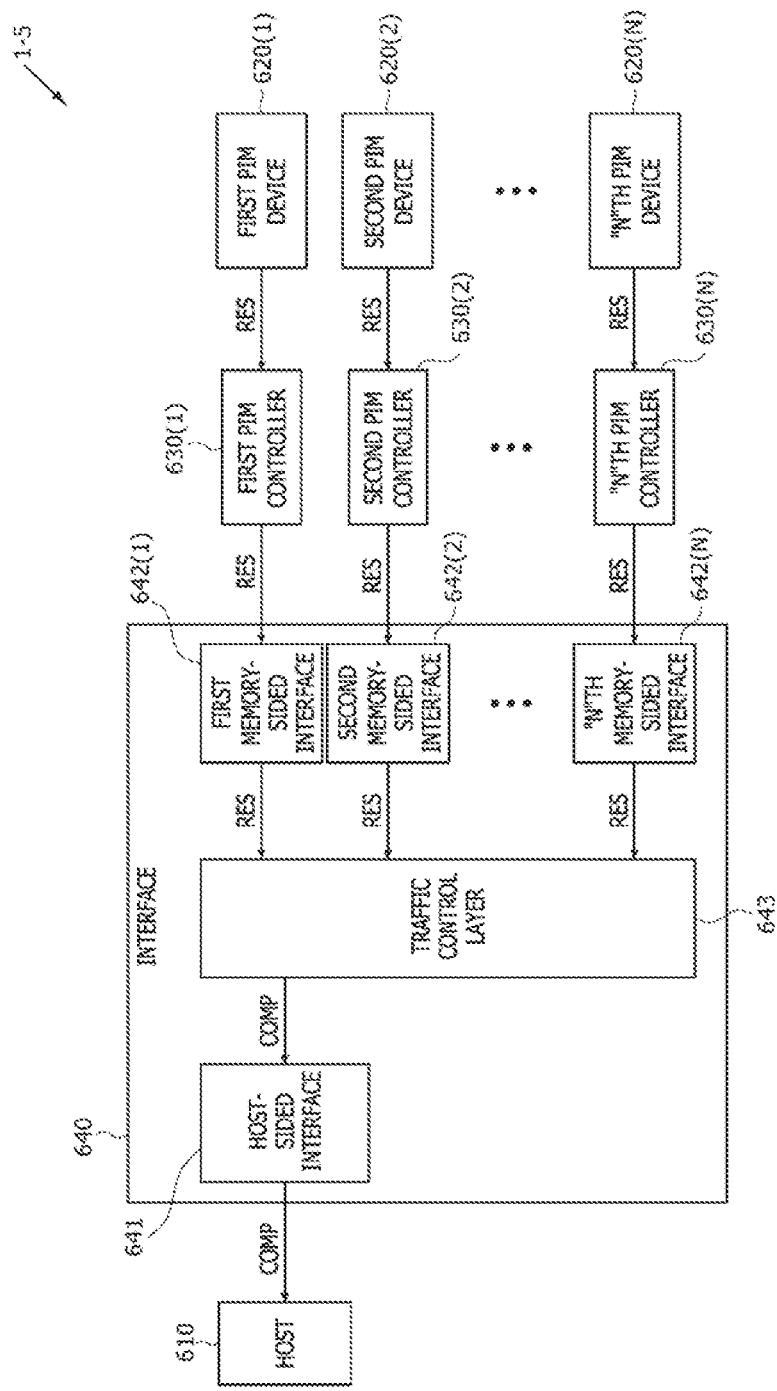
FIG. 60 illustrates a process executed after a write operation is performed by a write request for vector data in all of PIM devices of a PIM system according to an embodiment of the present disclosure.

FIG. 54 illustrates a process for transmitting the write request REQ_VW for the vector data to all of the PIM devices 620(1)~620(N) in the PIM system 1-5 of FIG. 31, and FIGS. 55 to 59 illustrate various statuses of the interface 640 during a process that the write request REQ_VW for the vector data is transmitted to all of the PIM devices 620(1)~620(N). In addition, FIG. 60 illustrates a process executed after a write operation is performed by the write request REQ_VW for the vector data in all of the PIM devices 620(1)~620(N) included in the PIM system 1-5 of FIG. 31, and FIGS. 61 to 65 illustrate various statuses of the interface 640 during the process executed after the write operation for the vector data is performed in all of the PIM devices 620(1)~620(N). The following description may also be equally applied to an operation performed by the MAC operation request REQ_MAC except that the MAC arithmetic operation instead of the write operation for the vector data is performed. In the following description, it may be assumed that the write request REQ_VW for the vector data is generated after the operation performed by the read request REQ_R described with reference to FIGS. 46 to 53.

Figure 55:
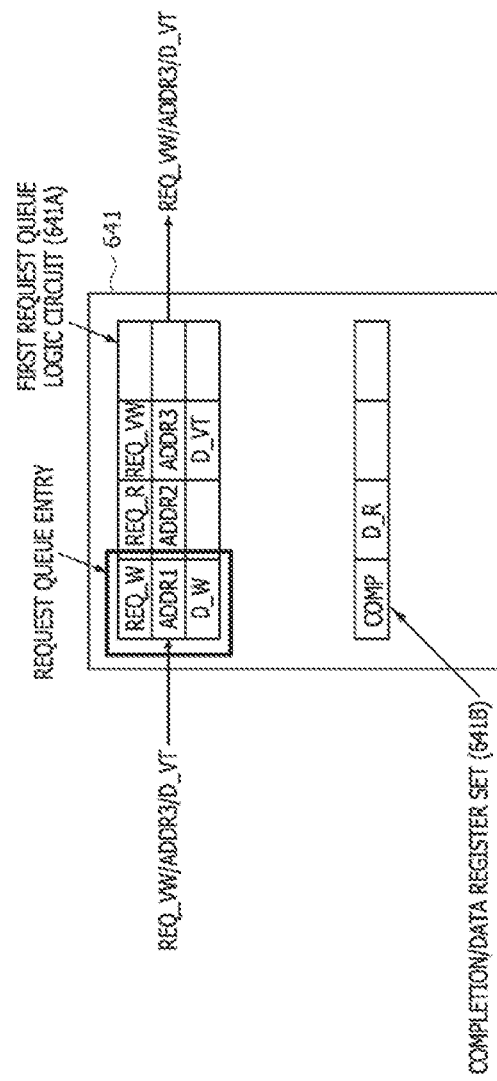
FIGS. 55, 56, 57, 58, and 59 illustrate various statuses of an interface during a process that a write request for vector data is transmitted to all of PIM devices in a PIM system according to an embodiment of the present disclosure.
Figure 56:
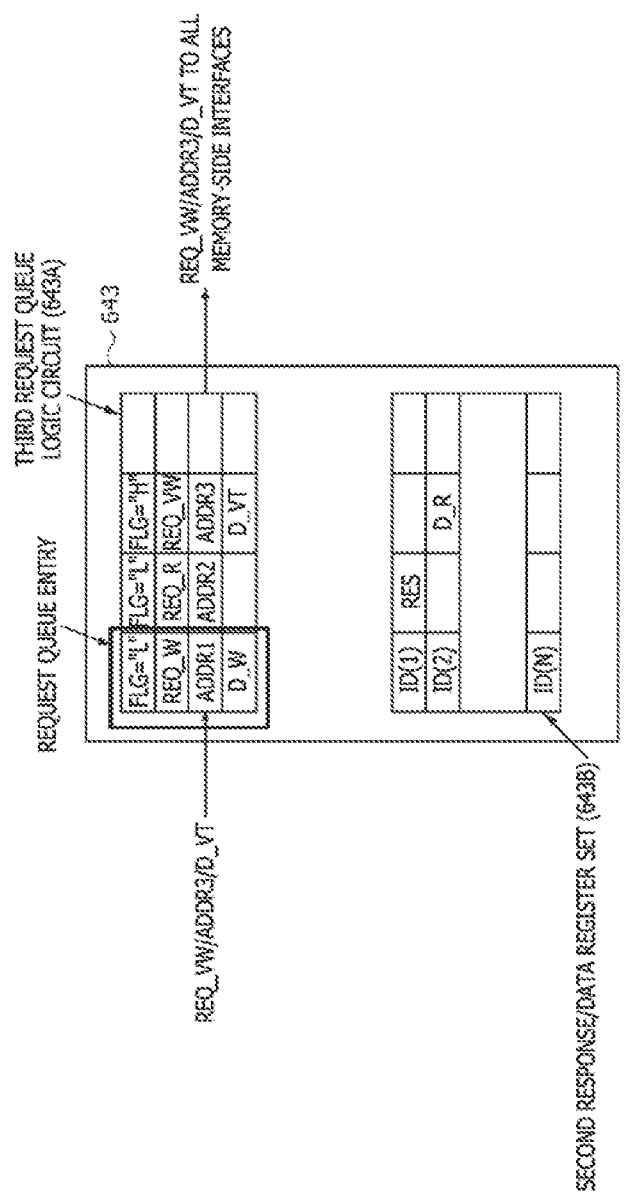

First, referring to FIG. 54, the host 610 may transmit the write request REQ_VW for vector data D_VT, a third address ADDR3, and the vector data D_VT to the host-sided interface 641 of the interface 640. As described with reference to FIG. 33, the write request REQ_VW for the vector data D_VT is a request belonging to the multi-access request. Thus, the target PIM device may include all of the PIM devices 620(1)~620(N). As illustrated in FIG. 55, the host-sided interface 641 may store the write request REQ_VW for the vector data D_VT, the third address ADDR3, and the vector data D_VT into the third request queue entry of the first request queue logic circuit 641A. The host-sided interface 641 may transmit the write request REQ_VW for the vector data D_VT, the third address ADDR3, and the vector data D_VT to the third request queue logic circuit 643A of the traffic control layer 643 of the interface 640. As illustrated in FIG. 56, the traffic control layer 643 may store the write request REQ_VW for the vector data D_VT, the third address ADDR3, and the vector data D_VT into the third request queue entry of the third request queue logic circuit 643A. Because the write request REQ_VW for the vector data D_VT is the multi-access request, the flag signal FLG of the third request queue entry of the third request queue logic circuit 643A may be set to have a logic "high(H)" level. The traffic control layer 643 may transmit the write request REQ_VW for the vector data D_VT, the third address ADDR3, and the vector data D_VT to all of the second request queue logic circuits 642A of the first to $N^{th}$ memory-sided interfaces 642(1)~642(N) corresponding to all of target memory-sided interfaces of the interface 640.

Figure 57:
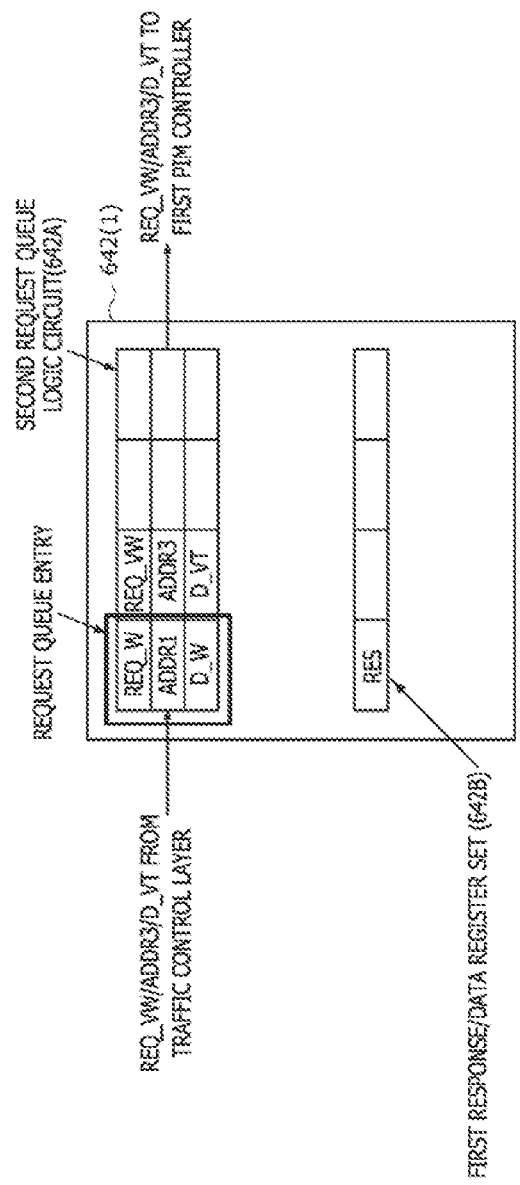

As illustrated in FIG. 57, in case of the first memory-sided interface 642(1), the write request REQ_VW for the vector data D_VT, the third address ADDR3, and the vector data D_VT output from the traffic control layer 643 may be stored into the second request queue entry of the second request queue logic circuit 642A. The first memory-sided interface 642(1) may transmit the write request REQ_VW for the vector data D_VT, the third address ADDR3, and the vector data D_VT to the first PIM controller 630(1). As illustrated in FIG. 58, in case of the second memory-sided interface 642(2), the write request REQ_VW for the vector data D_VT, the third address ADDR3, and the vector data D_VT output from the traffic control layer 643 may be stored into the second request queue entry of the second request queue logic circuit 642A. The second memory-sided interface 642(2) may transmit the write request REQ_VW for the vector data D_VT, the third address ADDR3, and the vector data D_VT to the second PIM controller 630(2). As illustrated in FIG. 59, in case of the $N^{th}$ memory-sided interface 642(N), the write request REQ_VW for the vector data D_VT, the third address ADDR3, and the vector data D_VT output from the traffic control layer 643 may be stored into the first request queue entry of the second request queue logic circuit 642A. The $N^{th}$ memory-sided interface 642(N) may transmit the write request REQ_VW for the vector data D_VT, the third address ADDR3, and the vector data D_VT to the $N^{th}$ PIM controller 630(N). An operation of each of the remaining memory-sided interfaces (i.e., the third to $(N-1)^{th}$ memory-sided interfaces 642(3)~642(N-1)) may be the same as an operation of the $N^{th}$ memory-sided interface 642(N) described above.

Referring again to FIG. 54, the first PIM controller 630(1) may decode the write request REQ_VW for the vector data D_VT to generate the write command CMD_W. The first PIM controller 630(1) may transmit the write command CMD_W, the third address ADDR3, and the vector data D_VT to the first PIM device 620(1). Although not shown in FIG. 54, the first PIM device 620(1) may store the vector data D_VT into a global buffer included in the first PIM device 620(1) in response to the write command CMD_W. In addition, the second PIM controller 630(2) may also decode the write request REQ_VW for the vector data D_VT to generate the write command CMD_W. The second PIM controller 630(2) may transmit the write command CMD_W, the third address ADDR3, and the vector data D_VT to the second PIM device 620(2). Although not shown in FIG. 54, the second PIM device 620(2) may store the vector data D_VT into a global buffer included in the second PIM device 620(2) in response to the write command CMD_W. Similarly, the $N^{th}$ PIM controller 630(N) may also decode the write request REQ_VW for the vector data D_VT to generate the write command CMD_W. The $N^{th}$ PIM controller 630(N) may transmit the write command CMD_W, the third address ADDR3, and the vector data D_VT to the $N^{th}$ PIM device 620(N). Although not shown in FIG. 54, the $N^{th}$ PIM device 620(N) may store the vector data D_VT into a global buffer included in the $N^{th}$ PIM device 620(N) in response to the write command CMD_W. Moreover, although not shown in FIG. 54, the third to $(N-1)^{th}$ PIM controllers 630(3)~630(N-1)$^{th}$ may also transmit the write command CMD_W, the third address ADDR3, and the vector data D_VT to the third to $(N-1)^{th}$ PIM devices 620(3)~620(N-1), respectively. The third to $(N-1)^{th}$ PIM devices 620(3)~620(N-1) may store the vector data D_VT into global buffers included in respective ones of the third to $(N-1)^{th}$ PIM devices 620(3)~620(N-1) in response to the write command CMD_W.

Next, referring to FIG. 60, the first PIM device 620(1) may generate the response data RES to transmit the response data RES to the first PIM controller 630(1) after the write operation for the vector data D_VT. The first PIM controller 630(1) may transmit the response data RES to the first memory-sided interface 642(1) of the interface 640. The second PIM device 620(2) may also generate the response data RES to transmit the response data RES to the second PIM controller 630(2) after the write operation for the vector data D_VT. The second PIM controller 630(2) may transmit the response data RES to the second memory-sided interface 642(2) of the interface 640. Similarly, the $N^{th}$ PIM device 620(N) may also generate the response data RES to transmit the response data RES to the $N^{th}$ PIM controller 630(N) after the write operation for the vector data D_VT. The $N^{th}$ PIM controller 630(N) may transmit the response data RES to the $N^{th}$ memory-sided interface 642(N) of the interface 640. Although not shown in FIG. 60, the third to $(N-1)^{th}$ PIM devices 620(3)~620(N–1)$^{th}$ may also generate and transmit the response data RES to respective ones of the third to (N–1)$^{th}$ PIM controllers 630(3)~630(N–1) after the write operation for the vector data D_VT. The third to (N–1)$^{th}$ PIM controllers 630(3)~630(N–1) may then transmit the response data RES to the third to (N–1)$^{th}$ memory-sided interfaces 642(3)~642(N–1), respectively.

Figure 61:
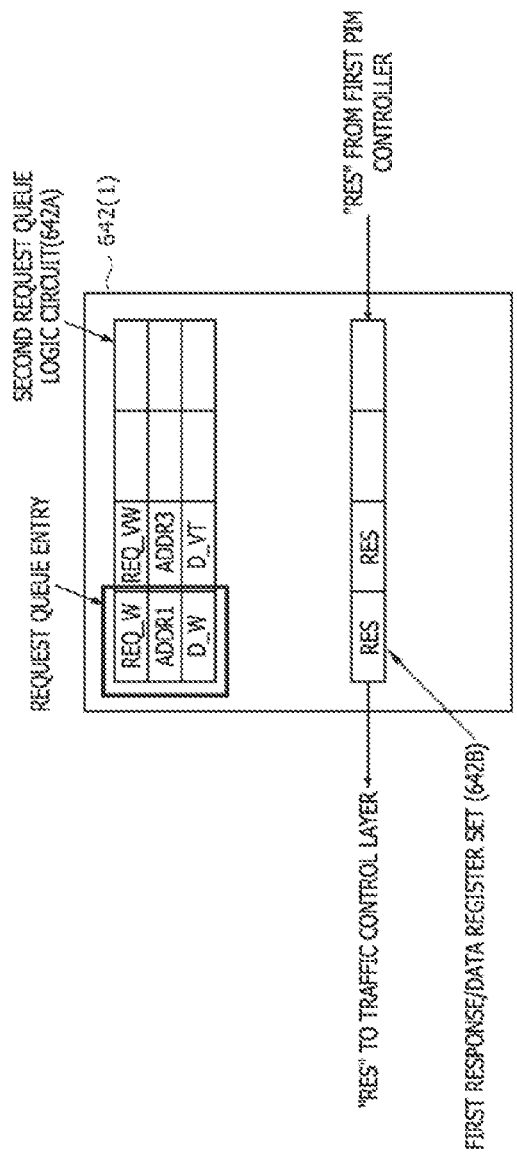
FIGS. 61, 62, 63, 64, and 65 illustrate various statuses of an interface during a process executed after a write operation for vector data is performed in all of PIM devices of a PIM system according to an embodiment of the present disclosure.
Figure 62:
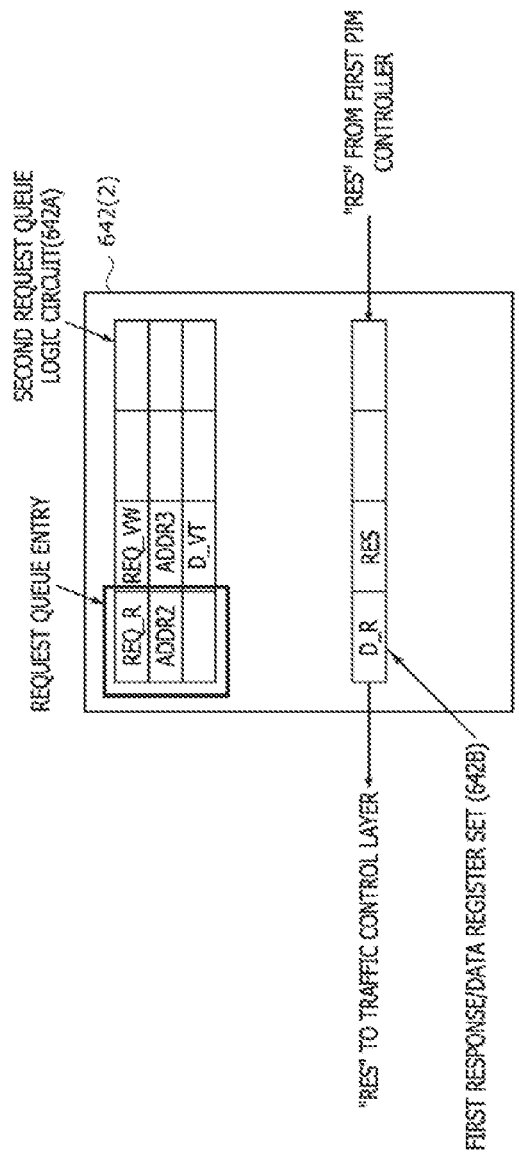
Figure 63:
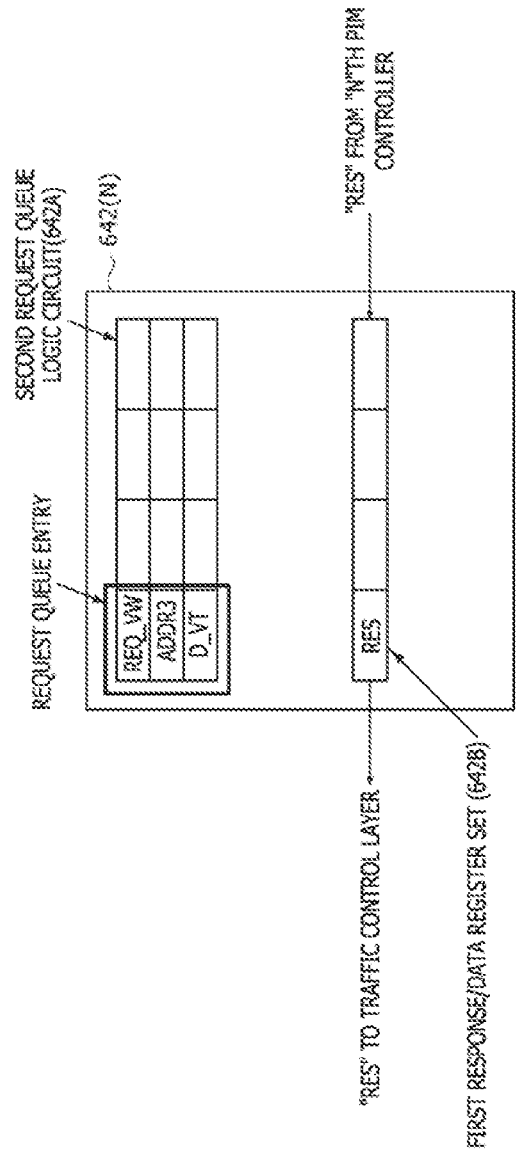

As illustrated in FIG. 61, the first memory-sided interface 642(1) of the interface 640 may store the response data RES, which are output from the first PIM controller 630(1), into the first response/data register set 642B. In such a case, the response data RES may be stored into the second storage region of the first response/data register set 642B corresponding to the second request queue entry of the second request queue logic circuit 642A in which the write request REQ_VW for the vector data D_VT is stored. The first memory-sided interface 642(1) may transmit the response data RES, which are stored in the second storage region of the first response/data register set 642B, to the traffic control layer 643. As illustrated in FIG. 62, the second memory-sided interface 642(2) of the interface 640 may store the response data RES, which are output from the second PIM controller 630(2), into the first response/data register set 642B. In such a case, the response data RES may be stored into the second storage region of the first response/data register set 642B corresponding to the second request queue entry of the second request queue logic circuit 642A in which the write request REQ_VW for the vector data D_VT is stored. The second memory-sided interface 642(2) may transmit the response data RES, which are stored in the second storage region of the first response/data register set 642B, to the traffic control layer 643. As illustrated in FIG. 63, the N$^{th}$ memory-sided interface 642(N) of the interface 640 may store the response data RES, which are output from the N$^{th}$ PIM controller 630(N), into the first response/data register set 642B. In such a case, the response data RES may be stored into the first storage region of the first response/data register set 642B corresponding to the first request queue entry of the second request queue logic circuit 642A in which the write request REQ_VW for the vector data D_VT is stored. The N$^{th}$ memory-sided interface 642(N) may transmit the response data RES, which are stored in the first storage region of the first response/data register set 642B, to the traffic control layer 643. Although not shown in FIG. 60, the third to (N–1)$^{th}$ memory-sided interfaces 642(3)~642(N–1) may store the response data RES, which are output from respective ones of the third to (N–1)$^{th}$ PIM controller 630(3)~630(N–1), into the first storage regions of the first response/data register sets 642B included in the third to (N–1)$^{th}$ memory-sided interfaces 642(3)~642(N–1), respectively. In addition, the third to (N–1)$^{th}$ memory-sided interfaces 642(N) may transmit the response data RES, which are stored in the first storage regions of the first response/data register sets 642B, to the traffic control layer 643.

Figure 64:
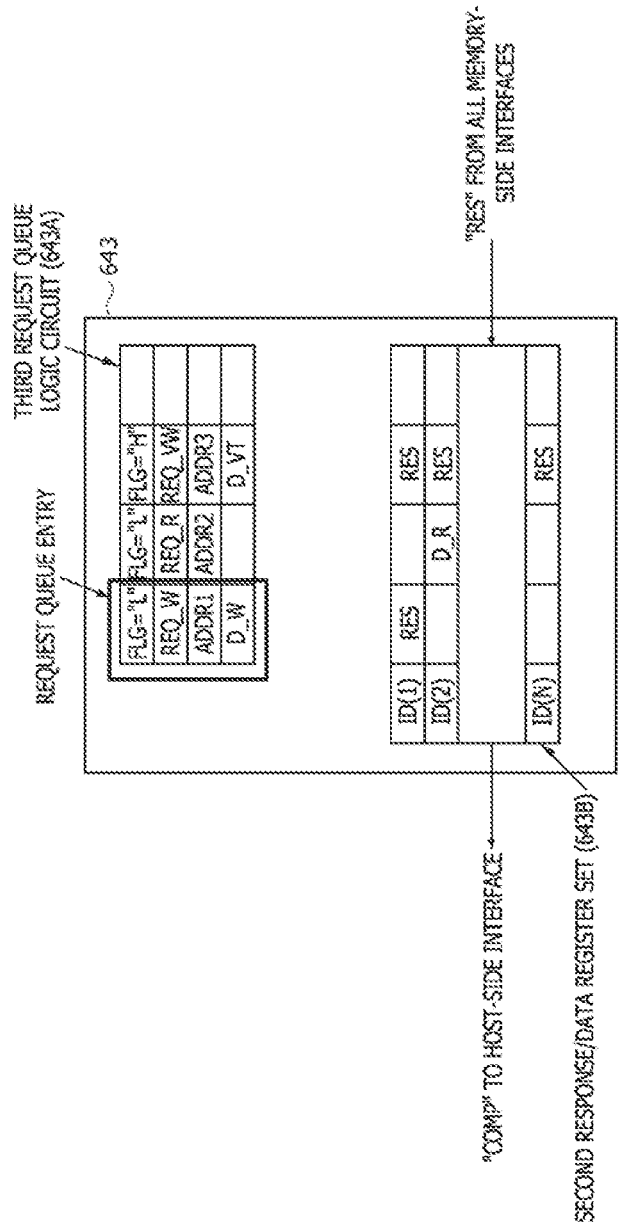

As illustrated in FIG. 64, the traffic control layer 643 may store the response data RES, which are output from the first memory-sided interface 642(1), into the second response/data register set 643B. In such a case, the response data RES output from the first memory-sided interface 642(1) may be stored into the third storage region of the second response/data register set 643B corresponding to the third request queue entry of the third request queue logic circuit 643A in which the write request REQ_VW for the vector data D_VT is stored. More specifically, the response data RES may be stored into an entry (i.e., a first entry) having the first identification number ID(1) allocated to the first PIM device 620(1) among the first to N$^{th}$ entries included in the third storage region of the second response/data register set 643B. In addition, the traffic control layer 643 may store the response data RES output from the second memory-sided interface 642(2) into a second entry having the second identification number ID(2) allocated to the second PIM device 620(2) among the first to N$^t$h entries included in the third storage region of the second response/data register set 643B. Similarly, the traffic control layer 643 may store the response data RES output from the N memory-sided interface 642(N) into an N$^{th}$ entry having the N$^{th}$ identification number ID(N) allocated to the N$^{th}$ PIM device 620(N) among the first to N$^{th}$ entries included in the third storage region of the second response/data register set 643B. Although omitted in FIG. 64, the traffic control layer 643 may store the response data RES, which are output from respective ones of the third to (N–1)$^{th}$ memory-sided interfaces 642(3)~642(N–1), into respective ones of third to (N–1)$^{th}$ entries having the third to (N–1)$^{th}$ identification numbers ID(3)~ID(N–1) allocated to respective ones of the third to (N–1)$^{th}$ PIM devices 620(3)~620(N–1) among the first to N$^{th}$ entries included in the third storage region of the second response/data register set 643B.

Figure 65:
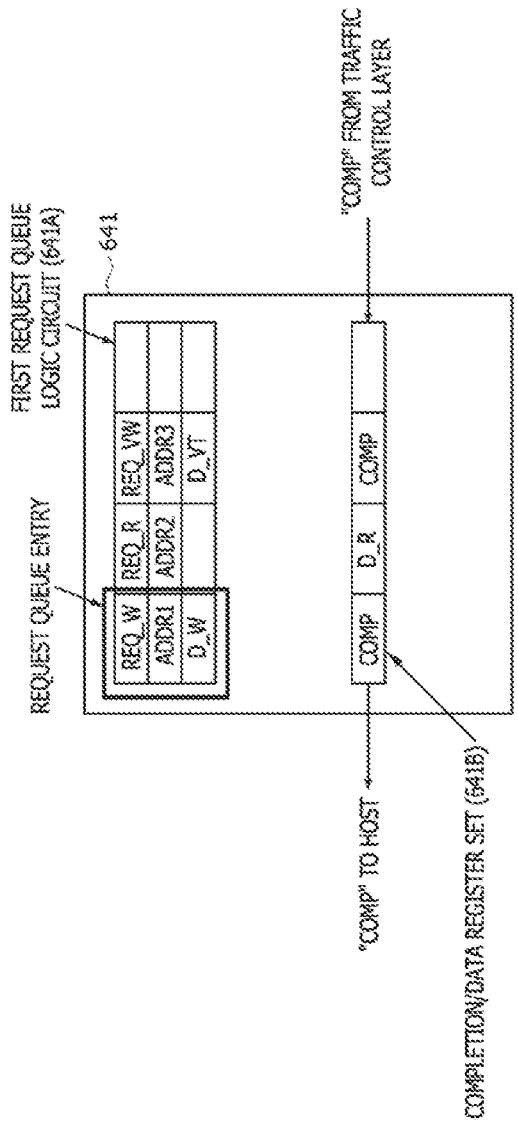

The traffic control layer 643 may check a logic level of the flag signal FLG of the third request queue entry of the third request queue logic circuit 643A whenever the response data RES are stored into the third storage region of the second response/data register set 643B. Because the flag signal FLG of the third request queue entry of the third request queue logic circuit 643A has a logic "high(H)" level, the traffic control layer 643 may stop performing an operation for transmitting the completion data COMP to the host-sided interface 641 until all sets of the response data RES (i.e., first to N$^{th}$ sets of response data RES) are stored into respective ones of the first to N$^{th}$ entries included in the third storage region of the second response/data register set 643B. After the first to N$^{th}$ sets of response data RES output from respective ones of the first to N$^{th}$ memory-sided interfaces 642(1)~642(N) are all stored into respective ones of the first to N$^{th}$ entries included in the third storage region of the second response/data register set 643B, the traffic control layer 643 may transmit the completion data COMP to the host-sided interface 641. As illustrated in FIG. 65, the host-sided interface 641 may store the completion data COMP, which are output from the traffic control layer 643, into the completion/data register set 641B. In such a case, the completion data COMP may be stored into the third storage region of the completion/data register set 641B corresponding to the third request queue entry of the first request queue logic circuit 641A in which the write request REQ_VW for the vector data D_VT is stored. The host-sided interface 641 may then transmit the completion data COMP to the host 610. The host 610 receiving the completion data COMP from the host-sided interface 641 may regard operations corresponding to the write request REQ_VW for the vector data D_VT as terminating in all of the first to N$^{th}$ PIM devices 620(1)~620(N) and may then perform a subsequent process.

Figure 66:
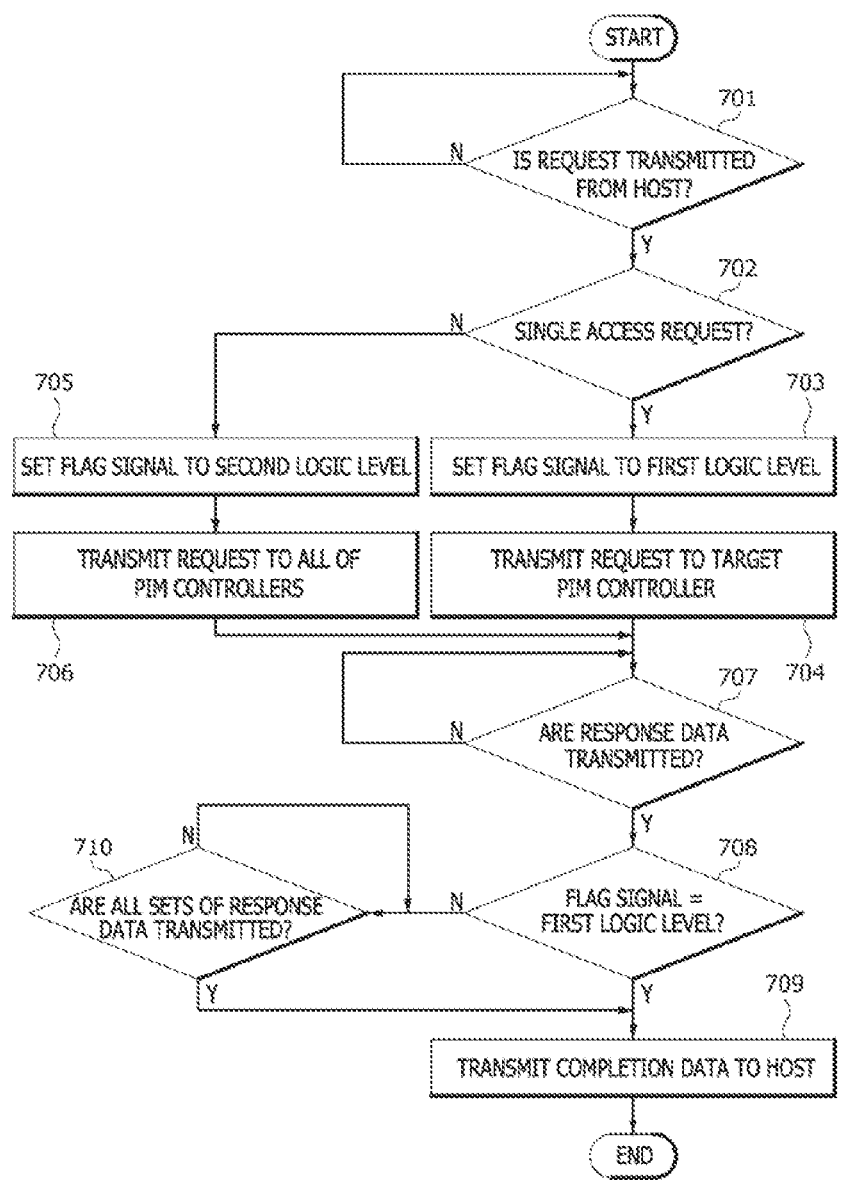
FIG. 66 is a flowchart illustrating an interfacing operation of the PIM system illustrated in FIG. 31.

FIG. 66 is a flowchart illustrating an operation performed by the interface 640 of the PIM system 1-5 illustrated in FIG. 31. Referring to FIGS. 31 and 66, at a step 701, the interface 640 may determine whether a request is transmitted from the host 610 to the interface 640. When no request is transmitted from the host 610 to the interface 640 at the step 701, the interface 640 may maintain a standby status for continuously checking whether the request is transmitted from the host 610 to the interface 640. When the request is transmitted from the host 610 to the interface 640 at the step 701, whether the request is the single access request may be checked at a step 702. When the request is the single access request at the step 702, a step 703 may be executed. When the request is not the single access request but the multi-access request at the step 702, a step 705 may be executed.

When the request transmitted from the host 610 to the interface 640 is the single access request at the step 702, the traffic control layer 643 of the interface 640 may set the flag signal FLG to a first logic level at the step 703. Subsequently, at a step 704, the traffic control layer 643 of the interface 640 may transmit the request to a target PIM controller through a target memory-sided interface. While the step 704 is executed, an address may also be transmitted together with the request. In addition, when the request is a write request, write data or weight data may also be transmitted together with the write request. The interface 640 may execute a step 707 after executing the step 704. Meanwhile, when the request transmitted from the host 610 to the interface 640 is the multi-access request at the step 702, the traffic control layer 643 of the interface 640 may set the flag signal FLG to a second logic level at the step 705. When the flag signal FLG is set to have a second logic level at the step 705, the traffic control layer 643 of the interface 640 may transmit the request to all of the PIM controllers through all of the memory-sided interfaces at a step 706. While the step 706 is executed, an address may be transmitted together with the request. In addition, when the request is a write request, write data or weight data may also be transmitted together with the write request. The interface 640 may execute a step 707 after executing the step 706.

At the step 707, the interface 640 may check whether the response data are transmitted from a target PIM device to the interface 640 through a target PIM controller. In such a case, the read data or the MAC result data instead of the response data may be transmitted from the target PIM device to the interface 640 according to the request which is output from the host 610 at the step 701. When no response data are transmitted from the target PIM device to the interface 640 at the step 707, the interface 640 may maintain a standby status for continuously checking whether the response data are transmitted from the target PIM device to the interface 640. When the response data are transmitted to the interface 640 at the step 707, the traffic control layer 643 of the interface 640 may check whether the flag signal has the first logic level at a step 708. When the flag signal has the first logic level at the step 708, the interface 640 may transmit the completion data to the host 610 at a step 709. When the read data or the MAC result data instead of the response data are transmitted from the target PIM device to the interface 640 at the step 707, the read data or the MAC result data instead of the response data may be transmitted to the host 610 at the step 709. When the flag signal has a logic level (i.e., a second logic level) different from the first logic level at the step 708, the interface 640 may check whether plural sets of response data are transmitted from all of the PIM devices to the interface 640 at a step 710. When the plural sets of response data are not transmitted from all of the PIM devices to the interface 640 at the step 710, the interface 640 may maintain a standby status until the plural sets of response data are transmitted from all of the PIM devices to the interface 640. When the plural sets of response data are transmitted from all of the PIM devices to the interface 640 at the step 710, the interface 640 may transmit the completion data to the host 610 at the step 709.

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A processing-in-memory (PIM) system comprising:
   a plurality of PIM devices;
   a plurality of PIM controllers configured to control respective ones of the plurality of PIM devices; and
   an interface coupled between a host and the plurality of PIM controllers,
   wherein the interface is configured to transmit first request data to a target PIM controller corresponding to one of the plurality of PIM controllers for execution of a first request output from the host, and
   wherein the interface is configured to transmit second request data to all of the plurality of PIM controllers for execution of a second request output from the host.

2. The PIM system of claim 1, wherein each of the plurality of PIM devices includes:
   a plurality of MAC operators;
   a plurality of first memory banks related to respective ones of the plurality of MAC operators; and
   a plurality of second memory banks related to respective ones of the plurality of MAC operators,
   wherein one of the plurality of MAC operators, one of the plurality of first memory banks, and one of the plurality of second memory banks, which are related to each other, constitute one MAC unit, and
   wherein in the one MAC unit, the MAC operator is configured to perform a MAC arithmetic operation using one group of weight data and one group of vector data provided by respective ones of the first memory bank and the second memory bank as input data.

3. The PIM system of claim 2, wherein the plurality of MAC operators are synchronized with one clock signal to perform the MAC arithmetic operation.

4. The PIM system of claim 3,
   wherein the plurality of MAC operators receive plural groups of weight data, which are different from each other and provided by respective ones of the plurality of first memory banks, respectively; and
   wherein the plurality of MAC operators receive plural groups of vector data, which are the same and provided by respective ones of the plurality of second memory banks, respectively.

5. The PIM system of claim 1, wherein each of the plurality of PIM devices includes:
   a global buffer;
   a plurality of MAC operators coupled to the global buffer; and
   a plurality of memory banks related to respective ones of the plurality of MAC operators, wherein one of the plurality of MAC operators and one of the plurality of memory banks, which are related to each other, constitute one MAC unit, and wherein the MAC operator included in the one MAC unit is configured to perform a MAC arithmetic operation using one group of weight data provided by the memory bank included in the one MAC unit and vector data provided by the global buffer as input data.

6. The PIM system of claim 5, wherein the plurality of MAC operators are synchronized with one clock signal to perform the MAC arithmetic operation.

7. The PIM system of claim 6, wherein the plurality of MAC operators receive plural groups of weight data, which are different from each other and provided by respective ones of the plurality of memory banks, respectively; and wherein each of the plurality of MAC operators receives one group of vector data provided by the global buffer.

8. The PIM system of claim 1, wherein the first request is a request for requesting an operation performed by a target PIM device corresponding to one of the plurality of PIM devices; and wherein the second request is a request for requesting an operation performed by all of the plurality of PIM devices.

9. The PIM system of claim 8, wherein the first request includes a write request for write data or weight data and a read request for read data or MAC result data; and wherein the second request includes a MAC operation request and a write request for vector data.

10. The PIM system of claim 9, wherein when the first request is the write request for the write data, the first request data are comprised of the write request, an address, and the write data;

wherein when the first request is the write request for the weight data, the first request data are comprised of the write request, an address, and the weight data;

wherein when the first request is the read request for the read data, the first request data are comprised of the read request and an address;

wherein when the first request is the read request for the MAC result data, the first request data are comprised of the read request for the MAC result data;

wherein when the second request is the MAC operation request, the second request data are comprised of the MAC operation request and an address; and wherein when the second request is the write request for the vector data, the second request data are comprised of the write request, an address, and the vector data.

11. The PIM system of claim 10, wherein each of the plurality of PIM devices is configured to transmit response data to one of the plurality of PIM controllers after performing an operation for execution of the write request for the write data, an operation for execution of the write request for the weight data, an operation for execution of the MAC operation request, or an operation for execution of the write request for the vector data;

wherein each of the plurality of PIM devices is configured to transmit the read data to one of the plurality of PIM controllers after performing an operation for execution of the read request for the read data; and wherein each of the plurality of PIM devices is configured to transmit the MAC result data to one of the plurality of PIM controllers after performing an operation for execution of the read request for the MAC result data.

12. The PIM system of claim 1, wherein the interface includes:

a host-sided interface configured to receive one of the first request data and the second request data from the host;

a plurality of memory-sided interfaces related to respective ones of the plurality of PIM controllers; and a traffic control layer configured to transmit the first request data to a target memory-sided interface corresponding to one of the plurality of memory-sided interfaces when the first request data are transmitted from the host-sided interface to the traffic control layer and configured to transmit the second request data to all of the plurality of memory-sided interfaces when the second request data are transmitted from the host-sided interface to the traffic control layer.

13. The PIM system of claim 12, wherein the host-sided interface includes:

a first request queue logic circuit having a plurality of request queue entries, each of which stores the first request data or the second request data output from the host; and a completion/data register set having a plurality of storage regions, each of which stores completion data output from the traffic control layer.

14. The PIM system of claim 13, wherein the plurality of request queue entries included in the first request queue logic circuit are related to the plurality of storage regions included in the completion/data register set, respectively.

15. The PIM system of claim 13, wherein each of the plurality of memory-sided interfaces includes:

a second request queue logic circuit having a plurality of request queue entries, each of which stores the first request data or the second request data output from the traffic control layer; and a first response/data register set having a plurality of storage regions, each of which stores response data, read data, or MAC result data output from one of the plurality of PIM controllers.

16. The PIM system of claim 15, wherein the plurality of request queue entries included in the second request queue logic circuit are related to the plurality of storage regions included in the first response/data register set, respectively.

17. The PIM system of claim 15, wherein the traffic layer includes:

a third request queue logic circuit having a plurality of request queue entries, each of which stores the first request data or the second request data output from the first request queue logic circuit; and a second response/data register set having a plurality of storage regions, each of which stores the response data, the read data, or the MAC result data output from the plurality of PIM controllers.

18. The PIM system of claim 17, wherein the plurality of request queue entries included in the third request queue logic circuit are related to the plurality of storage regions included in the second response/data register set, respectively.

19. The PIM system of claim 17, wherein each of the plurality of request queue entries included in the third request queue logic circuit is configured to store a flag signal having one of a first logic level and a second logic level which is set according to the first request data or the second request data.

20. The PIM system of claim 19, wherein the flag signal is set to have the first logic level when the first request data are output from the first request queue logic circuit and is set to have the second logic level when the second request data are output from the first request queue logic circuit.

21. The PIM system of claim 20, wherein each of the plurality of storage regions included in the second response/data register set has a plurality of entries which correspond to respective ones of the plurality of PIM devices.

22. The PIM system of claim 21, wherein the plurality of entries in each of the plurality of storage regions included in the second response/data register set are provided with a plurality of identification numbers corresponding to respective ones of the plurality of PIM devices.

23. The PIM system of claim 22, wherein the traffic control layer checks a logic level of the flag signal to determine whether the completion data have to be transmitted to the host-sided interface when the response data are transmitted from at least one of the plurality of memory-sided interfaces to the traffic control layer.

24. The PIM system of claim 23,
wherein if the flag signal has the first logic level when the response data are input to the traffic control layer, the traffic control layer transmits the completion data to the host-sided interface; and
wherein if the flag signal has the second logic level when the response data are input to the traffic control layer, the traffic control layer transmits the completion data to the host-sided interface after all sets of the response data are transmitted from the plurality of memory-sided interfaces to the traffic control layer.

\* \* \* \* \*